United States Patent
Chang et al.

(10) Patent No.: US 9,407,164 B2
(45) Date of Patent: Aug. 2, 2016

(54) SYSTEMS APPROACH TO PHOTOVOLTAIC ENERGY EXTRACTION

(71) Applicant: Massachusetts Institute of Technology, Cambridge, MA (US)

(72) Inventors: Arthur Hsu Chen Chang, Irvine, CA (US); David J. Perreault, Andover, MA (US); Khurram K. Afridi, Boulder, CO (US); Minjie Chen, Brighton, MA (US); Steven B. Leeb, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 273 days.

(21) Appl. No.: 14/232,103

(22) PCT Filed: Feb. 3, 2013

(86) PCT No.: PCT/US2013/024552
§ 371 (c)(1),
(2) Date: Jan. 10, 2014

(87) PCT Pub. No.: WO2013/116814
PCT Pub. Date: Aug. 8, 2013

(65) Prior Publication Data
US 2014/0167513 A1    Jun. 19, 2014

Related U.S. Application Data

(63) Continuation of application No. 13/744,352, filed on Jan. 17, 2013, now abandoned.

(60) Provisional application No. 61/594,990, filed on Feb. 3, 2012.

(51) Int. Cl.
*H02M 7/48* (2007.01)
*H02J 3/38* (2006.01)
(Continued)

(52) U.S. Cl.
CPC ............... *H02M 7/48* (2013.01); *H02J 3/385* (2013.01); *H02M 7/797* (2013.01);
(Continued)

(58) Field of Classification Search
CPC .......................................................... H02J 1/00
USPC ............................................................ 307/18
See application file for complete search history.

(56) References Cited

U.S. PATENT DOCUMENTS 5,561,597 A   10/1996  Limpaecher
5,744,988 A    4/1998  Condon et al.
(Continued)

FOREIGN PATENT DOCUMENTS

WO   WO 2013/109719 A1   7/2013
WO   WO 2013/109743 A2   7/2013
(Continued)

OTHER PUBLICATIONS

U.S. Appl. No. 14/968,045, filed Dec. 14, 2015, Perreault et al.
(Continued)

*Primary Examiner* — Robert Deberadinis
(74) *Attorney, Agent, or Firm* — Daly, Crowley, Mofford and Durkee, LLP

(57) ABSTRACT

Described is a method and apparatus for per-panel photovoltaic energy extraction with integrated converters. Also described are switched-capacitor (SC) converters have been evaluated for many applications because of the possibility for on-chip integration; applications to solar arrays are no exception. Also described is a comprehensive system-level look at solar installations, finding possibilities for optimization at and between all levels of operation in an array. Specifically, novel concepts include new arrangements and options for applying switched-capacitor circuits at 3 levels: for the panel and sub-panel level, as part of the overall control strategy, and for ensuring stable and robust interface to the grid with the possibility of eliminating or reducing the use of electrolytic capacitors.

10 Claims, 37 Drawing Sheets

(51) Int. Cl.
*H02J 1/00* (2006.01)
*H02M 7/797* (2006.01)
*H02M 1/00* (2006.01)
*H02M 1/32* (2007.01)

(52) U.S. Cl.
CPC .. *H02M 2001/007* (2013.01); *H02M 2001/322* (2013.01); *Y02E 10/56* (2013.01); *Y10T 307/549* (2015.04); *Y10T 307/707* (2015.04)

(56) References Cited

U.S. PATENT DOCUMENTS

| | | | |
|---|---|---|---|
| 7,535,133 | B2 | 5/2009 | Perreault et al. |
| 7,589,605 | B2 | 9/2009 | Perreault et al. |
| 7,889,519 | B2 | 2/2011 | Perreault et al. |
| 8,026,763 | B2 | 9/2011 | Dawson et al. |
| 8,212,541 | B2 | 7/2012 | Perreault et al. |
| 8,451,053 | B2 | 5/2013 | Perreault et al. |
| 8,718,188 | B2 | 5/2014 | Balteanu et al. |
| 8,824,978 | B2 | 9/2014 | Briffa et al. |
| 8,829,993 | B2 | 9/2014 | Briffa et al. |
| 8,830,710 | B2 | 9/2014 | Perreault et al. |
| 2004/0125618 | A1 | 7/2004 | DeRooij et al. |
| 2005/0162144 | A1 | 7/2005 | Kernahan |
| 2005/0213267 | A1 | 9/2005 | Azrai et al. |
| 2005/0286278 | A1 | 12/2005 | Perreault et al. |
| 2008/0032473 | A1 | 2/2008 | Bocek et al. |
| 2008/0265586 | A1 | 10/2008 | Like et al. |
| 2009/0002066 | A1 | 1/2009 | Lee et al. |
| 2009/0059630 | A1 | 3/2009 | Williams |
| 2010/0126550 | A1 | 5/2010 | Foss |
| 2011/0026281 | A1 | 2/2011 | Chapman et al. |
| 2011/0193515 | A1 | 8/2011 | Wu et al. |
| 2011/0221346 | A1 | 9/2011 | Lee et al. |
| 2011/0221398 | A1 | 9/2011 | Ferber, Jr. |
| 2011/0273020 | A1 | 11/2011 | Balachandreswaran et al. |
| 2012/0119676 | A1 | 5/2012 | Yao |
| 2013/0241625 | A1 | 9/2013 | Perreault et al. |
| 2014/0120854 | A1 | 5/2014 | Briffa et al. |
| 2014/0313781 | A1 | 10/2014 | Perreault et al. |
| 2014/0339918 | A1 | 11/2014 | Perreault et al. |
| 2014/0355322 | A1 | 12/2014 | Perreault et al. |
| 2015/0023063 | A1 | 1/2015 | Perreault et al. |
| 2015/0084701 | A1 | 3/2015 | Perreault et al. |

FOREIGN PATENT DOCUMENTS

| | | |
|---|---|---|
| WO | WO 2013/109797 A1 | 7/2013 |
| WO | WO 2013/116814 A1 | 8/2013 |

OTHER PUBLICATIONS

U.S. Appl. No. 14/974,563, filed Dec. 18, 2015, Perreault et al.
U.S. Appl. No. 14/975,742, filed Dec. 19, 2015, Perreault et al.
Notice of Allowance dated Feb. 29, 2016 corresponding to U.S. Appl. No. 14/233,912; 18 Pages.
U.S. Appl. No. 14/416,654, filed Jan. 23, 2015, Perreault, et al.
U.S. Appl. No. 14/416,737, filed Feb. 11, 2015, Perreault, et al.
U.S. Appl. No. 14/401,981, filed Nov. 18, 2015, Perreault.
U.S. Appl. No. 14/435,914, filed Apr. 15, 2015, Perreault, et al.
U.S. Appl. No. 14/934,760, filed Nov. 6, 2015, Briffa, et al.
U.S. Appl. No. 14/920,031, filed Oct. 22, 2015, Briffa, et al.
Chang et al.; "A Systems Approach to Photovoltaic Energy Extraction;" 2012 27$^{th}$ Annual IEEE Applied Power Electronics Conference and Exposition (APEC); Feb. 5-9, 2012; 18 pages.
Pease; "What's All This Common-Centroid Stuff, Anyhow?;" Electronic Design; http://electronicdesign.com/analog/whats-all-common-centroid-stuff-anyhow; Nov. 16, 2001; 4 pages.
International Search Report and Written Opinion of the ISA dated Jun. 10, 2013; for PCT Pat. App. No. PCT/US2013/024552; 14 pages.
U.S. Appl. No. 14/758,033, filed Jun. 26, 2015, Perreault, et al.
U.S. Appl. No. 14/791,685, filed Jul. 6, 2015, Perreault, et al.
PCT International Preliminary Report on Patentability for PCT/US2013/024552 dated Aug. 14, 2014; 9 pages.
PCT International Preliminary Report on Patentability for PCT/US2013/021886 dated Jul. 31, 2014; 9 pages.
PCT International Preliminary Report on Patentability for PCT/US2013/021926 dated Jul. 31, 2014; 9 pages.
PCT International Preliminary Report on Patentability for PCT/US2013/022001 dated Jul. 31, 2014; 9 pages.
U.S. Appl. No. 14/837,616, filed Aug. 27, 2015, Briffa, et al.
U.S. Appl. No. 14/823,220, filed Aug. 11, 2015, Barton, et al.
U.S. Appl. No. 14/233,912, filed Jan. 17, 2014, Perreault et al.
U.S. Appl. No. 13/744,352, filed Jan. 17, 2013, Perreault et al.
Chang et al.; "A Systems Approach to Photovoltaic Energy Extraction;" 27$^{th}$ Annual IEEE Applied Power Electronics Conference and Exposition; Feb. 5-9, 2012; 18 pages.
Pease; "What's All This Common-Centroid Stuff, Anyhow?;" Electronic Design; Oct. 1, 1996; 4 pages.
PCT Search Report and Written Opinion of the ISA dated May 31, 2013; for PCT Pat. App. No. PCT/US2013/21886; 12 pages.
PCT Search Report and Written Opinion of the ISA dated Jul. 26, 2013; for PCT Pat. App. No. PCT/US2013/21926; 12 pages.
PCT Search Report and Written Opinion of the ISA dated May 3, 2013; for PCT Pat. App. No. PCT/US2013/22001; 15 pages.
PCT Search Report and Written Opinion of the ISA dated Jun. 10, 2013; for PCT Pat. App. No. PCT/US2013/24552; 14 pages.

SYSTEMS APPROACH TO PHOTOVOLTAIC ENERGY EXTRACTION

RELATED APPLICATIONS

This application is a U.S. National Stage application under 35 U.S.C. §371 of PCT Application PCT/US2013/024552 (filed Feb. 3, 2013), which is incorporated here by reference in its entirety.

FIELD OF THE INVENTION

This application generally relates to photovoltaic (PV) systems and more particularly to methods and apparatus for photovoltaic energy extraction.

BACKGROUND

As is known in the art, asymmetries in a photovoltaic (PV) string caused by temperature variation, dirt, panel aging, panel orientation, and other factors can negatively impact tracking efficiency. To maximize energy extraction, distributed power conversion is employed to enable per-panel or sub-panel maximum-power-point tracking (MPPT). There are essentially three common architectures deployed in residential and commercial PV installations for delivering power to the grid: (1) string inverter, (2) micro-inverter, and (3) DC-DC series power supplies working in concert with a string inverter. Each of these architectures has limitations.

For example, the existing approaches are typically constructed with magnetic components, possibly purchased on a per-panel basis. Even at high switching frequencies where magnetic component size can be minimized or eliminated by using air core or parasitic wire inductance, these components constrain manufacturing cost. High frequency switching may also complicate electromagnetic interface created by the distributed converters, as the frequencies approach allocated FCC bands.

SUMMARY

The circuits, systems and techniques described herein can overcome the limitations of the prior art techniques.

In one aspect, described herein is a method and apparatus for per-panel photovoltaic energy extraction with integrated converters. It has been recognized that this approach can increase overall array tracking efficiency.

It has also been recognized that such a system architecture can be implemented at all levels in a photovoltaic (PV) array: for the panels, for the overall control, and for the interface to the utility.

Also described is a grid-tie inverter interface with SC DC-DC MICs.

In accordance with a further aspect of the circuits, systems and techniques described herein, a solar cell circuit includes a solar cell; and a switched-capacitor DC-DC converter deployed with the solar cell during or after manufacturing of the cell and wherein said switched-capacitor DC-DC converter is provided having a plurality of conversion levels and wherein the switched-capacitor DC-DC converter is provided having a conversion level selected such that a current provided by the solar cell is close to the maximum power current of the solar cell.

In one embodiment, the switched-capacitor DC-DC converter is partially or fully integrated with the solar cell using an integrated circuit manufacturing process.

In one embodiment, the integrated portions of the DC-DC converter can be manufactured on the same substrate material as the solar cell.

In accordance with a further aspect of the circuits, systems and techniques described herein, a solar sub-module string comprising a plurality of solar cell circuits each of the plurality of solar cell circuits comprising: a solar cell; and a switched-capacitor DC-DC converter deployed with the solar cell during or after manufacturing and wherein said switched-capacitor DC-DC converter is provided having a plurality of conversion levels and wherein the switched-capacitor DC-DC converter is provided having a conversion level selected such that a current provided by the solar cell is close to the maximum power current of the solar cell; and a switched-capacitor DC-DC converter deployed with the plurality of solar cell circuits and wherein said switched-capacitor DC-DC converter is provided having a plurality of conversion levels and wherein the switched-capacitor DC-DC converter is provided having a conversion level selected such that a current provided by the plurality of solar cell circuits is close to the maximum power current of the plurality of solar cell circuits; and wherein each of the plurality of solar cell circuits are coupled to provide the solar sub-module string.

In accordance with a further aspect of the circuits, systems and techniques described herein, a photo-voltaic (PV) module includes: a plurality of solar sub-module strings each of the plurality of solar sub-module strings comprising: a plurality of solar cell circuits; and a switched-capacitor DC-DC converter deployed with the plurality of solar cell circuits and wherein said switched-capacitor DC-DC converter is provided having a plurality of conversion levels and wherein the switched-capacitor DC-DC converter is provided having a conversion level selected such that a current provided by the plurality of solar cell circuits is close to the maximum power current of the plurality of solar cell circuits; and a switched-capacitor DC-DC converter deployed with the plurality of solar sub-module strings and wherein said switched-capacitor DC-DC converter is provided having a plurality of conversion levels and wherein the switched-capacitor DC-DC converter is provided having a conversion level selected such that a current provided by the plurality of solar sub-module strings is close to the maximum power current of the plurality of solar sub-module strings; and wherein each of the plurality of solar cell circuits are coupled to provide a plurality of solar sub-module strings and each of the plurality of solar sub-module strings are coupled to provide the PV module.

In accordance with a further aspect of the circuits, systems and techniques described herein, a grid-tie inverter for coupling a PV array to a power grid, the grid-tie inverter comprising: an MPPT tracking loop; an energy balance control loop; and means for providing output current amplitude control, said means for providing current amplitude control comprising: a feed-forward path comprising means for determining a feed-forward term; and a feedback patch comprising means for determining a feedback term.

In one embodiment, the grid-tie inverter further includes means for decoupling the MPPT tracking loop and the energy balance control loop such that the system operates more stably by relying more heavily on a feedforward term generated by the means for determining a feed-forward term than a feedback term generated by the means for determining a feedback term.

In accordance with a still further aspect of the circuits, systems and techniques described herein, a grid-tie inverter for coupling a PV array to a power grid, the grid-tie inverter comprising: an MPPT tracking loop; an energy balance control loop; and a switched-capacitor energy buffer; and means for providing output current amplitude control, said means for providing current amplitude control comprising: a feedforward path comprising means for determining a feed-forward term; and a feedback patch comprising means for determining a feedback term.

In one embodiment, the grid-tie inverter further includes means for decoupling the MPPT tracking loop and the energy balance control loop such that the system operates more stably by relying more heavily on a feedforward term generated by the means for determining a feed-forward term than a feedback term generated by the means for determining a feedback term.

In one embodiment, the MPPT tracking loop is controlled by an input current sink.

In one embodiment, the feedforward path can force a resample mid-cycle (at the price of non-unity power factor for one cycle) to prevent an energy buffer capacitor voltage from running out of range and wherein the forced resample may be triggered by passing a PV array voltage through a high-pass filter and level detectors to check for sudden large steps in input power.

In one embodiment, the control of the switched-capacitor energy buffer can be derived from the measured input power from the PV array without the need of a pre-charge circuit and wherein the charge and discharge cycles of a capacitor is only permitted when the said capacitor's voltage is within the maximum and minimum bounds derived from the measured input power from the PV array.

Switched-capacitor (SC) techniques have been proposed for energy buffering applications between DC and AC grids. These techniques have been implemented using film or ceramic capacitors and have been shown to achieve high energy utilization and comparable effective energy density to electrolytic capacitors. Practical applications require control schemes capable of handling transients. Described herein concepts, systems, circuit and techniques which consider tradeoffs regarding circuit topology, switching configuration, and control complexity. In one embodiment, a two-step control methodology that mitigates undesirable transient responses is described.

BRIEF DESCRIPTION OF THE DRAWINGS

The foregoing features of the concepts, systems, circuits and techniques described herein may be more fully understood from the following description of the drawings in which.

for different feedback gain k.

Figure 17:
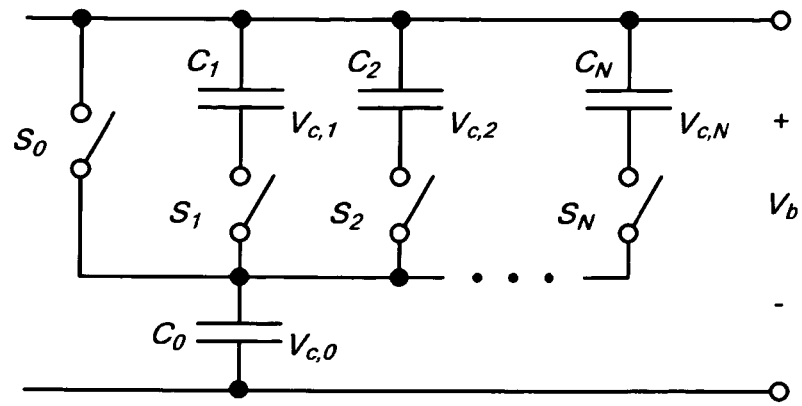

FIG. 17 is a switched-capacitor energy buffer implementation.

Figure 18:
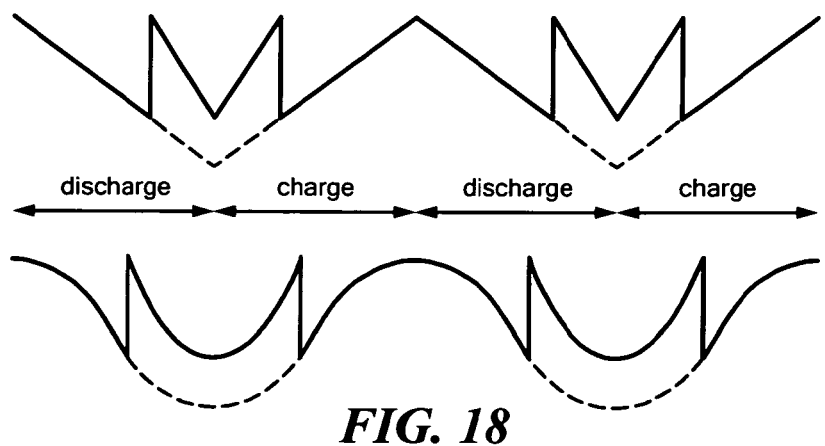

FIG. 18 is a switched-capacitor charge and discharge waveforms.

Figure 19A:
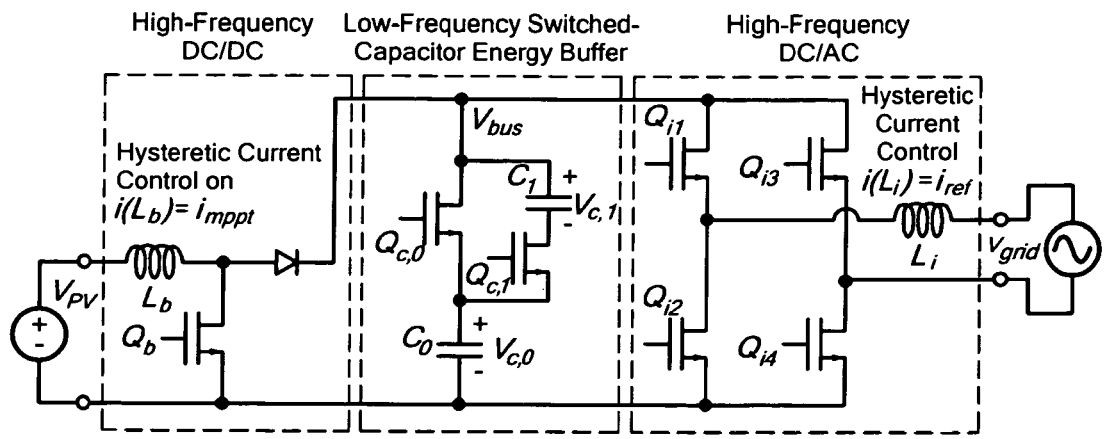
Figure 19B:
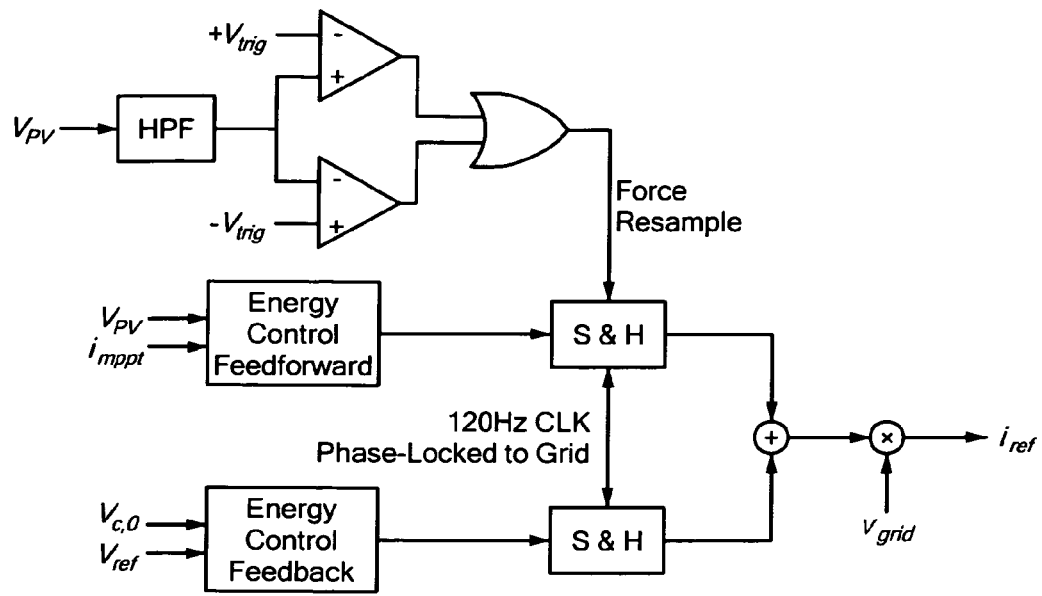
Figure 19C:
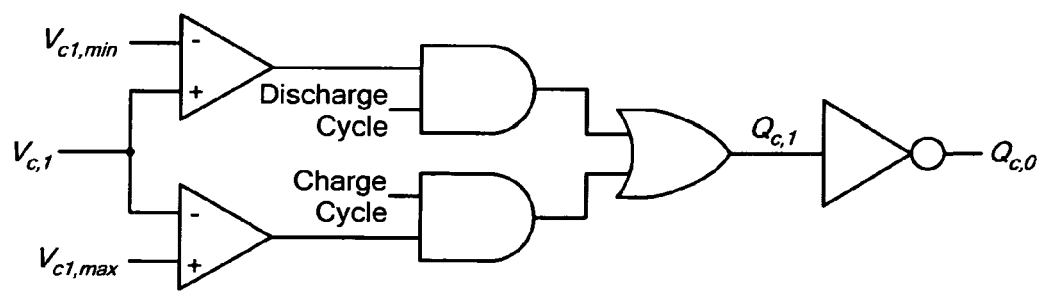

FIGS. 19A, 19B and 19C are overall system-level block diagrams and control schemes implemented in SPICE simulation. FIG. 19A is a system overview of the simulated circuit, FIG. 19B is an energy balance controller with feedforward forced resampling, FIG. 19C illustrates preliminary switched-bus-capacitor control logic.

Figure 20A:
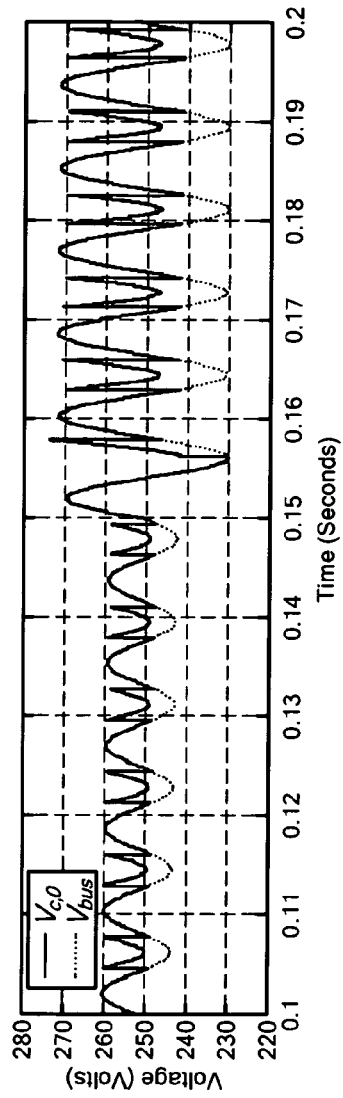
Figure 20B:
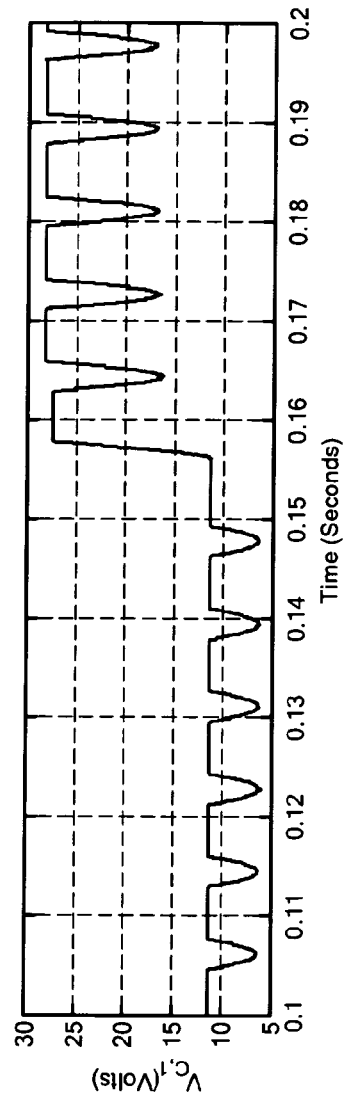
Figure 20C:
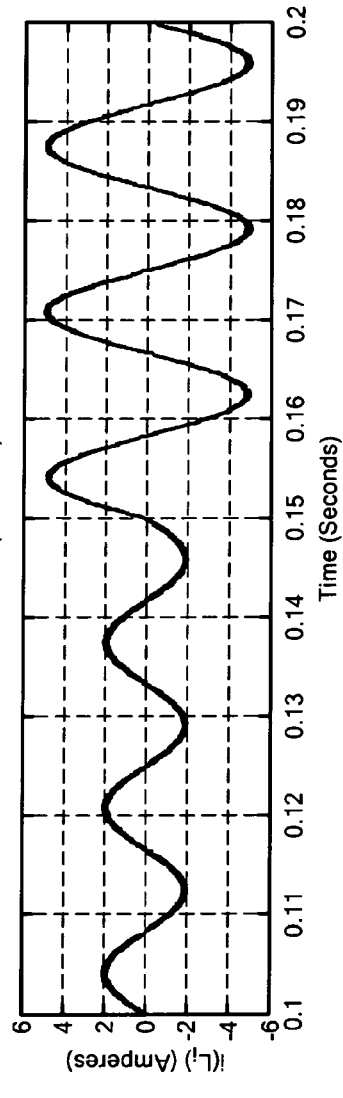

FIGS. 20A-20C are a series or plots illustrating system voltages $V_{C,0}$, $V_{bus}$, $V_{c,1}$ and current $I(L_1)$ in response to an Input voltage step from 40V to 100V and $i_{mppt}=4$ A which occurs after 150 ms.

Figure 21:
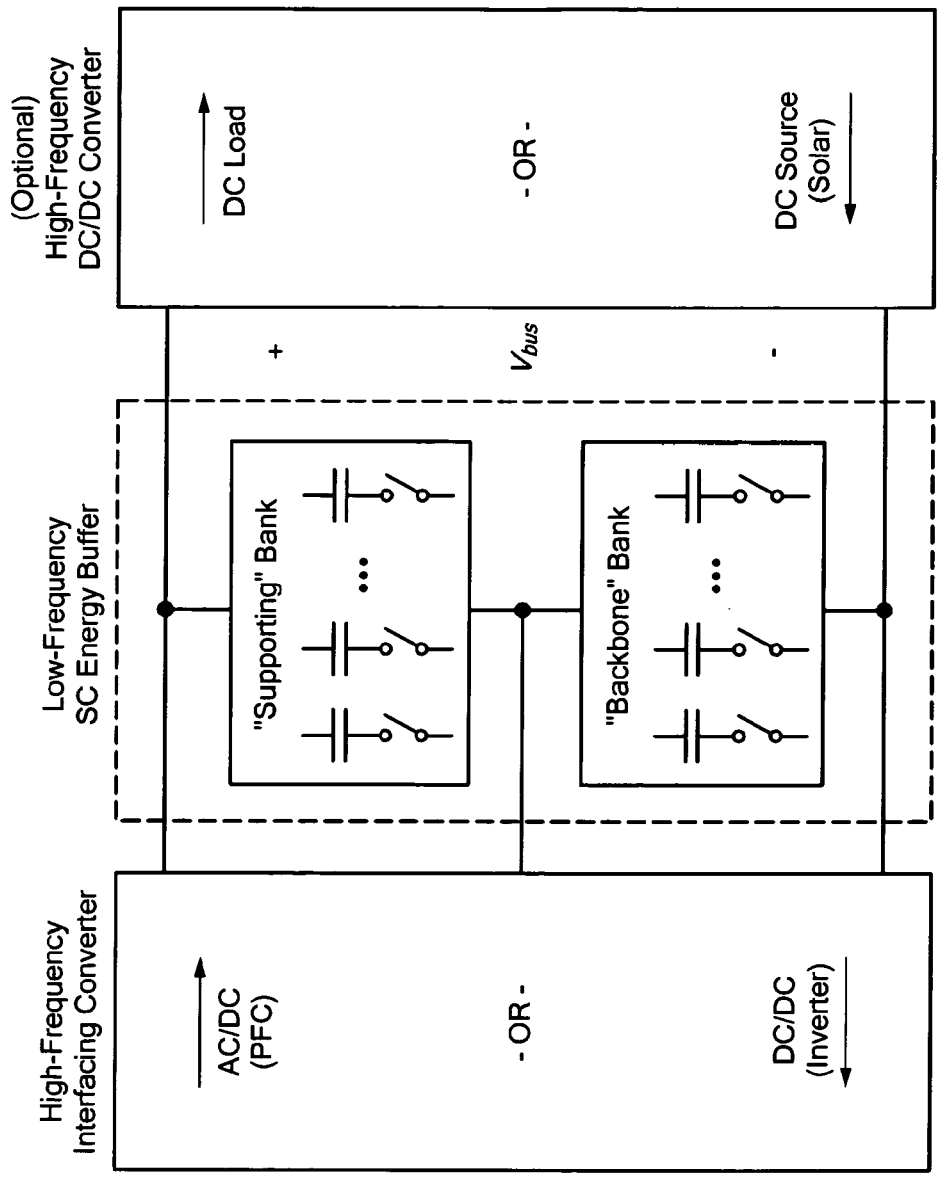

FIG. 21 is a block diagram of a general architecture of an SC energy buffer.

Figure 22A:
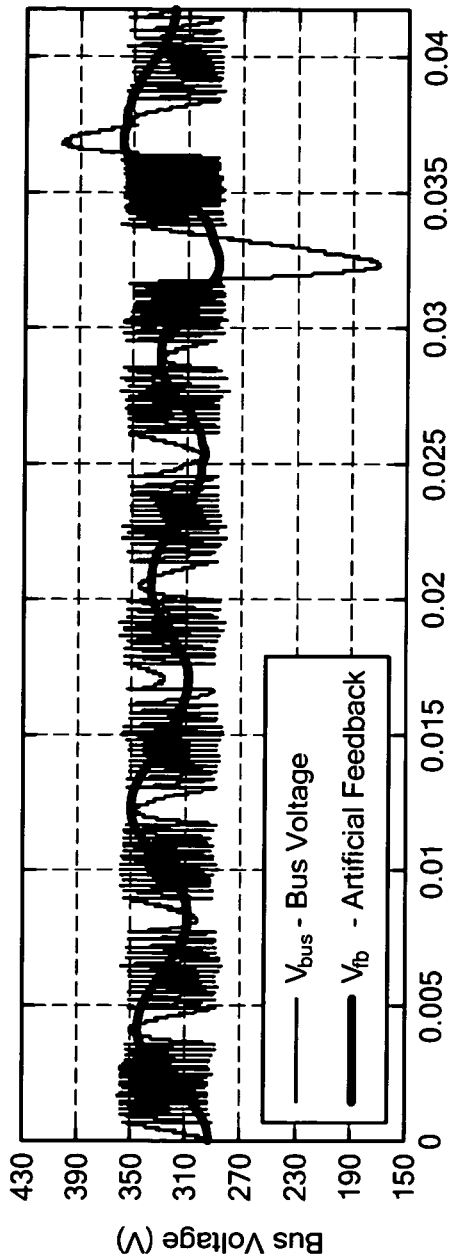

FIG. 22A is a plot of Vbus and Vfb vs. time.

Figure 22B:
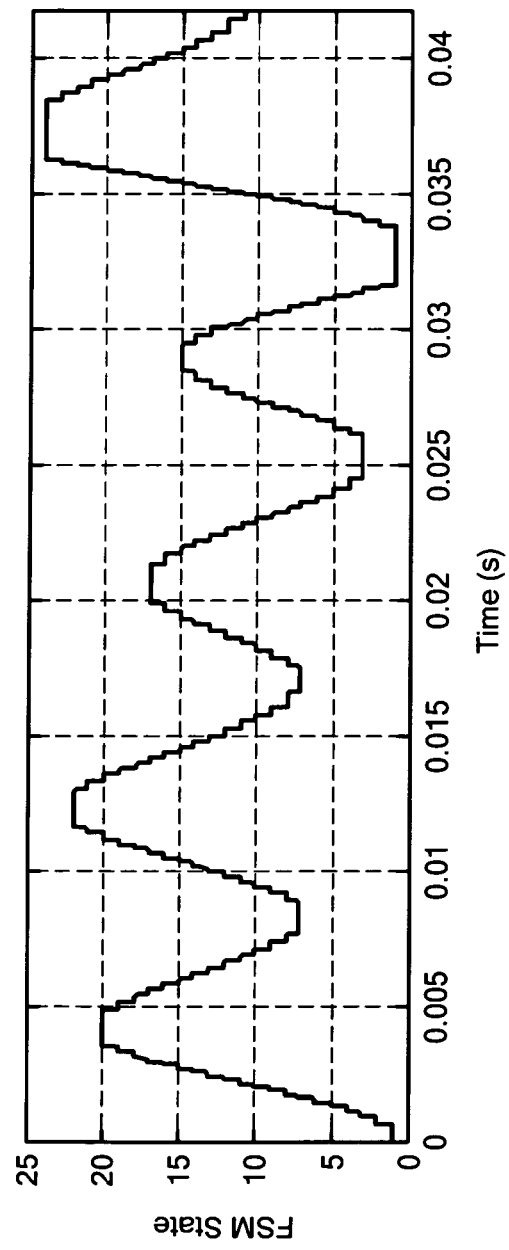

FIG. 22B is a plot of FSM state vs. time which illustrates a transient bus voltage response of a 2-6 SC energy buffer in a PFC due to a 30% load power step.

Figure 23A:
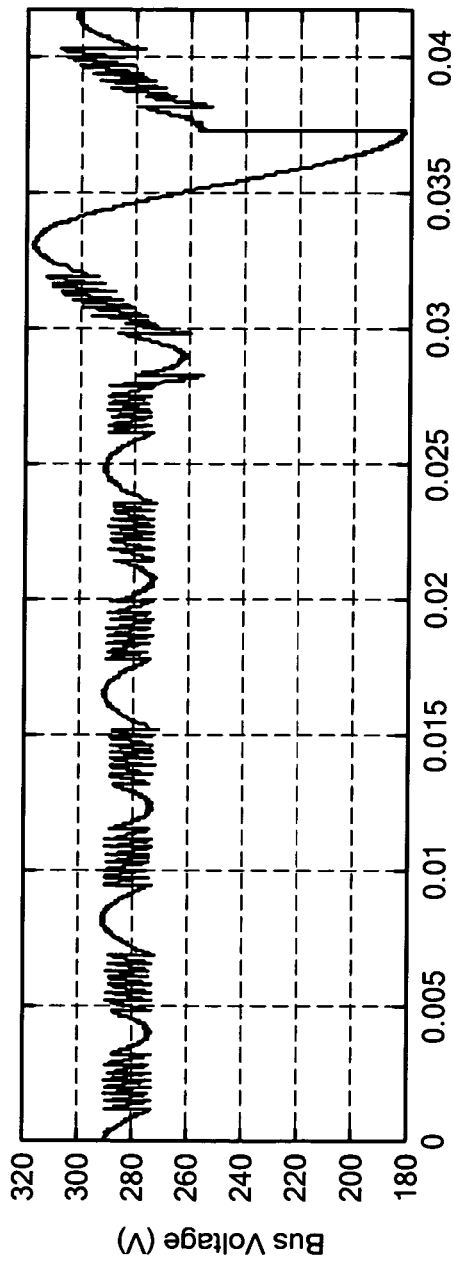
Figure 23B:
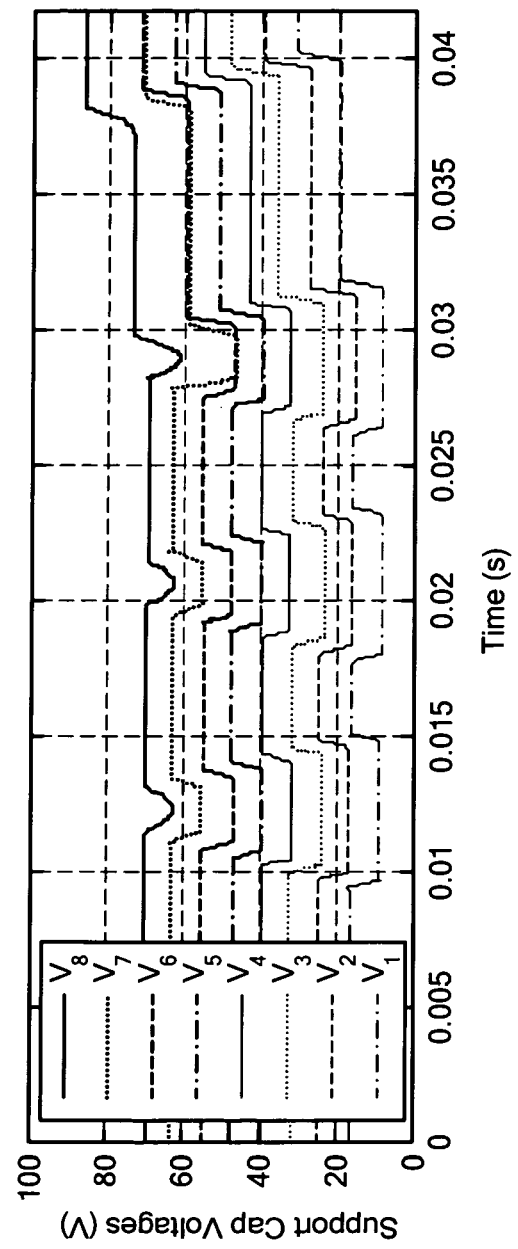
Figure 24A:
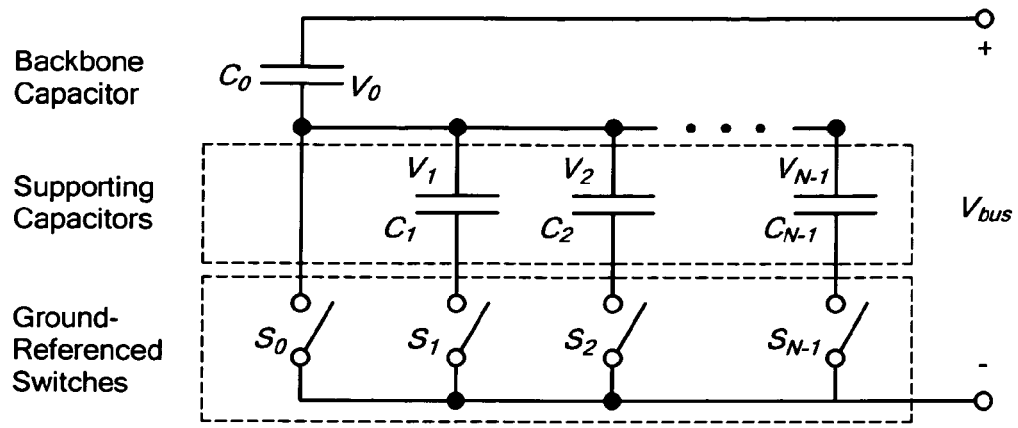

FIGS. 23A, 23B are plots of support voltages and buffer voltage vs. time which illustrate a transient bus voltage response of a 1-8 SC energy buffer in a solar inverter due to a 30% input power step FIG. 24A is block diagram of a 1-z architecture of an SC energy buffer implemented with ground-referenced switches only for unipolar switching configuration.

Figure 24B:
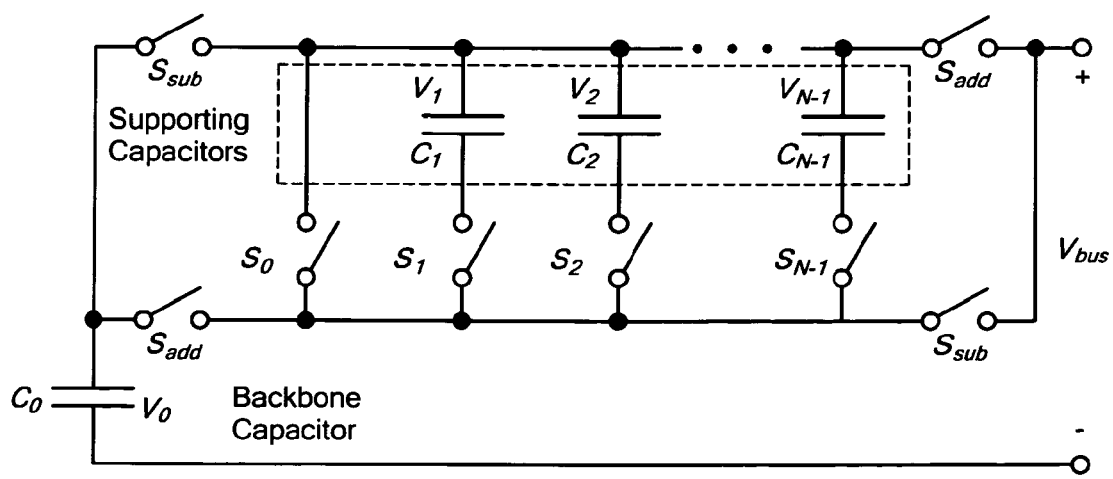

FIG. 24B is a block diagram of a 1-z architecture of an SC energy buffer implemented with four additional switches (as compared with the FIG. 24A implementation), to achieve bipolar switching configuration.

Figure 25A:
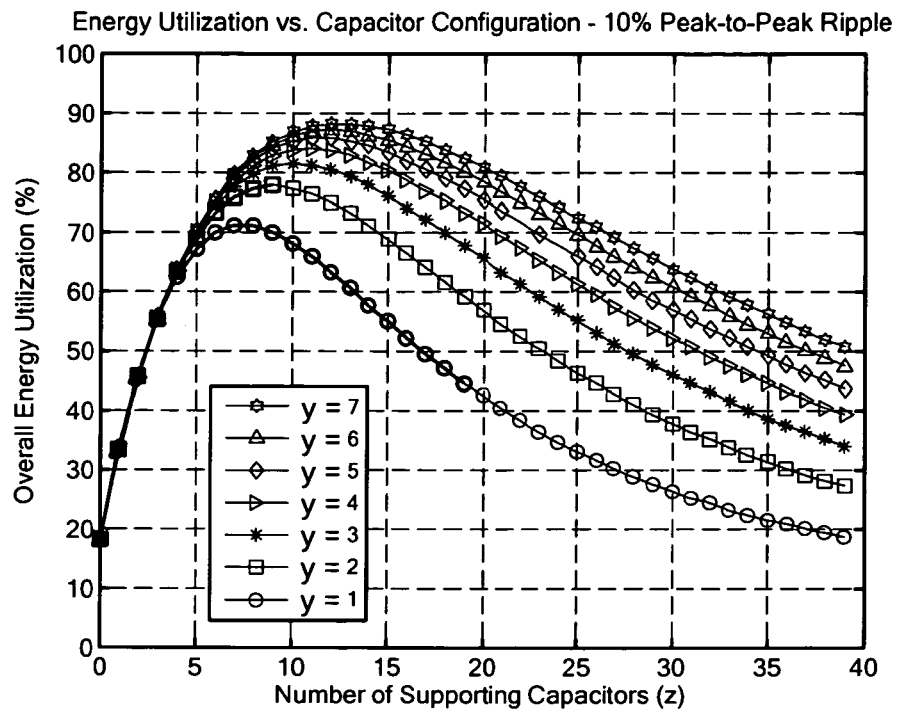

FIG. 25A is a plot of overall energy utilization (in percent) of an SC energy buffer with bipolar switching configuration versus different numbers of backbone and supporting capacitors for a 10% peak-to-peak ripple.

Figure 25B:
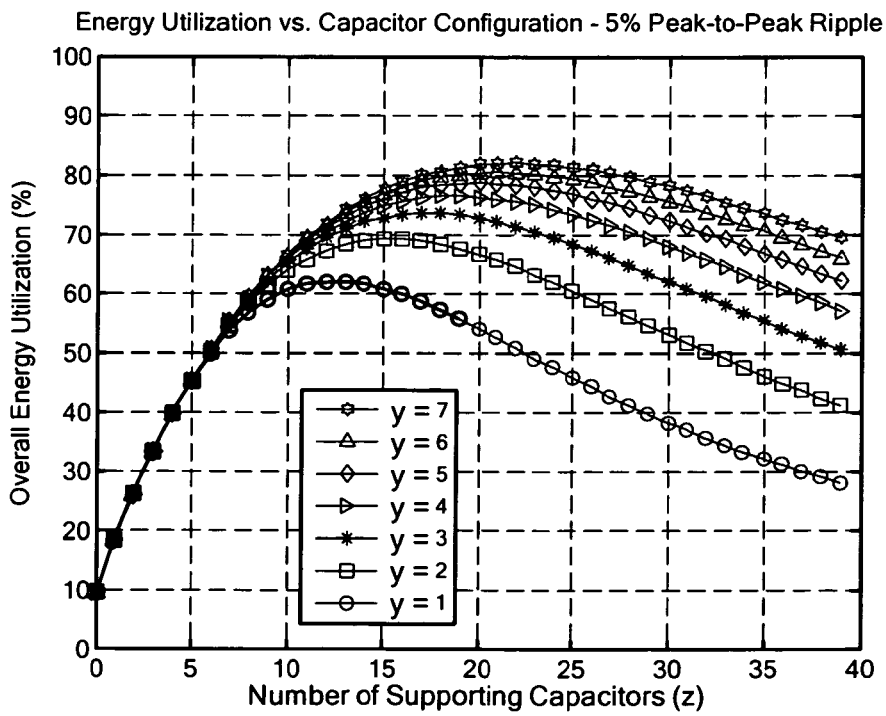

FIG. 25B is a plot of overall energy utilization (in percent) of an SC energy buffer with bipolar switching configuration versus different numbers of backbone and supporting capacitors for a 5% peak-to-peak ripple.

Figure 25C:
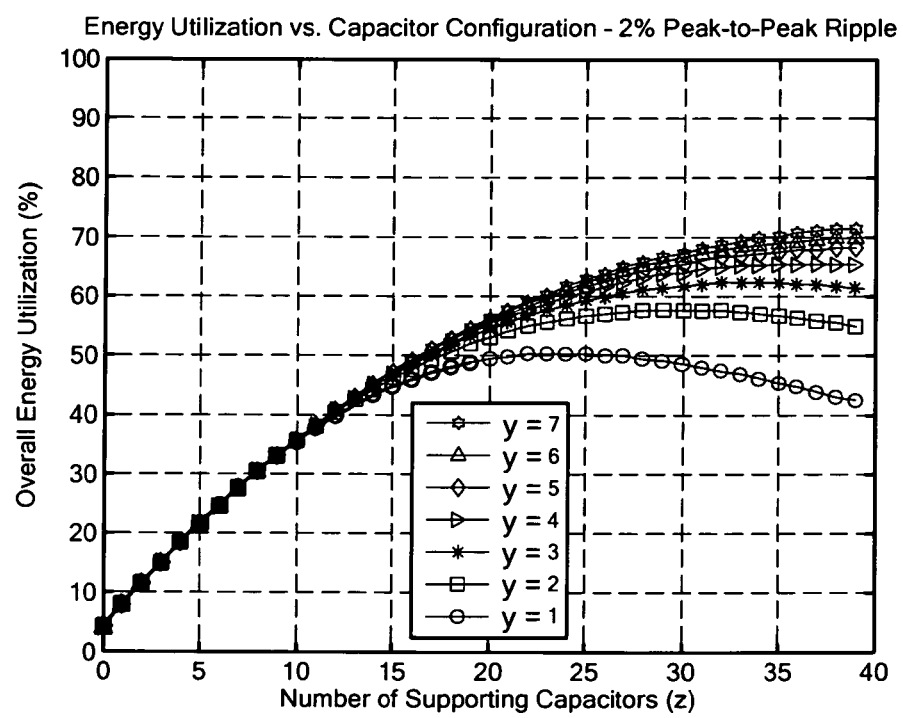

FIG. 25C is a plot of overall energy utilization (in percent) of an SC energy buffer with bipolar switching configuration versus different numbers of backbone and supporting capacitors for a 2% peak-to-peak ripple.

Figure 26A:
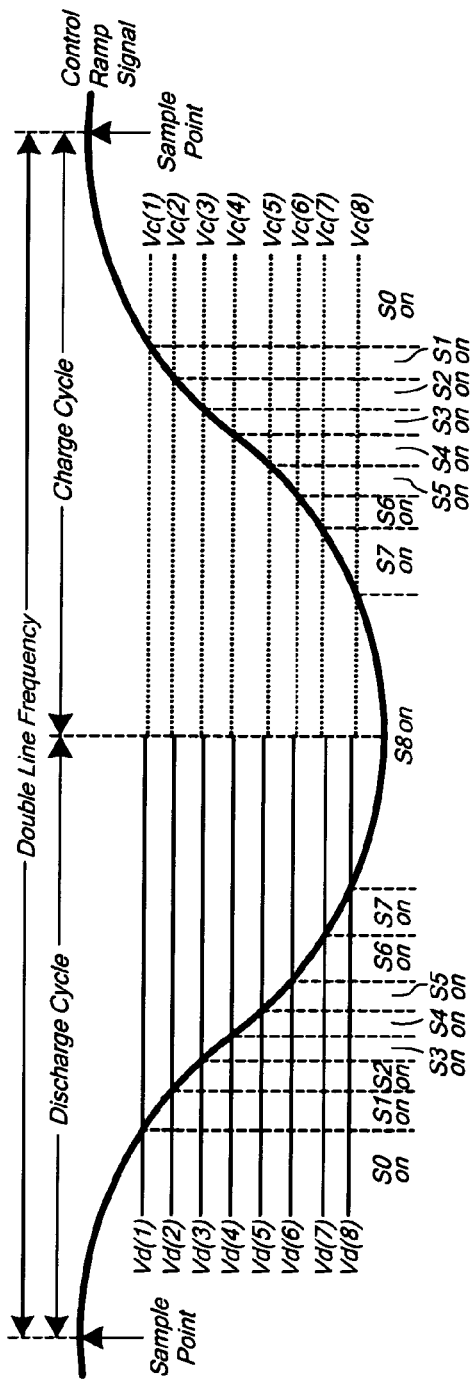

FIG. 26A is a plot of sampling points and control variables, $v_c(i)$ and $v_d(i)$, in relation to the ripple cycle and the control ramps for a unipolar switching configuration.

Figure 26B:
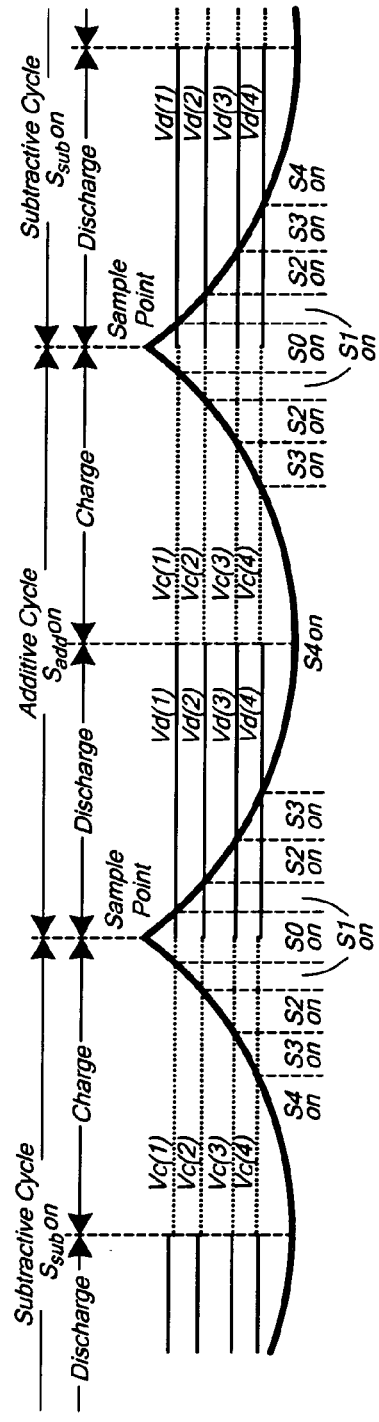

FIG. 26B is a plot of sampling points and control variables, $v_c(i)$ and $v_d(i)$, in relation to the ripple cycle and the control ramps for a bipolar switching configuration.

Figure 27A:
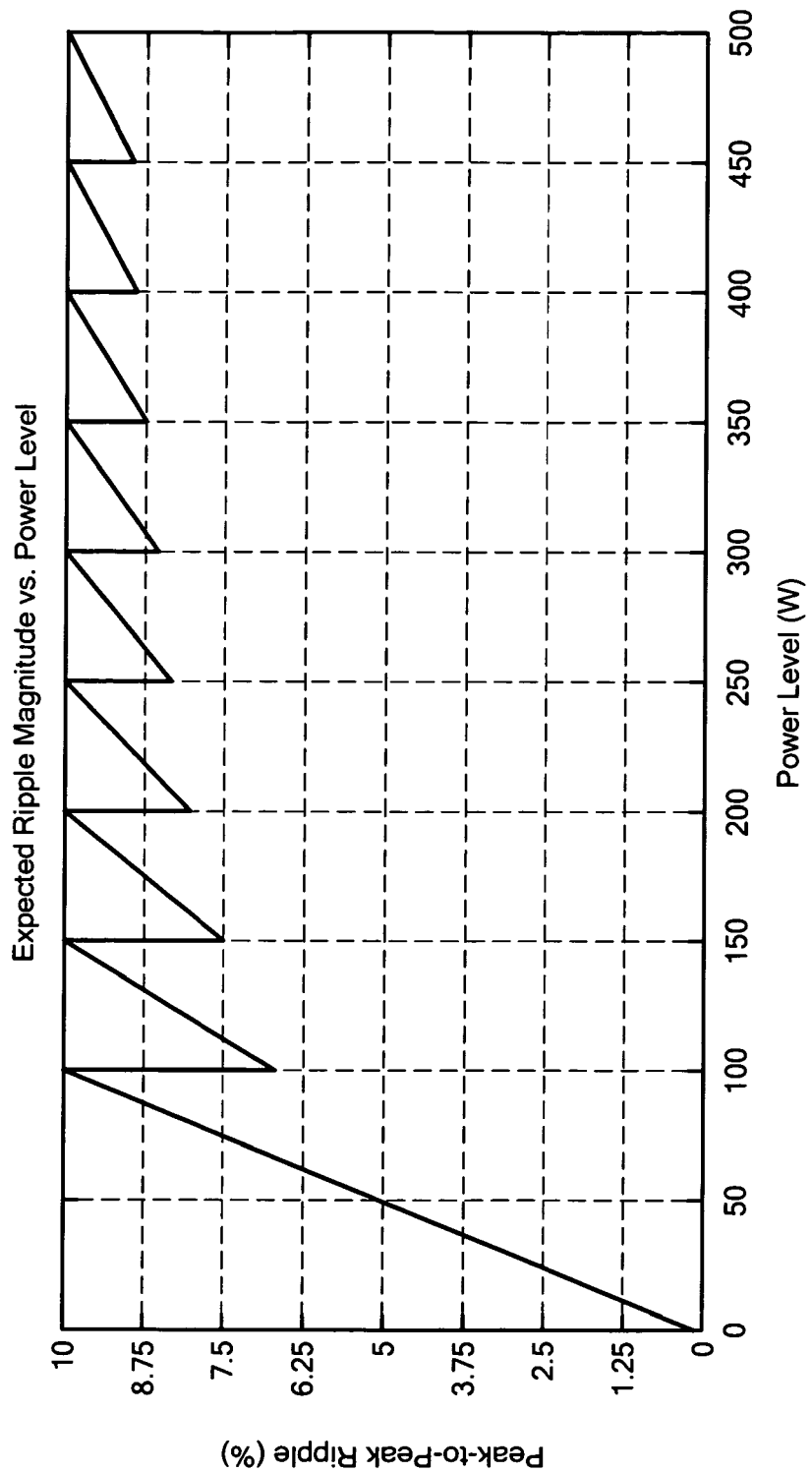

FIG. 27A is a plot of peak-to-peak ripple vs. power level which illustrates expected ripple magnitude vs. power level for a 1-8 unipolar design example.

Figure 27B:
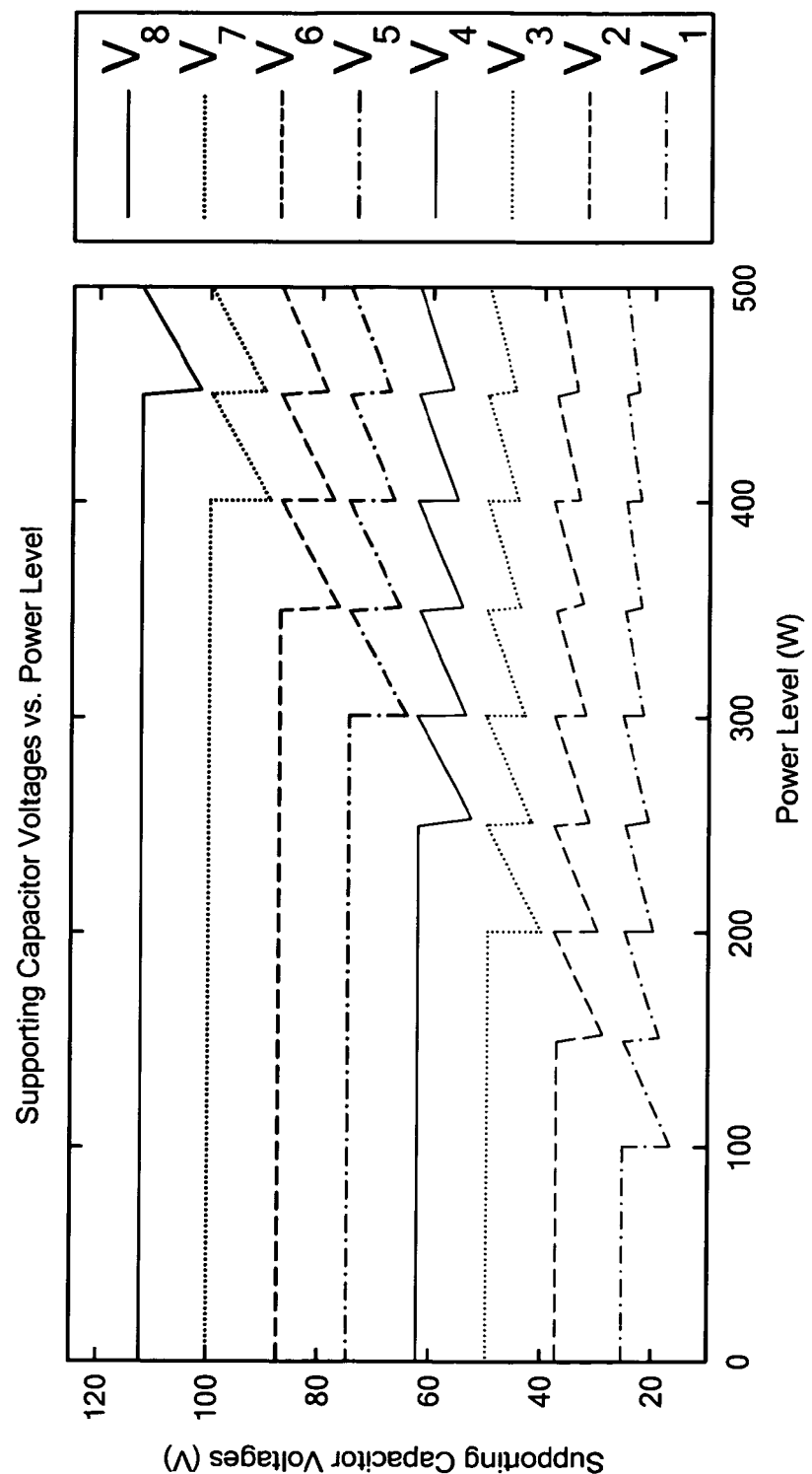

FIG. 27B is a plot of supporting capacitor voltages (V) vs. power level (watts) for a 1-8 unipolar design example.

Figure 28:
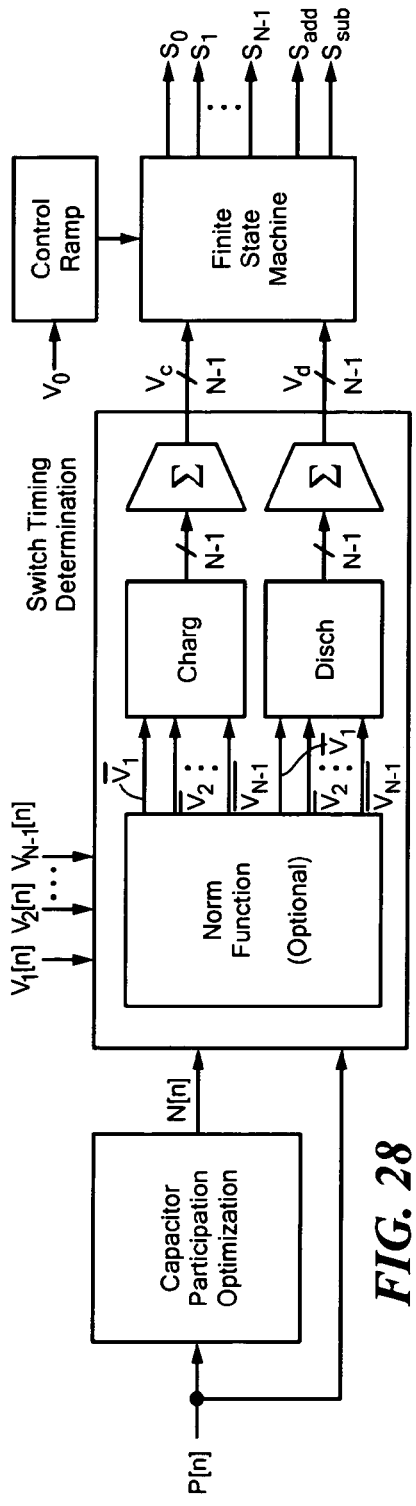

FIG. 28 is a block diagram of a two-level SC energy buffer controller, where $v_0$ denotes the backbone capacitor voltage, $v_i[n]$ for $i=\{1, 2, \ldots, N-1\}$ and $v_c$ denotes the sampled supporting capacitor voltage, and $v_d$ corresponds to the charge and discharge control signals respectively.

Figure 29A:
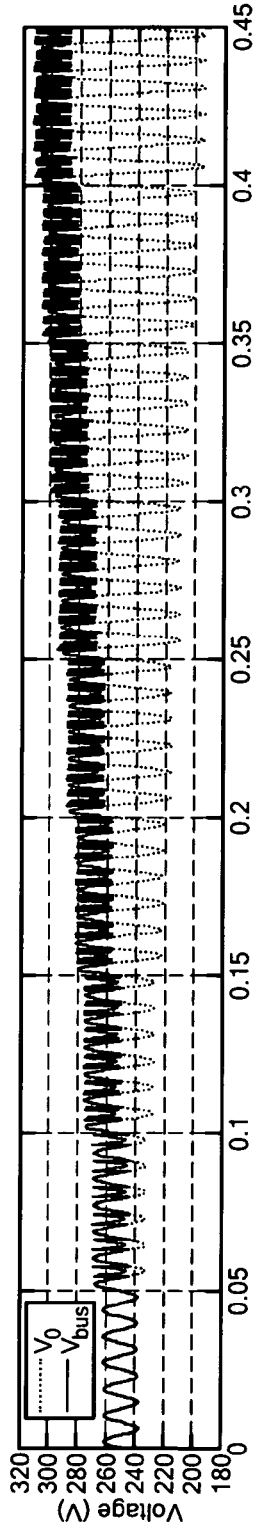
Figure 29B:
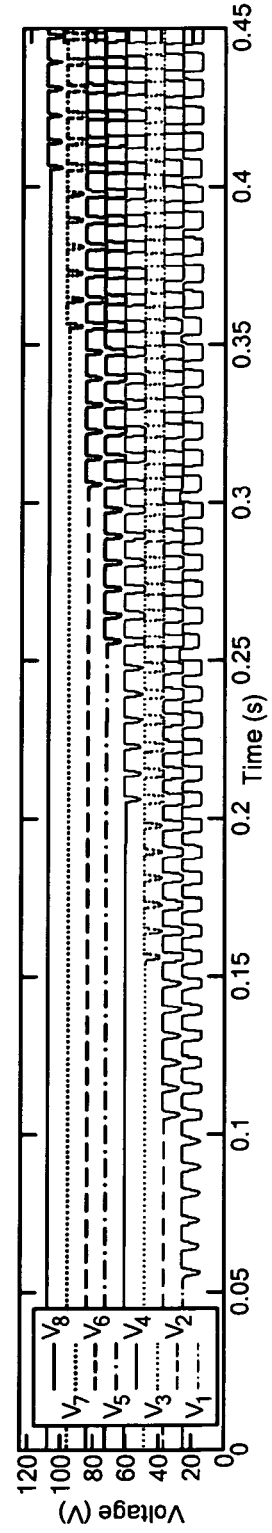

FIGS. 29A, 29B are plots of voltage (V) vs. time (seconds) which illustrate steady-state bus voltage waveforms of a 1-9 SC energy buffer with unipolar switching.

Figure 29C:
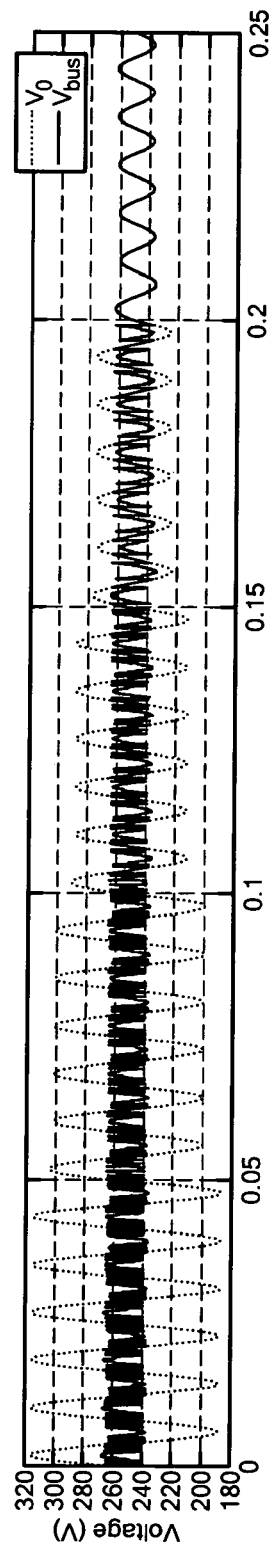
Figure 29D:
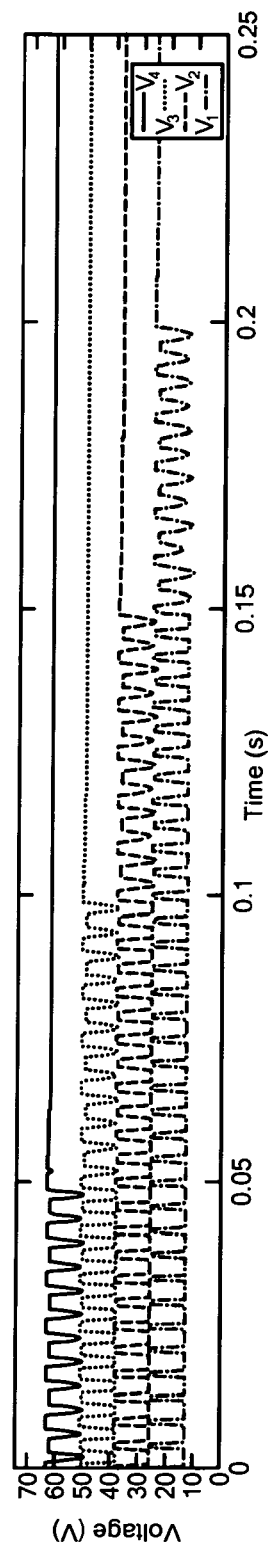

FIGS. 29C, 29D are plots of voltage (V) vs. time (seconds) which illustrate steady-state bus voltage waveforms of a 1-4 bipolar SC energy buffer with bipolar switching.

Figure 30A:
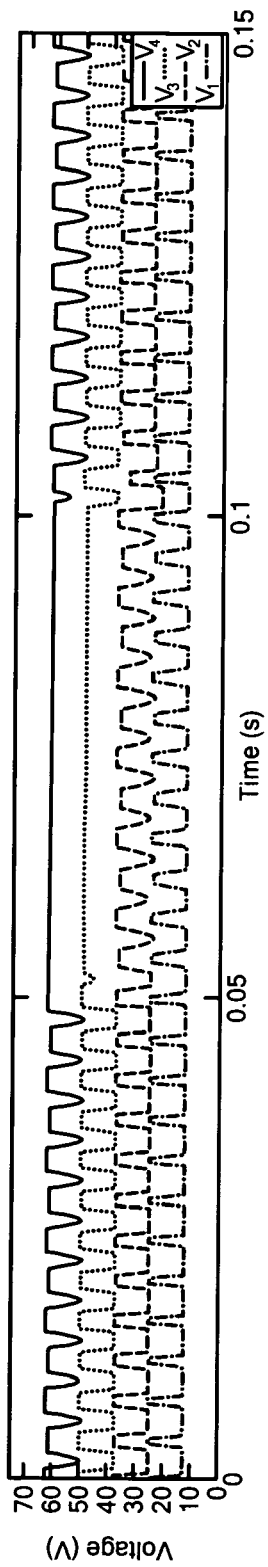
Figure 30B:
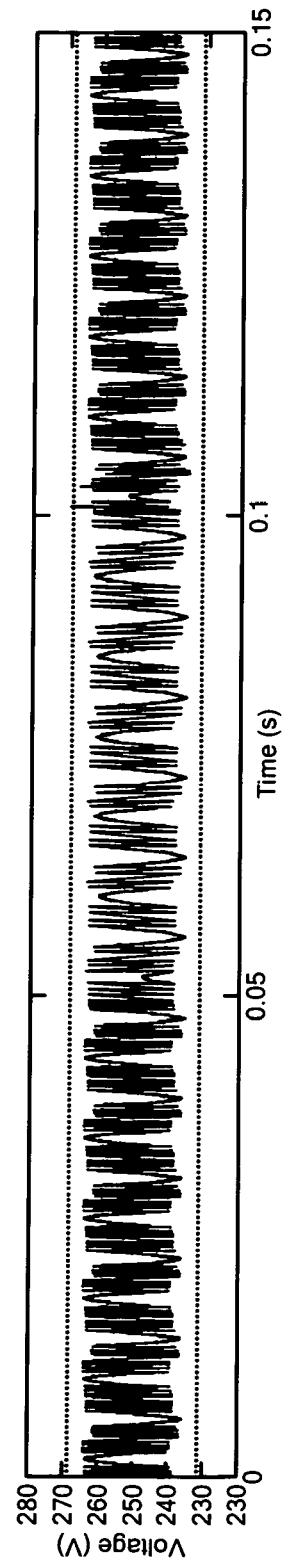

FIGS. 30A, 30B are plots of voltage (V) vs. time (seconds) which illustrate a transient bus voltage response of a 1-4 bipolar SC energy buffer in a solar inverter due to 30% input power step.

Figure 31:
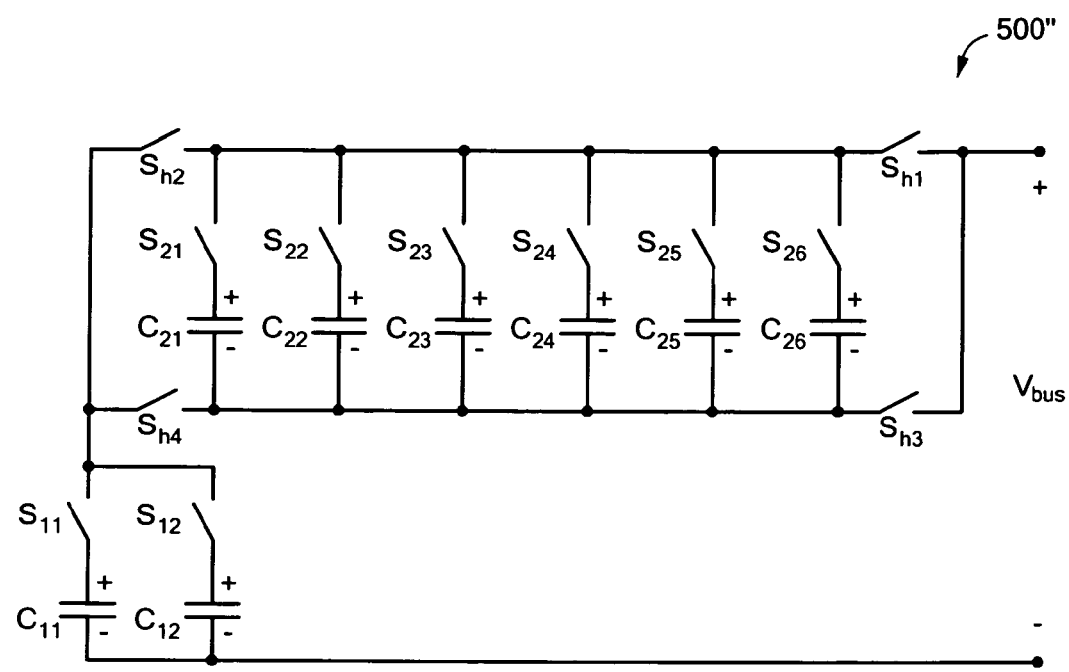

FIG. 31 is a circuit diagram of an exemplary SSC energy buffer circuit referred to as a 2-6 bipolar SSC energy buffer circuit.

Figure 32:
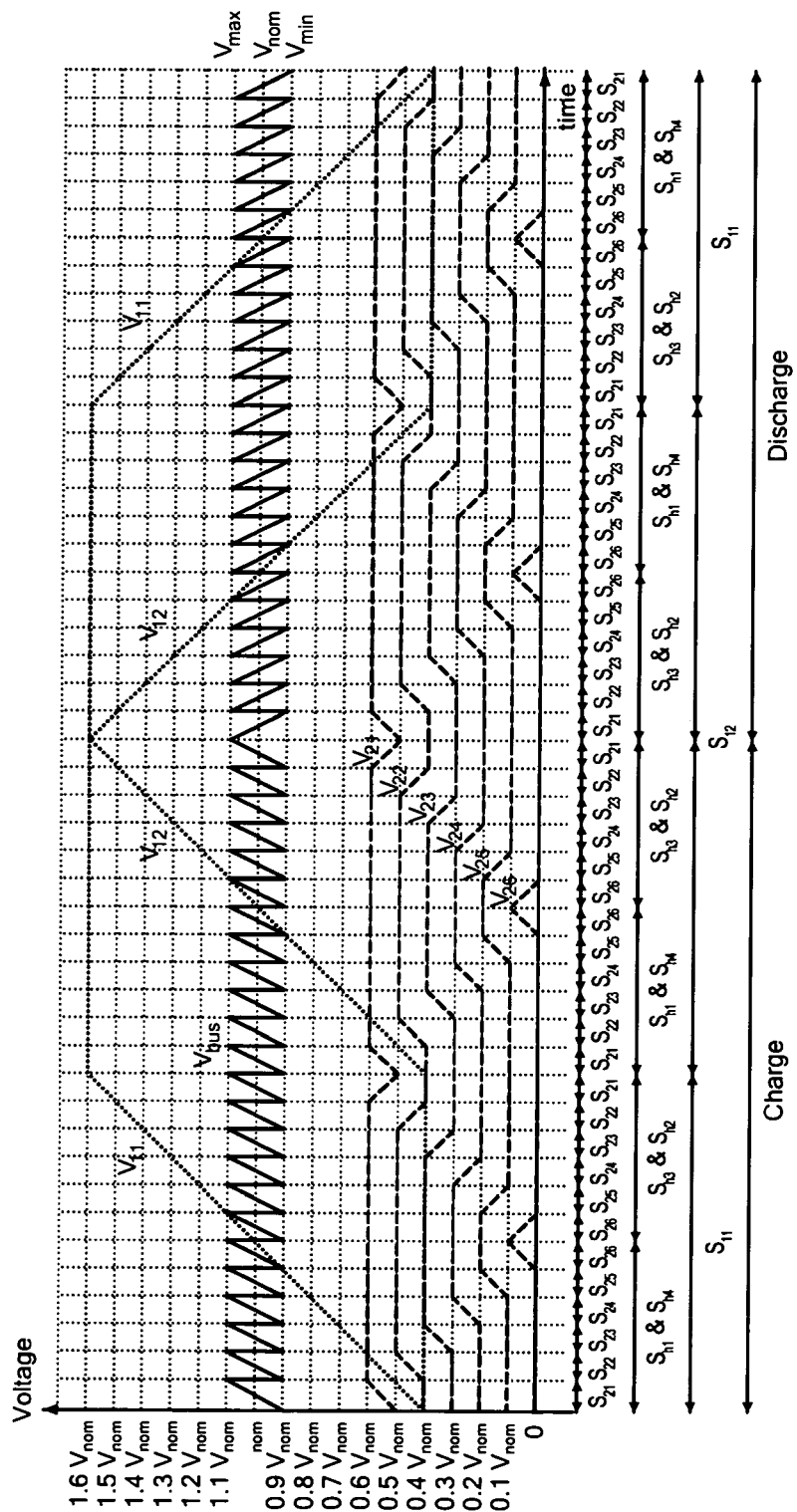

FIG. 32 is a plot which illustrates which states, individual capacitor voltages, and resulting bus voltage over a charge and discharge cycle of the 2-6 bipolar SSC energy buffer of FIG. 4.

Figure 33:
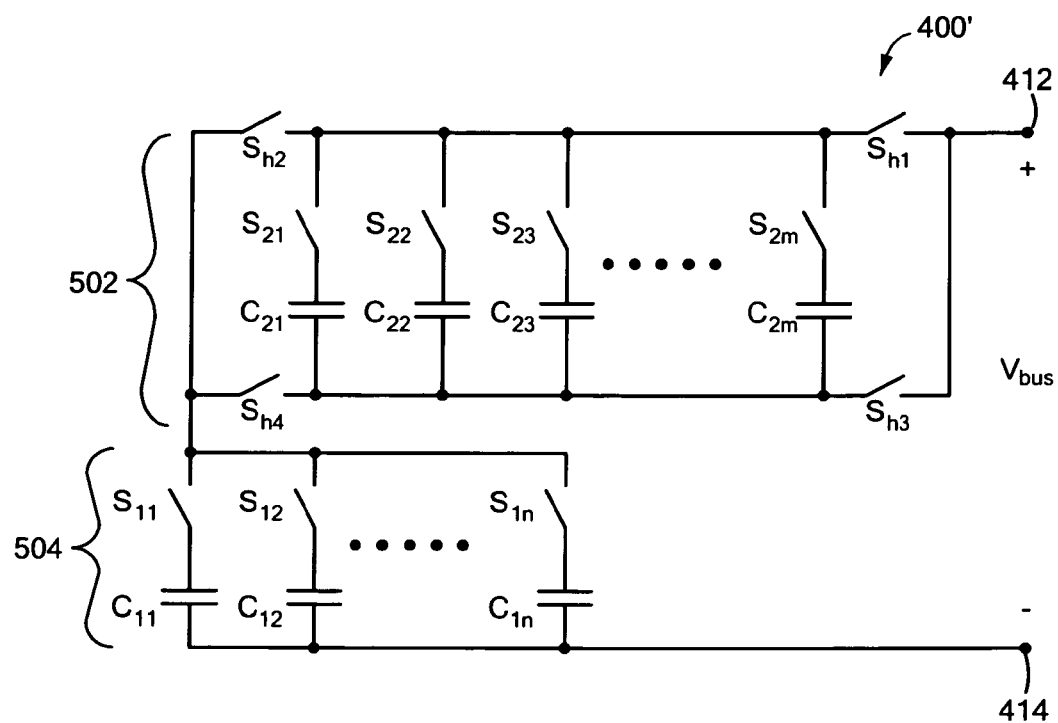

FIG. 33 is a circuit diagram of a generalized example of an SSC energy buffer circuit referred to as an n-m bipolar SSC energy buffer circuit.

Figure 34A:
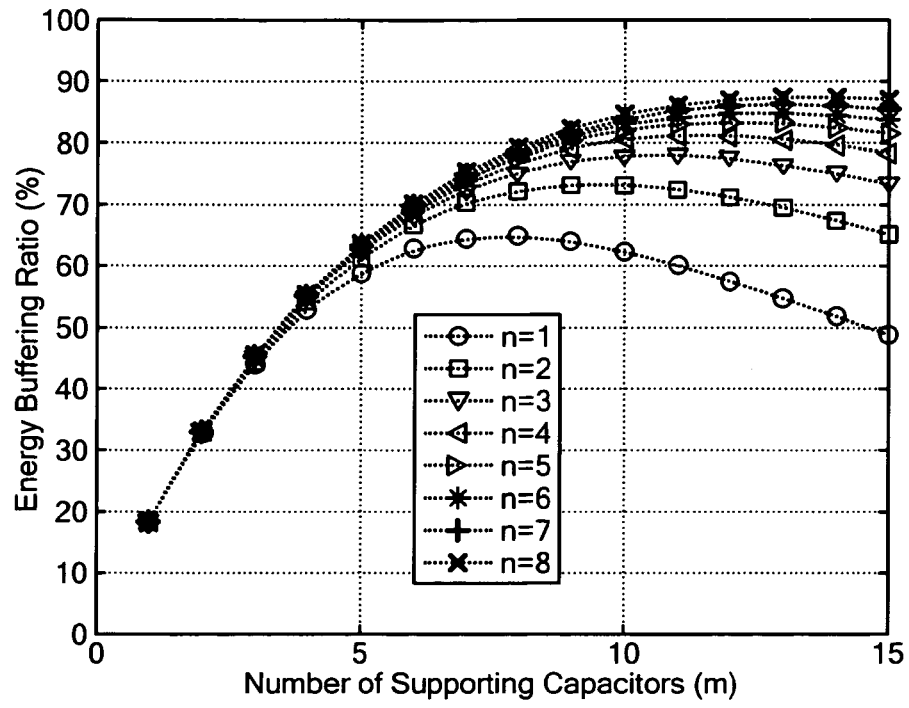
Figure 34B:
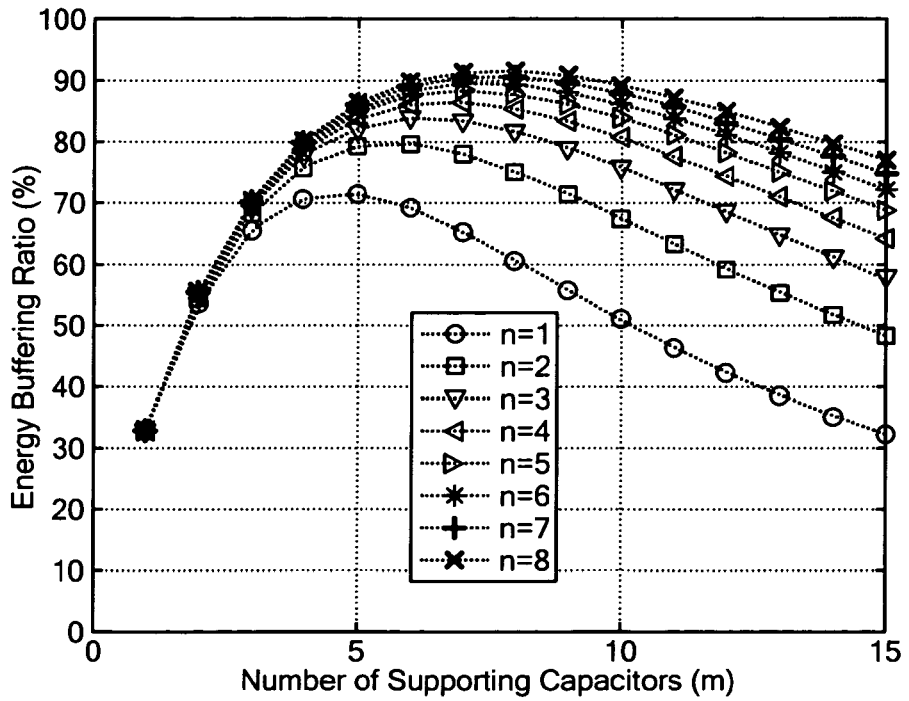
Figure 34C:
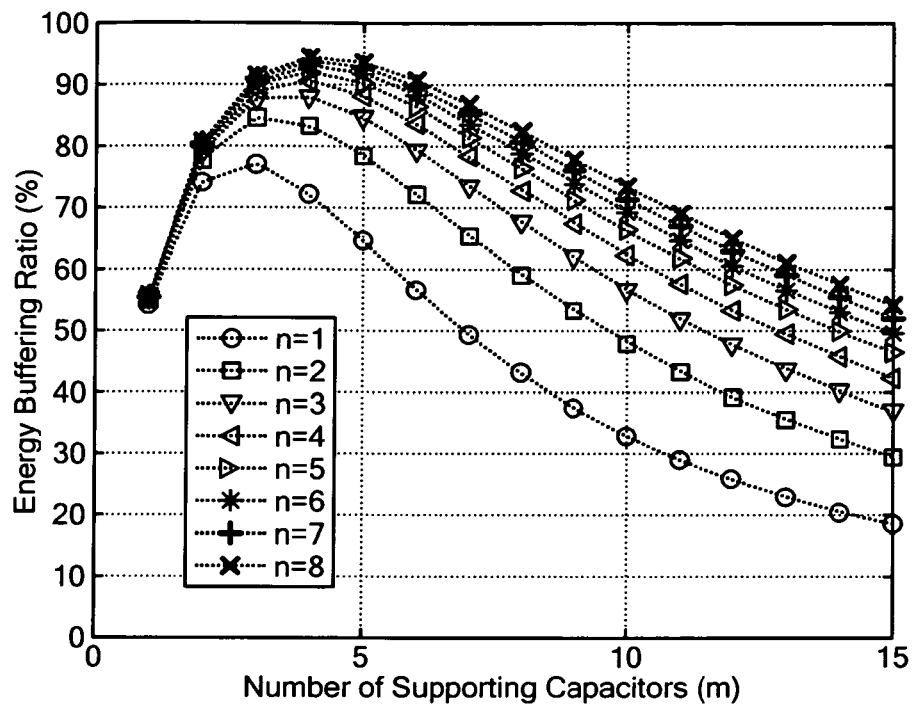

FIGS. 34A, 34B, and 34C are a series of plots illustrating Energy buffering ratio ($\Gamma_b$) as a function of the number of backbone capacitors n and number of supporting capacitors m for different values of voltage ripple ratio: (a) Rv=5%, (b) Rv=10% and (c) Rv=20%.

Figure 35A:
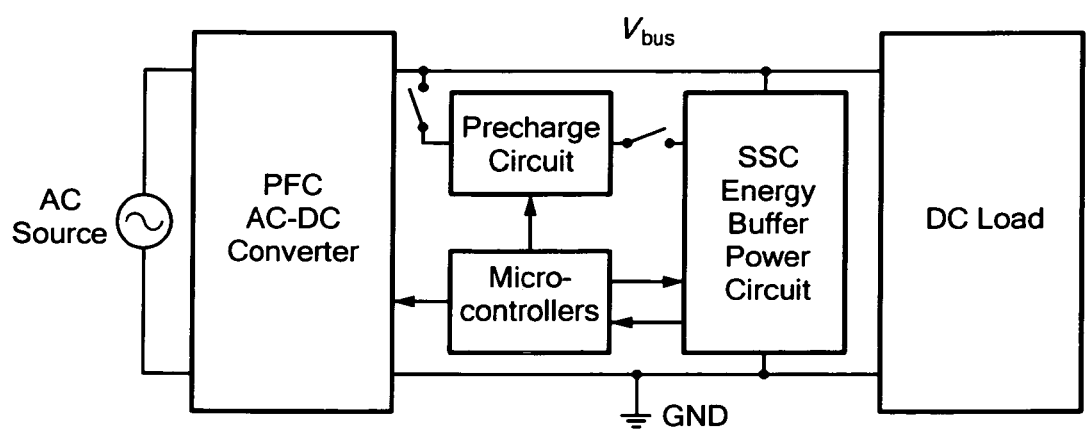
Figure 35B:
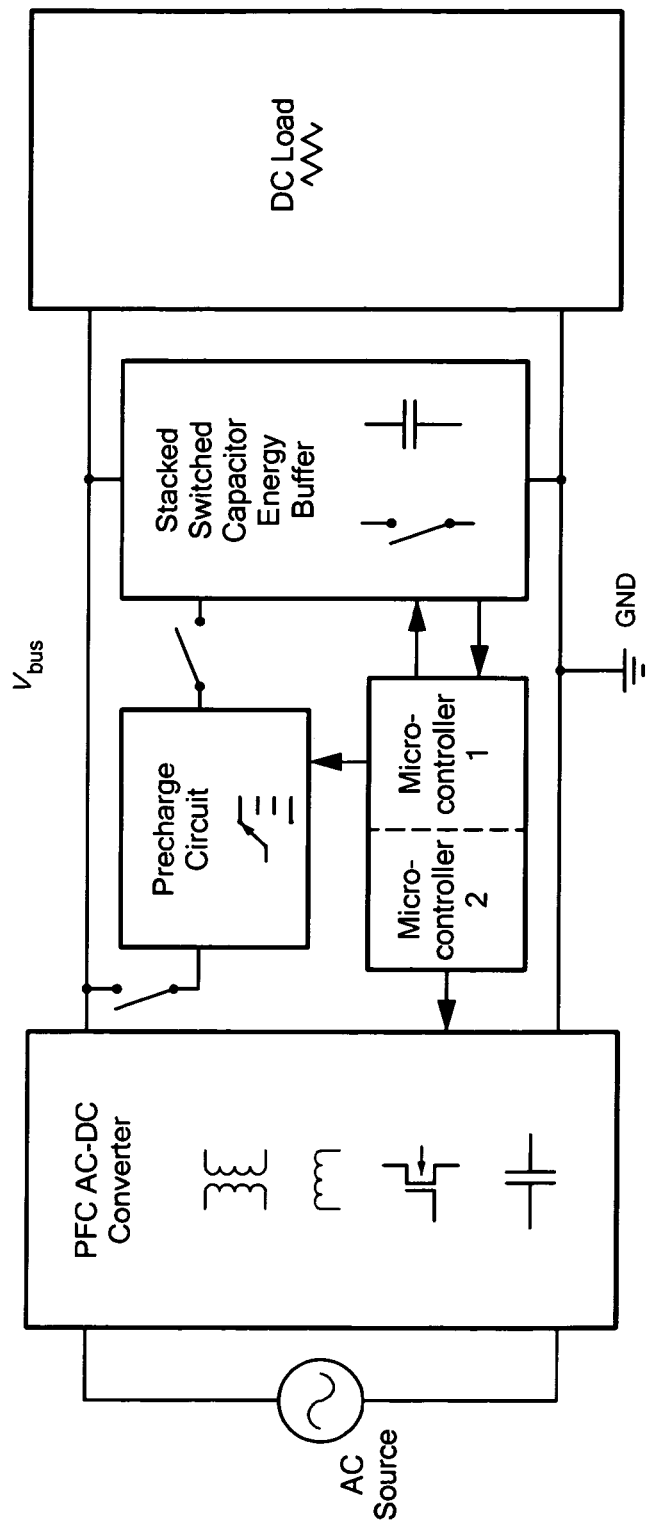
Figure 36:
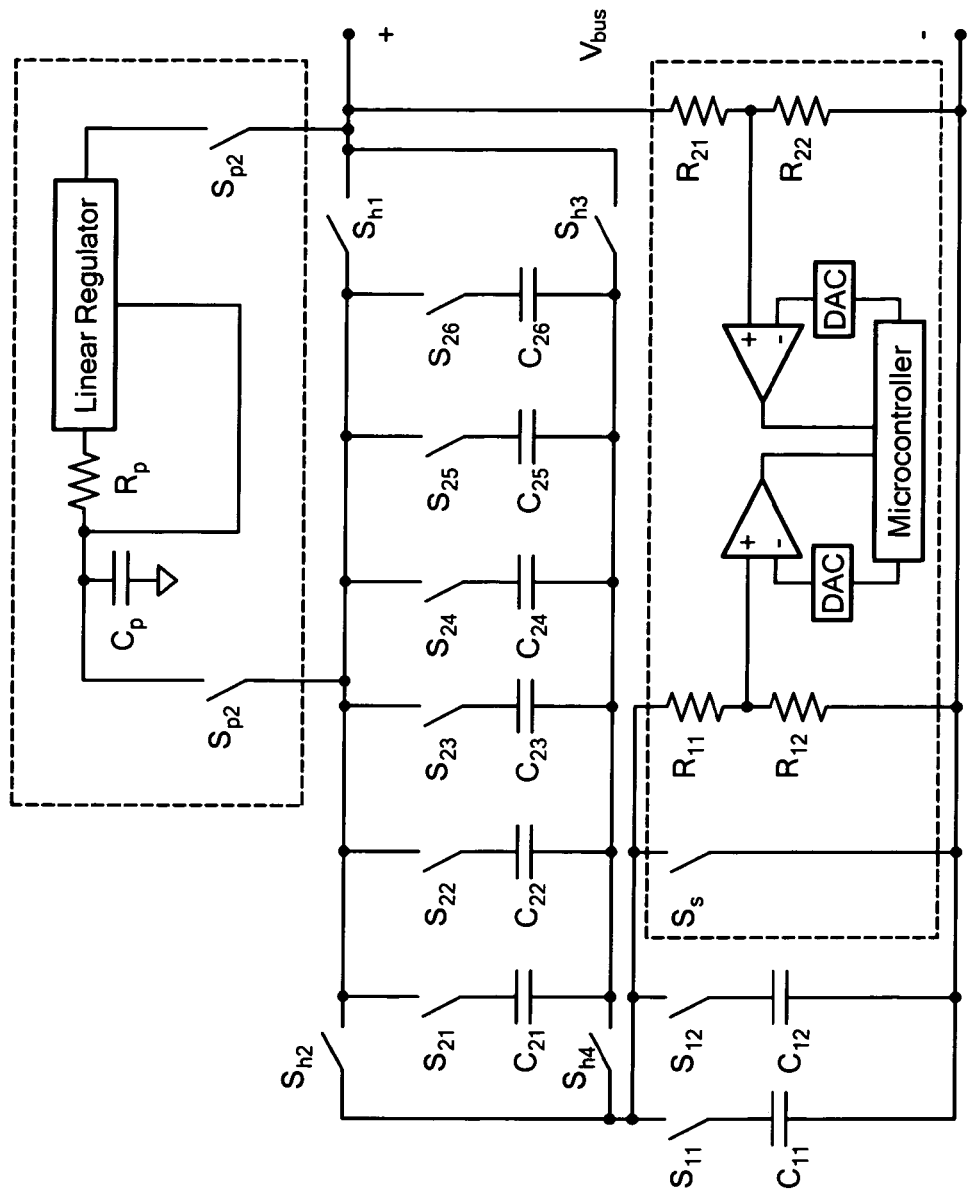

FIGS. 35A and 35B are block diagrams of a setup comprising a power factor correction (PFC) ac-dc converter, a dc load and an SSC energy buffer comprising an SSC energy buffer power circuit, a precharge circuit, and a control unit;

FIG. 36 is a schematic diagram of a a 2-6 bipolar SSC energy buffer having a precharge circuit coupled thereto.

Figure 37:
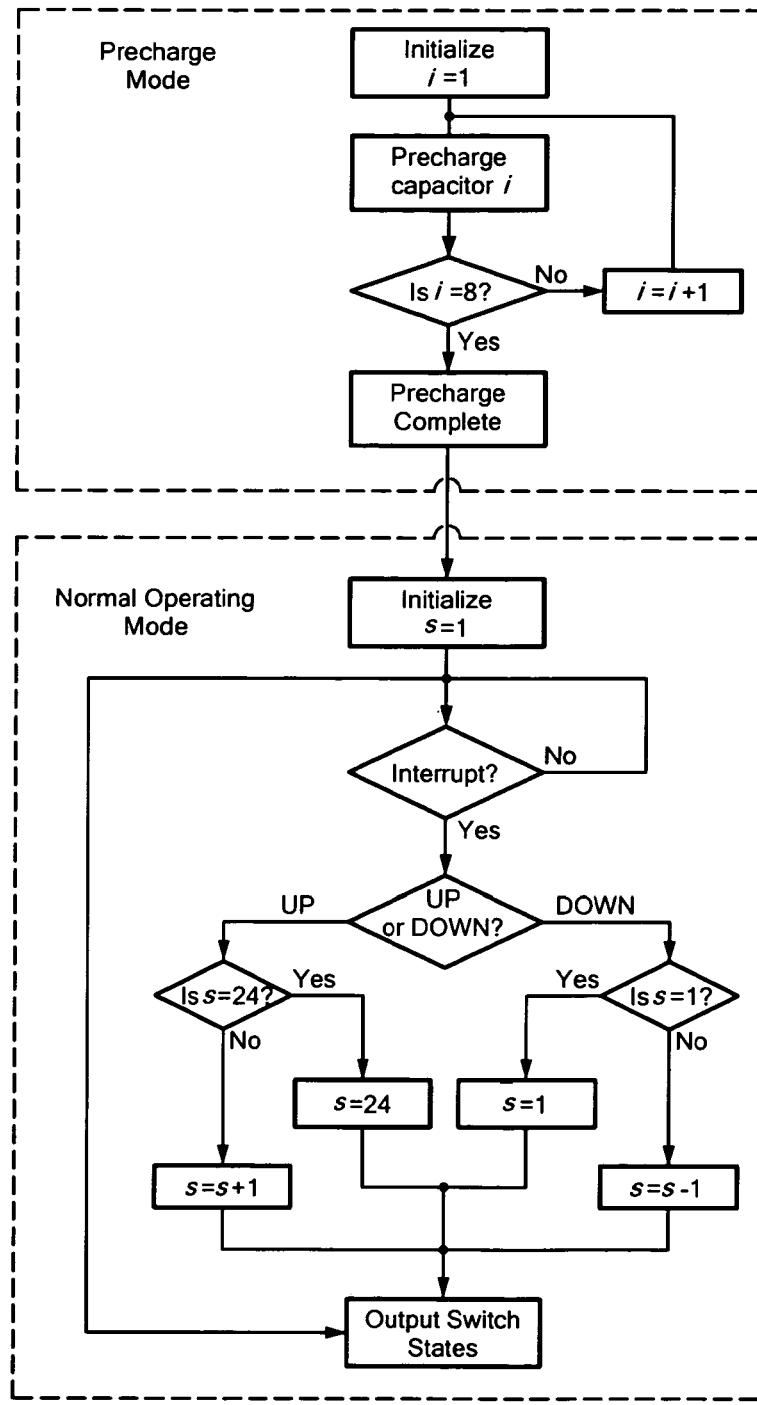

FIG. 37 is a flow chart illustrating control logic during precharge and normal operation of a 2-6 bipolar SSC energy buffer.

DETAILED DESCRIPTION

Figure 1:
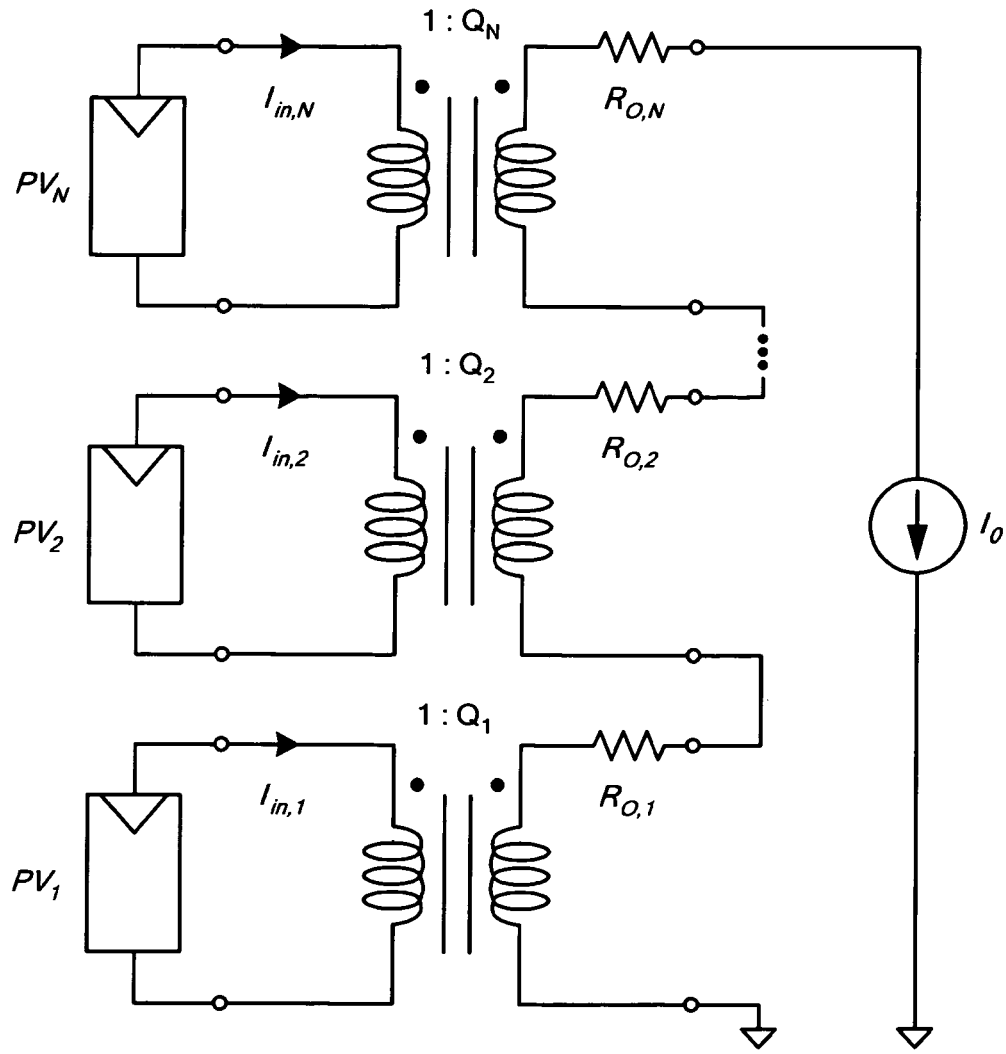
FIG. 1 is a block diagram of a model of a linearized discrete conversion ratio integrated converter.

Referring now to FIG. 1, a model of a linearized discrete conversion ratio integrated converter includes a source coupled to a plurality of photovoltaic (PV) elements $PV_1$-$PV_N$ through a like plurality of converters. It should be noted that each photovoltaic (PV) element $PV_1$-$PV_N$ can represent either a PV cell, a sub-module PV string, or a PV module.

The drive to miniaturization has renewed interest in capacitor-based switching power conversion due to higher energy storage density of capacitors compared to inductors.

It has been shown that outstanding MPPT and overall system efficiency can be achieved using a modified version of a DC-DC module integrated converter, where the DC-DC converters are switched-capacitor converters that can only achieve integer or rational multiples of the input voltage from a photovoltaic module. This approach may be cost-attractive and physically rugged because it requires no per-panel magnetic components.

Switched-capacitor MICs may not be most efficiently deployed as current sources contributing to the string. However, in contrast to the typical DC-DC MICs that operate with local autonomous MPPT control, the proposed system shares the responsibility of MPPT with one centralized inverter. Specifically, the central inverter can be input-current-controlled so that it appears as a current sink to all the MICs in the string. The load current can then be scaled by the module-level converter to become a scaled current sink at the sub-module levels.

Sources of Variation in a PV String

The different types of variations that cause asymmetries in a PV string can be broadly classified into two categories: process variation and external operating condition.

Process variation in the solar industry typically refers to manufacturing I-V mismatch between solar cells. Low-level solar module construction faces similar tracking efficiency challenges as high-level solar array assembly. Solar cells that are connected in series must all carry the same current. Thus, they do not perform at their individual maximum power points. Instead, they operate at a collective maximum that is limited by the mismatch between cells within the module. The tracking efficiency at the cell level, also known as the mismatch factor, can be defined as $$\eta_{p,cell} = \frac{P_{collective,max}}{\sum P_{i,cell,max}} \quad (1)$$

In order to reduce the amount of cell-to-cell variation and increase the cell tracking efficiency, the solar panel manufacturers have invested greatly in improving their manufacturing process as well as evaluating different cell binning algorithms. Historically, manufacturers have refined production processes and reduced the power tolerance from ±10% down to ±3%. However, it is worth noting that current and voltage parameters can have higher tolerance in the case of sorting by maximum power as manufacturers typically sort the cells into different power bins to sell at different price points. Described herein is a beneficial (in some cases, optimal) series-parallel layout configuration to increase (and ideally, maximize) output power of PV modules at a given confidence level.

External operating conditions consist of environmental factors including irradiance level, shading, temperature variation, dirt collection, panel aging, and panel orientation. Unlike process variation, which is tightly controlled in the manufacturing process, environmental factors can introduce large systematic imbalance (panel aging, panel orientation) or can unpredictably change the individual solar module's maximum power point substantially (irradiance level, shading). For example, shading of a solar module can change a module's maximum power by as much as 100%. In addition, in a residential installation, panels may be placed on both sides of the roof, meaning that panels have two distinct orientations and thus a systematic irradiance level difference throughout the day. Finally, panel age and dirt collection may cause asymmetry between existing and newly-installed panels. These factors are particularly relevant to residential installations where owners only purchase a portion of the panels upfront and plan on acquiring additional panels to increase the power output in the future.

Cell-Level Integrated Converters

At the sub-module cell level, the solar cells are closely spaced such that their external operating conditions are highly correlated and can be approximated as being nearly identical. Thus, the dominant source of asymmetry arises from the process variation between the cells in a sub-module string. Even though power tolerance can be limited down to ±3%, I-V mismatch can have higher tolerance when cells are sorted by maximum power. To study the effectiveness of a switched-capacitor DC-DC integrated converter at the cell level, a conservative maximum-power current variation of ±5% is assumed for the following description.

A first-order approximation for maximum power point tracking assumes that the cell output is step-wise linear when its output current is slightly perturbed around the maximum-power current. That is, if the current deviates from the maximum-power current by a small percentage ϵ, the output power is reduced from the maximum power by the same percentage.

$$I_{cell} = (1-\epsilon) \cdot I_{mp} \quad (2)$$

$$P_{cell} \cong (1-|\epsilon|) \cdot P_{max} \quad (3)$$

In the case where the cell maximum-power current varies by up to ±5%, an overall tracking efficiency above 95% is expected; that is, the sub-module string current can be set to the average maximum-power current so that it is always within 5% of each cell's individual maximum-power current.

Figure 2:
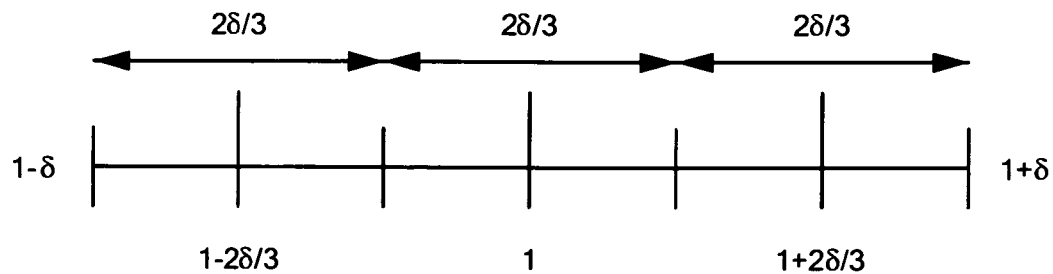
FIG. 2 illustrates quantization steps for a cell-level integrated converter.

To increase tracking efficiency, finer conversion levels must be added to tune individual cells' current closer to their maximum-power current. Since cell-level variations are typically tightly constrained and voltage level is low, a relatively simple fully-integrated SC circuit can be used to provide a fractional step in both positive and negative directions. At the cell-level, simplicity is a benefit in minimizing integrated converter cost. The choice of the tuning step-size is illustrated in FIG. 2 assuming uniform distribution and maximum allowable maximum-power current variation of δ around the norm. The entire space is quantized into 3 equally sized intervals of size 2δ/3 and the discrete tuning steps can be found as the center of each interval {1−2δ/3, 1, 1+2δ/3}.

Figure 3A:
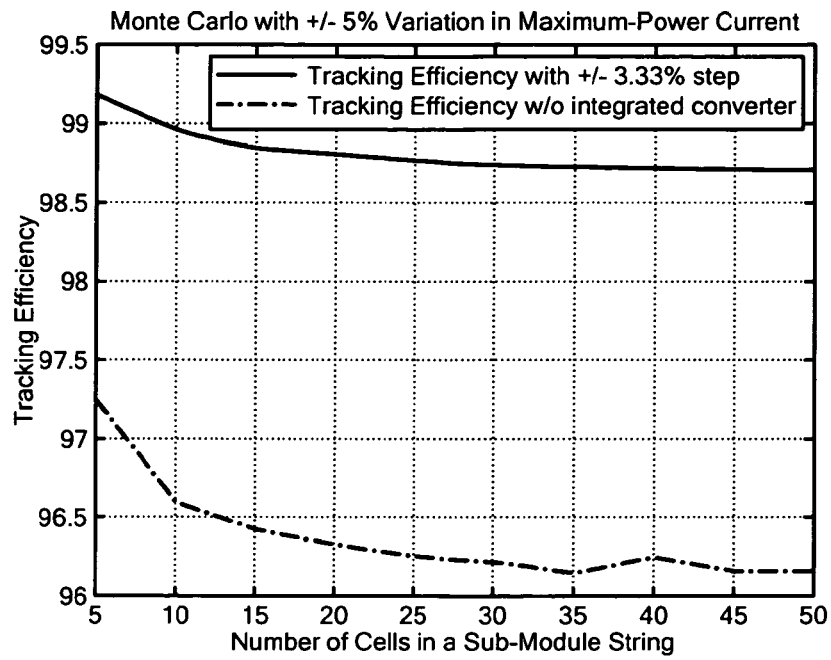
FIG. 3A is a plot of tracking efficiency vs. number of cells in a sub-module string with and without integrated converters using a 5% variation in maximum-power current.

Monte Carlo simulation results are shown in FIG. 3A. As expected from the approximation, the tracking efficiency with no integrated converter is slightly above 96%. With the introduction of integrated converters with discrete ±3.33% steps, an overall tracking efficiency greater than 98.33% is expected. The simulation results again agree with the intuitive model, and the tracking efficiency improves to above 98.7%. Potentially the greatest value in integrating converters at the cell-level lies in the fact that the added degrees of freedom allow the currently extensive and stringent binning process to be relaxed during manufacturing. Therefore, this invention makes it possible to lower the production cost of the solar panel itself and may open doors for a paradigm shift in the manufacturing process.

Figure 3B:
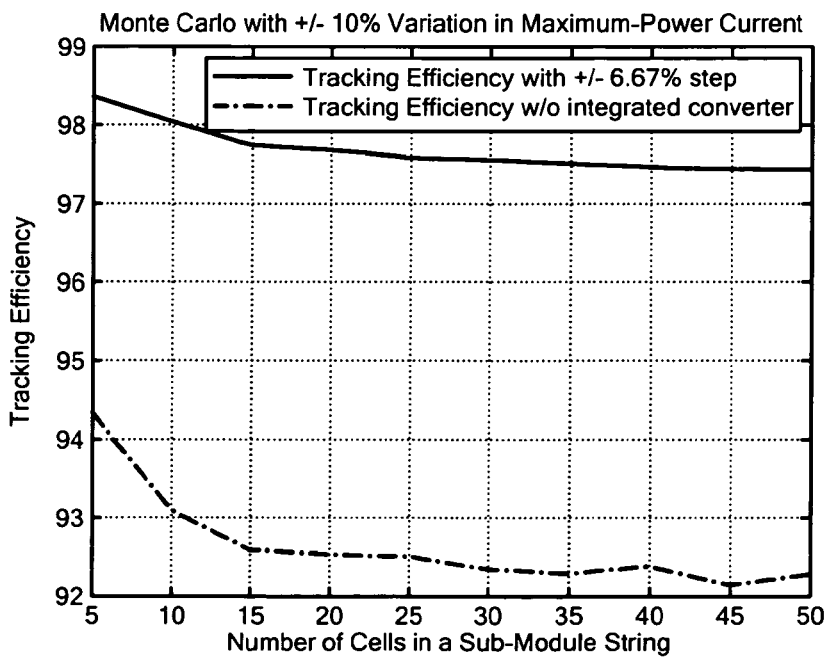
FIG. 3B is a plot of tracking efficiency vs. number of cells in a sub-module string with and without integrated converters using a 10% variation in maximum-power current.

Consider the following example with the maximum allowable maximum-power current variation doubled from the previous case to ±10%. The simulation is repeated with a new optimal step-size of ±6.67% and the results are shown in FIG. 3B. The tracking efficiency of the relaxed binning process with integrated converters (97.5%) is shown to exceed that of the stringent binning process without integrated converters (96.2%). Furthermore, assuming a 98% conversion efficiency for the switched-capacitor circuit, the overall efficiency of the relaxed binning process with integrated converters becomes 95.6%. Thus, even when taking into account conversion efficiency, the cost effective switched-capacitor integrated converters approach presents minimal power loss compared to stringent binning process while offering a great opportunities in reducing the manufacturing cost of the solar panels.

Sub-Module String Level Integrated Converters

Figure 4B:
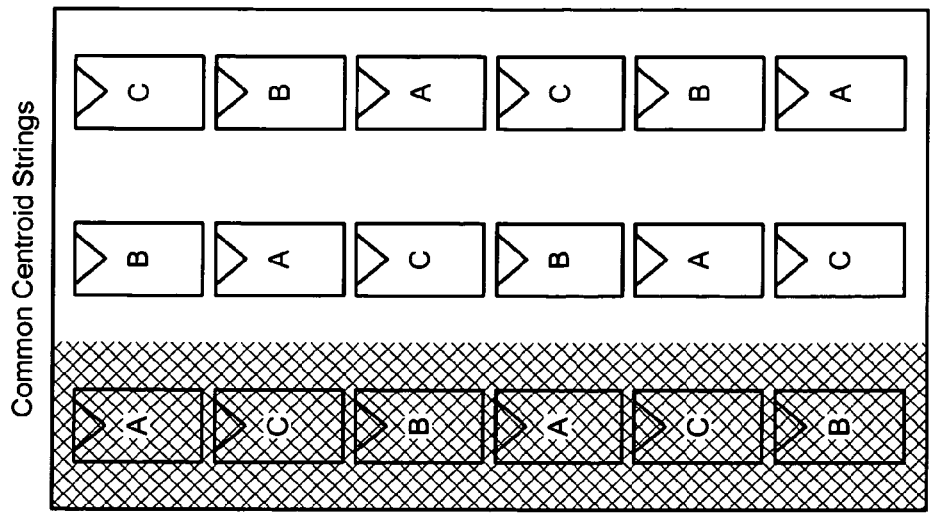
FIG. 4B is a diagrammatic view of a sub-module string having a common centroid layout.
Figure 4A:
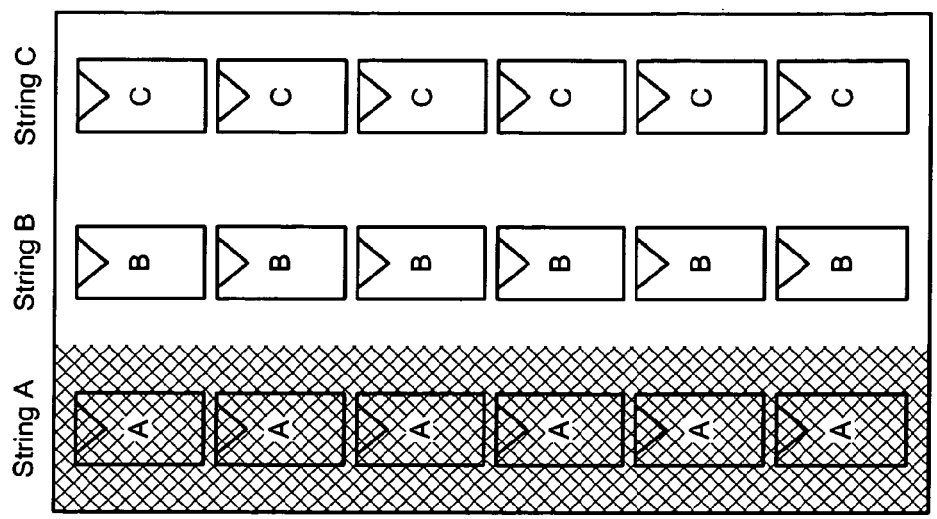
FIG. 4A is a diagrammatic view of a sub-module string having a conventional layout.

Referring now to FIGS. 4A and 4B, a group of solar cells are connected in series to form a sub-module string. In the exemplary embodiments of FIGS. 4A and 4B each of the sub-module strings are provided from six series connected solar cells. Those of ordinary skill in the art will appreciate that sub-module strings provided from fewer or more than six series connected solar cells may also be used. Three sub-module strings are used to provide the panel in FIG. 4A and three sub-module strings are used to provide the panel in FIG. 4B.

Comparing the conventional layout of the sub-module strings in FIG. 4A to the common centroid layout of the sub-module string in FIG. 4B illustrates the imbalance between sub-module strings caused by partial shading. That is, given small variations among each cell's maximum-power current, the overall maximum-power current of the sub-module string can be well-approximated as the arithmetic mean of the individual cells' maximum-power currents. Assuming the maximum-power current for the cells are i.i.d. with mean μ and variance $\sigma^2$ the overall maximum-power current of the sub-module string will roughly have a mean μ and a variance $\sigma^2/N$, where N is the number of solar cells in the sub-module string. Therefore, for reasonably sized sub-module strings, the asymmetries can be attributed entirely to the external operating conditions.

Since the sub-module strings are closely spaced, their statistical variations must be correlated. In particular, external operating conditions such as temperature, dirt collection, aging, and orientation are for all intents and purposes identical because the strings occupy the same solar panel. Thus, the variability of the maximum-power current is expected to be constrained, which would limit the required tuning range of the SC integrated converter for a target tracking efficiency and thereby reduce cost. However, given the current sub-module string layout employed by the manufacturers, partial shading can cause substantial mismatch between sub-module strings. Such a situation is illustrated in FIG. 4A, where a panel with typical sub-module string layout is affected by partial shading, or a 1-D "hard" gradient, in the direction orthogonal to the string orientations.

Common centroid layout is effective in reducing gradient-induced mismatches. Utilizing such a technique in a solar panel layout would help substantially reduce the amount of mismatch caused by an imbalance in solar irradiance between the sub-module strings. Note that a custom layout requiring stringent parasitic control is not necessary; instead a simple PCB with the common centroid routing pattern is sufficient An example of such layout is shown in FIG. 4B. In the common centroid case, the power between the sub-module strings will remain symmetric with the same partial shading as before and will remain relatively balanced given other linear shading patterns as well.

A statistical evaluation method was adopted to simulate the effect of linear irradiance gradient. For each iteration in the simulation, a random linear shading pattern is generated. Each string's respective power is computed and the standard deviation of the string's maximum power is recorded.

Figure 5:
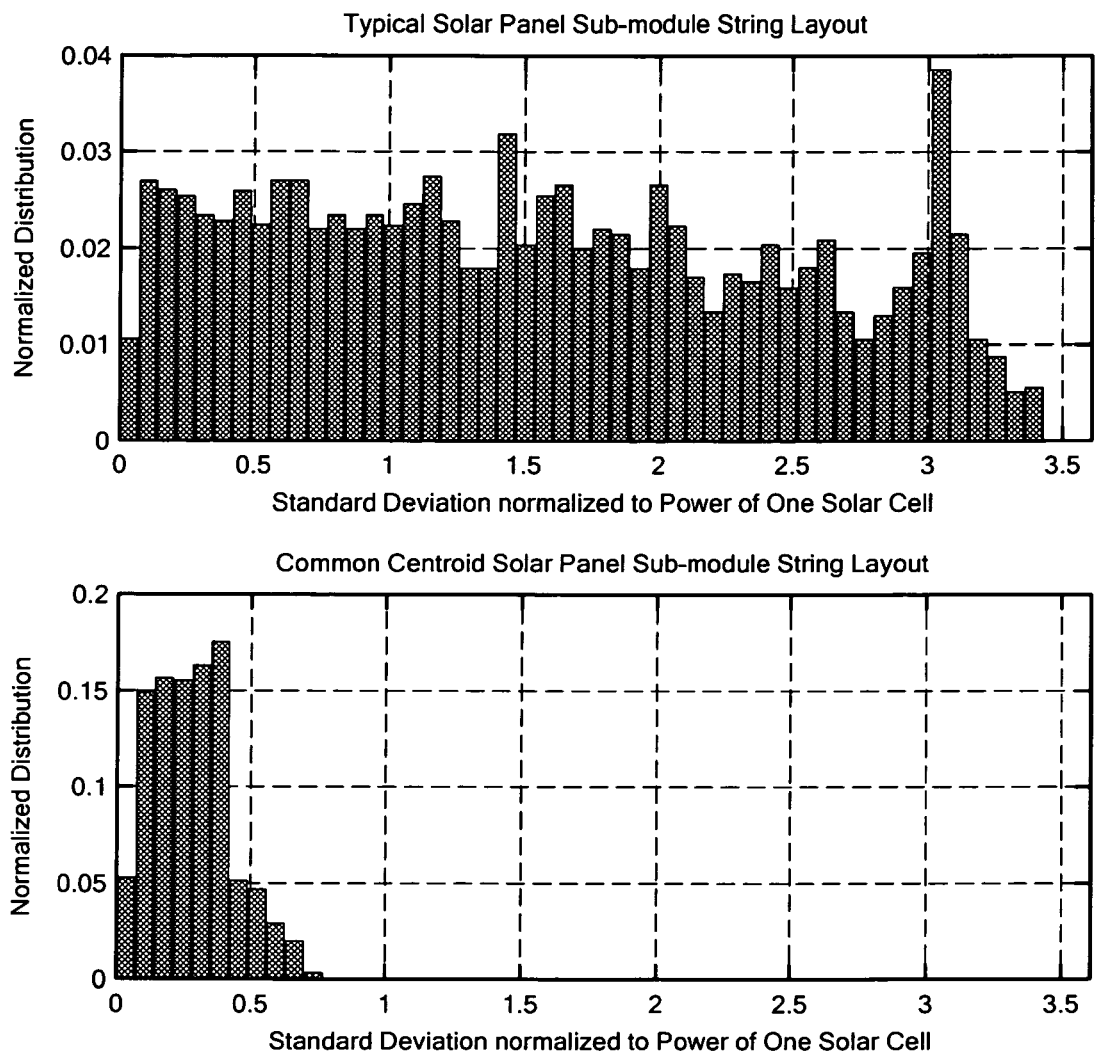
FIG. 5 shows MATLAB simulation results comparing the two layout schemes shown in FIGS. 4A and 4B. Simulated standard deviation distribution (normalized to the maximum power of one solar cell) of maximum power for 3 strings of 6 cells.

As shown in FIG. 5, the common centroid layout is very effective in compressing the standard deviation to below the power of a single solar cell. Furthermore, since the standard deviation is kept below the power of a single solar cell, the power variation between strings is expected to decrease inversely proportional to the number of power generating cells per string. To verify this hypothesis, additional simulations of 3 strings with 6 cells are performed to characterize the percentage power variation between the maximum and minimum power strings vs. the output power of the maximum power string.

Figure 6:
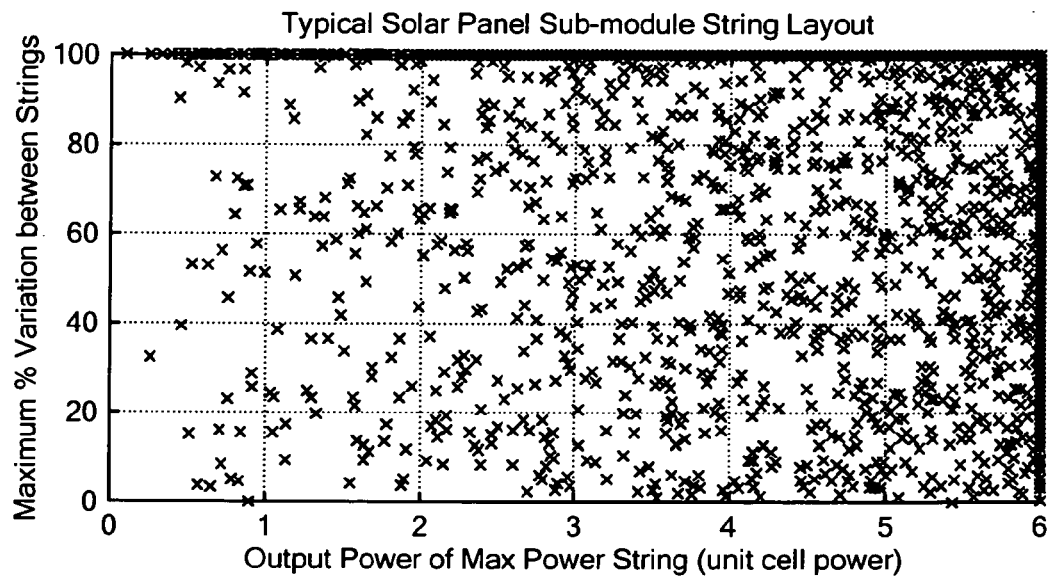
FIG. 6 is a statistical percentage power variation vs. output power of maximum power string.
Figure 6:
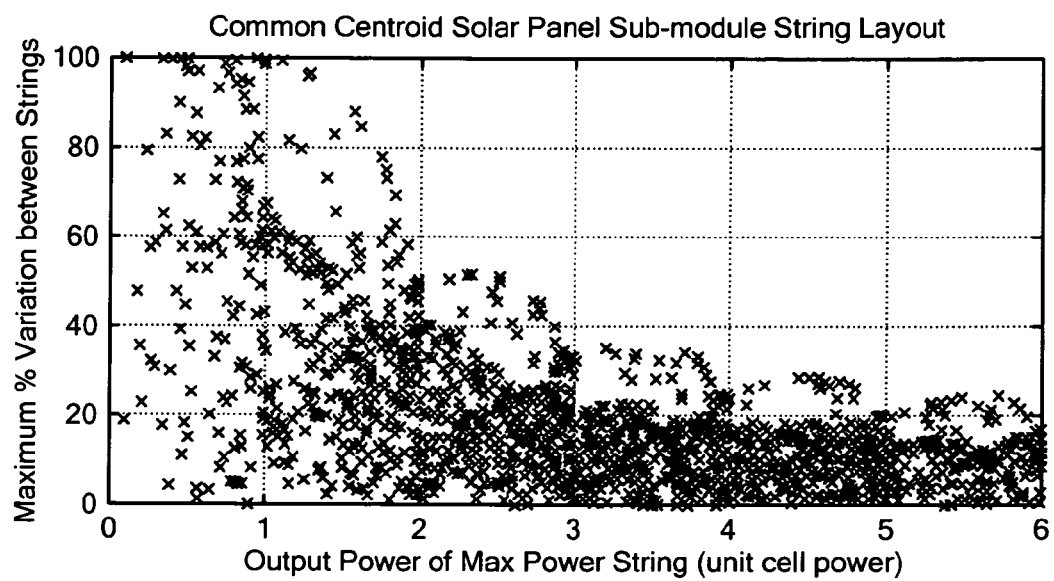

As shown in FIG. 6, while the normal string layout results in very high percentage variation in power between strings across all power levels, the common centroid layout significantly limits the percentage variation in power between strings at reasonable power levels.

The number of cells per string can be used as a design variable to limit variation between sub-module strings. By increasing the number of cells per string N, the expected percentage power variation should scale as $\propto 1/N$. To provide design guidelines regarding the number of cells per string needed for a certain expected percentage power variation between strings, statistical simulations are repeated for a variety of sub-module string sizes.

Figure 7:
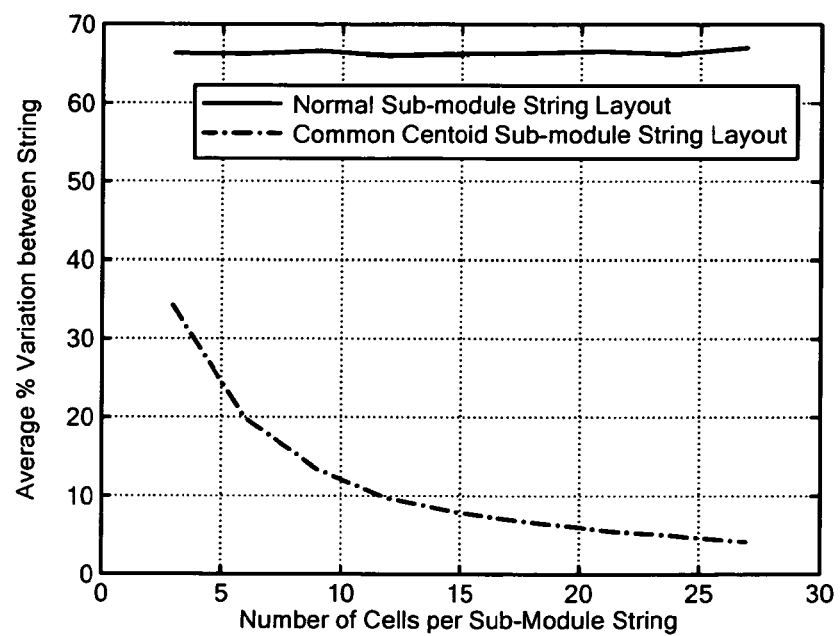
FIG. 7 is an expected percentage power variation vs. number of cells per sub-module string.

The result is shown in FIG. 7. While the expected power variation between strings for a normal sub-module string layout remains constant at approximately 65% as the number of cells per sub-module string varies, the expected power variation between strings for a common centroid layout decreases inverse proportional to the number of cells per sub-module string. Approximate 15 cells per sub-modules string can limit the expected percentage variation between strings to less than 10%. This results in 45 cells total and is comparable to current industry offerings. For example, the Mitsubishi PV-MFI70EB4 has 50 cells in series. In conclusion, this invention is effective in compressing the degree of variation among sub-modules string. Therefore, it enables the use of highly efficient converters with limited conversion range to perform MPPT at the sub-module string level.

Module Level Integrated Converters

By following a similar argument in the sub-module string section, process variation can be neglected at the even higher module level. For a large array of solar panels, there exist panels with relatively large spatial separations such that their maximum-power current variations become only weakly correlated. Consequently, at the module level, the SC DC-DC converters must have a wide tuning range to recover losses from the potentially large asymmetries in the maximum-power currents.

To optimally cover the possible range of maximum-power currents, the converter tuning range can again be broken up into uniformly-spaced discrete intervals where the centers of the intervals represent the relative conversion ratio. Some system design guidelines regarding choice of level granularity have been discussed in references such as Cooley, J. J.; Leeb, S. B.; "Per panel photovoltaic energy extraction with multilevel output DC-DC switched capacitor converters," Applied Power Electronics Conference and Exposition (APEC), 2011 Twenty-Sixth Annual IEEE, vol., no., pp. 419-428, 6-11 Mar. 2011. Monte Carlo simulation assuming the worst-case uniformly distributed maximum-power currents was used to examine tracking efficiency tradeoffs at the module level. The result suggested good tracking efficiency improvement from 65% to 90% using a 5-level SC DC-DC converter in a 3-module system.

Maximum Power Point Tracking (MPPT)

A switched-capacitor integrated converter MPPT technique finds a conversion ratio such that a PV element is outputting a desired power given a desired output current $I_0$. Ideally, the switched-capacitor integrated converter MPPT technique finds an optimal (or near optimal) conversion ratio such that the PV element is outputting a maximum (or close to maximum) power given the desired output current $I_0$. In other words, the converter must find conversion ratio $Q_i$ to reduce (ideally, minimize) the difference between PV element's current $Q_i I_0$ and the PV element's maximum-power current $I_{mp,i}$, where $I_{mp,i}$ can be estimated by measuring the short-circuit current of the PV element as is known. Furthermore, it is noted in the above-mentioned reference that a perturb-and-observe step may be necessary for good accuracy following the initial $I_{mp}$ estimate. In a discrete conversion system, this typically requires two additional measurements (sometimes at most two additional measurements) of both current and voltage.

While the above control strategy is viable, it can be further simplified since there are only a small number of conversion levels available. Instead of using the maximum-power current estimate from short-circuit current measurement followed by a perturb-and-observe step, the local MPPT algorithm can simply loop through all the conversion levels to search for the maximum-power conversion ratio. This translates to only two additional observations in the 5-level converter discussed at the module level. At sub-module string and cell levels, only one additional observation is required. Furthermore, there is no longer a need to measure the output current $I_0$ if the brute-force search method is employed. Instead, the control algorithm only requires knowledge of the output voltage of the integrated converter in order to maximize energy extraction from the PV element.

Even more simplification can be performed at the sub-module cell level. As discussed in section II-A, the converters at the sub-module cell level are added mainly to reduce process variation induced mismatch. Since asymmetries caused by process variation are unlikely to change significantly over the lifetime of the solar panel, there is no need to run the optimization algorithm continuously during normal operation. The conversion ratio can be hard programmed at panel assembly time, or be self-calibrated on a regular basis.

Figures 1, 7A:
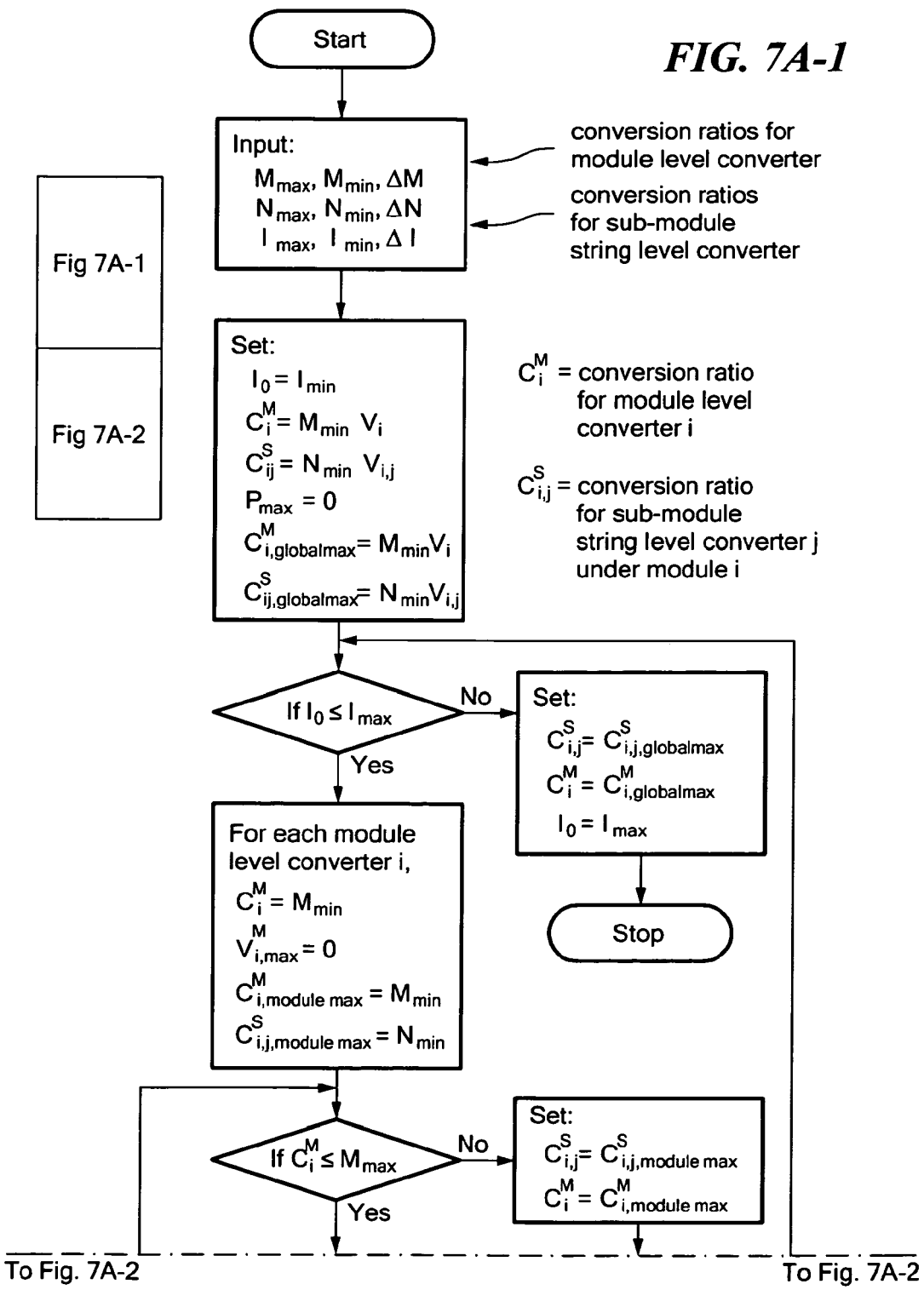
FIG. 7A is a flow diagram of an exemplary Maximum Power Point Tracking (MPPT) process.
Figures 2, 7A:
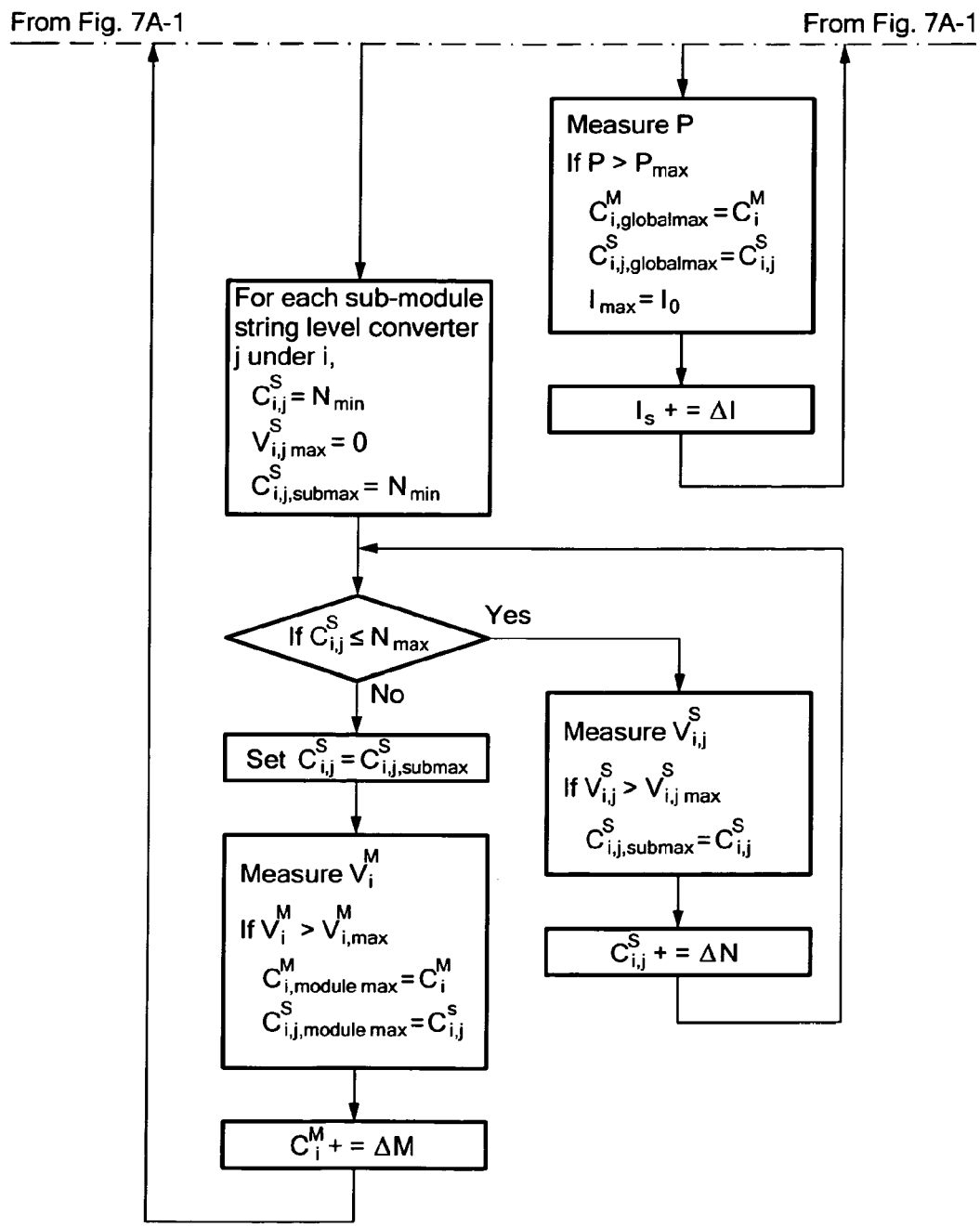
Figure 13:
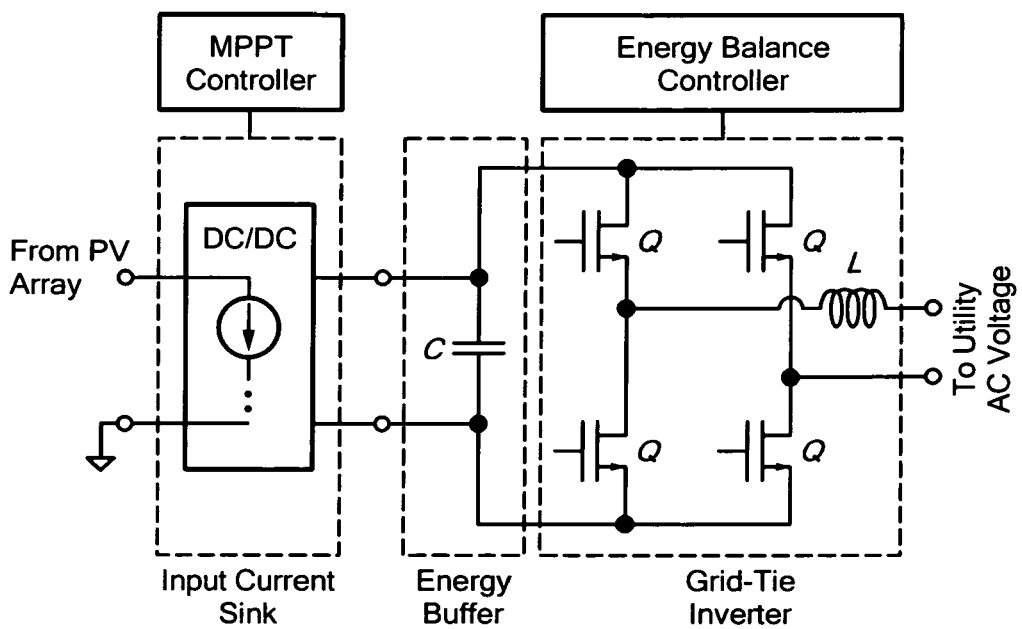
FIG. 13 is a block diagram of a centralized inverter.

Referring now to FIG. 7A, a Maximum Power Point Tracking (MPPT) process suitable for use with the MPPT controller shown in FIG. 13, for example, is shown.

Module Level Converter Experimental Results

Overall Experimental Setup

An experimental prototype of the Marx Multilevel converter proposed in the above mentioned reference was constructed and characterized. Summaries of the circuit components and parameters for each of the implemented conversion ratios are shown in Table I.

TABLE I

EXPERIMENTAL PROTOTYPE PARAMETER SUMMARY

| Parameter | Symbol | Value |
|---|---|---|
| Switched-capacitor | C | 12.51LF |
| Switching Device | M | IRF8721 |
| Panel Capacitor | CD.t | 25JIF |
| Local Output Capacitor | Col | 12.5JIF |
| Switching Frequency (Q -2) | fSW02 | 100 kHz |
| Switching Frequency (Q-3) | fsw.D3 | 88 kHz |
| I Switching Frequency (Q -4) | fsw.04 | 127 kHz |
| Panel I MP | PMP, | 170 W |
| Panel I MP Voltage | VMP, | 24.6 V |
| Panel I MP Current | Iup, | 6.93 A |
| Panel I Series Resistance | Rsl | 0.6350 |
| Panel I Shunt Resistance | RD.1 | 540 |
| Panel 2 MP | PUP? | 85 W |
| Panel 2 MP Voltage | VUP? | 24.6 V |
| Panel 2 MP Current | luP? | 3.47 A |
| Panel 2 Series Resistance | RS2 | 1.270 |
| Panel 2 Shunt Resistance | RD•2 | 108.10 |

Figure 8:
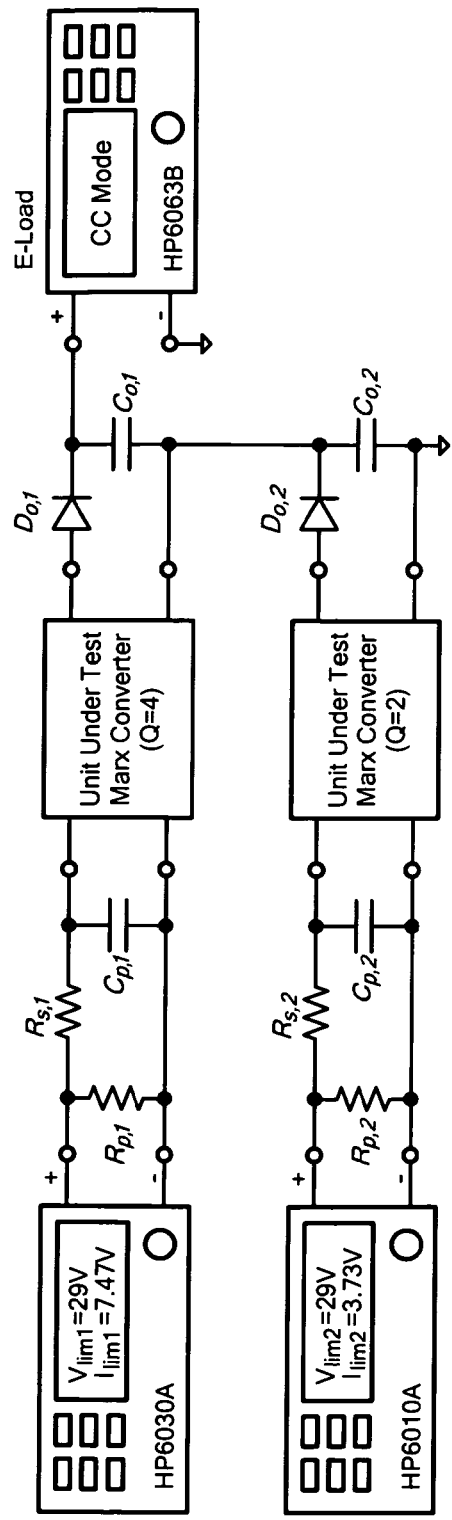
FIG. 8 is a connection diagram depicting the experimental setup for the series connection of MICs and PV circuit models.
Figure 9A:
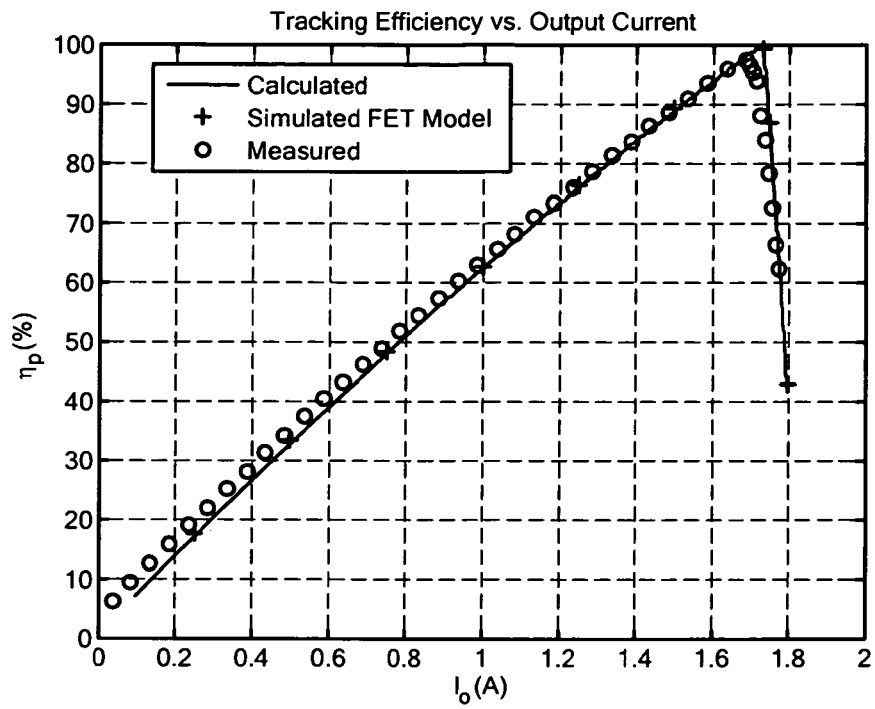
FIGS. 9A and 9B show experimental data.
Figure 9B:
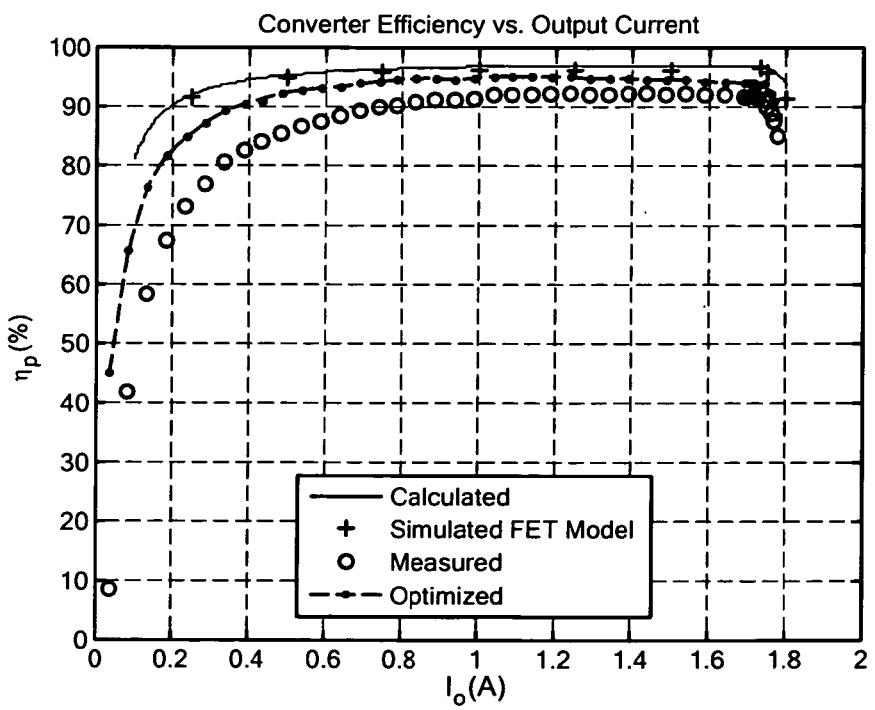

FIG. 8 shows the connection diagram of the experimental setup consisting of two series connected modules and the constructed PV circuit models. In this experiment, Q=2 and Q=4 modules were constructed to perform MPPT on two unbalanced PV circuit models. Conversion efficiency was measured using HP34401A digital multimeters. Input and output voltages for each converter were measured at the PCB terminals. Current sense resistors with nominal resistance of 10m.ll were used to measure input and output currents. The precise values for each current sense resistor were measured separately to within 0.01 mΩ using current-mode and voltage mode digital multimeters simultaneously Experimental Prototype Performance The plots in FIG. 9 show measured efficiency data compared to simulated and calculated values. Peak conversion efficiency of 92.2% was measured and an optimized conversion efficiency of 95.2% is projected. The added loss in the conversion efficiency plot is due to standby power dissipation not included in simulation and calculation.

The switching frequencies for the experimental prototype were chosen based on the measured data. Since the most efficient switching frequency generally depends on conversion ratio, in order to maximize the overall system efficiency, the switching frequency showing the maximum conversion efficiency must be chosen for each conversion ratio.

Standby Power Dissipation

After constructing and characterizing the experimental prototype, several conversion efficiency optimizations are immediately clear. Several sources of power dissipation that can be optimized will be computed and reasonable values in an optimized prototype will be speculated. These will serve as design guidelines for future iterations of the switched-capacitor converter design.

Figure 10:
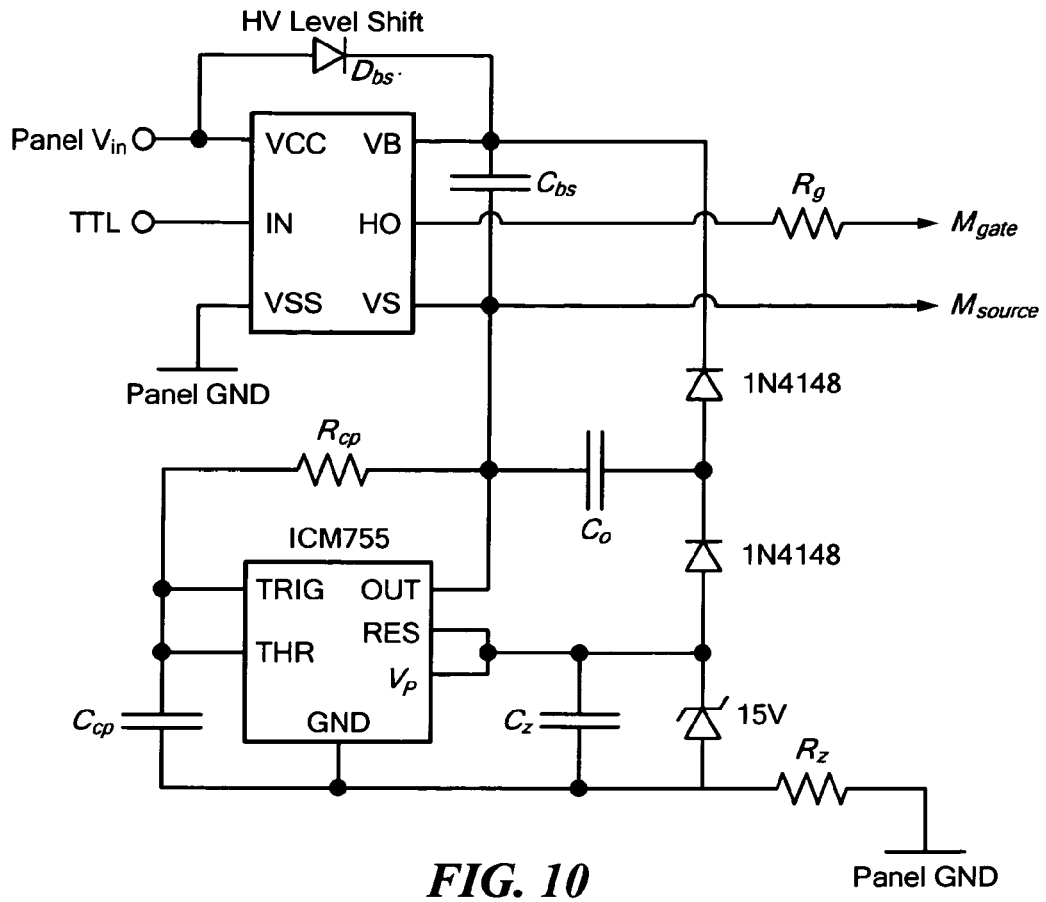
FIG. 10 is a recommended gate drive adapted from IR AN-978

The largest contributor to the discrepancy in efficiency between the simulated and the measured systems is the standby power dissipation. One significant portion of the standby power dissipation originates from biasing the zener diodes in the gate drive charge pump circuits shown in FIG. 10. The biasing resistor sets the current through the zener diode and should be optimized to provide just sufficient bias current without dissipating excessive power. Thus, appropriate values for the zener bias resistors should be chosen based on the time-averaged voltage across them. The time-average voltage across the bias resistor is the time-averaged MOSFET source voltage minus the zener voltage. Therefore, the bias resistor value is related to both the associated MOSFET and the conversion ratio. Table II indicates the MOSFET source voltages normalized by the input voltage across possible conversion ratios.

TABLE II

MOSFET SOURCE VOLTAGES NORMALIZED TO INPUT VOLTAGE

| | Recharge | Q = 0 | Q = 1 | Q = 2 | Q = 2 | Q = 2 |
|---|---|---|---|---|---|---|
| MI | 0 | 0 | 0 | 1 | 1 | 1 |
| M2 | 0 | 0 | 0 | 0 | 0 | 0 |
| M3 | 1 | 1 | 1 | 1 | 1 | 1 |
| M4 | 0 | 0 | 0 | 1 | 1 | 2 |
| M5 | 0 | 0 | 0 | 1 | 1 | 1 |
| M6 | 1 | 1 | 1 | 2 | 2 | 2 |
| M7 | 0 | 0 | 0 | 1 | 2 | 3 |
| M8 | 0 | 0 | 0 | 1 | 1 | 2 |
| M9 | 1 | 1 | 1 | 2 | 2 | 3 |
| MI0 | 1/2 | 0 | 1 | 2 | 3 | 4 |
| MII | 0 | 0 | 0 | 1 | 2 | 3 |

In the experimental system, the only MOSFETS that require charge-sustaining gate drives are M3, M6, M9 and M10. To compute the upper limit of the biasing resistor, the minimum zener bias current and the minimum input voltage must be considered. For instance, with $V_{in,min}=24V$ and $I_{z,min}=18$ mA, the time-averaged bias voltage for the MOSFET M6 in the Q=2 operation is $$\langle V_{z6,Q2}\rangle = 24 \cdot \frac{1+2}{2} - 15 = 21 \text{ V.} \tag{4}$$

The maximum zener bias resistor value for the M6 in the Q=2 switching pattern is then $$R_{z6,Q2} \leq \frac{\langle V_{z6,Q2}\rangle}{I_{z,min}} \tag{5}$$

$$= 1.17 \text{ k}\Omega. \tag{6}$$

The time-averaged power in the resistor can be calculated to be $$R_{R6,Q2} = \frac{\langle V_{z6,Q2}^2\rangle}{R_{z6,Q2}} \tag{7}$$

$$= \frac{\langle V_{z6,Q2}\rangle^2 + (0.707 \cdot \Delta V_{M6,Q2})^2}{R_{z6,Q2}} \tag{8}$$

$$= \frac{21^2 + (0.707 \cdot 12)^2}{1.17 \cdot 10^3} \tag{9}$$

$$= 440 \text{ mW.}$$

where a square wave of bias voltage and the maximum allowable bias resistance are assumed. In addition to the power dissipated in the resistor, the zener diode itself dissipates power. The zener power dissipation can be approximated as $$P_{z,i} \approx I_z \cdot V_{z,i} \tag{10}$$

$$=18 \text{ mA} \cdot 15V=270 \text{ mW.} \tag{11}$$

Since both sources of loss (i.e. time-averaged power in the resistor and power dissipated in the zener diode itself) depend heavily on the zener bias current, the zener diode bias should be minimized to reduce the standby power required for biasing. Note that this optimization is valid to the extent that the zener bias current is larger than the current demanded by the charge pump circuit.

A third source of standby power dissipation originates from charging and discharging the timing capacitor in the charge pump circuit. This loss can be calculated as:

$$P_{cp,timing}=C_{cp} \cdot V_{z,i}^2 \cdot f_{cp}. \tag{12}$$

where the timing capacitor is assumed to fully charge to the zener voltage and fully discharged each switching cycle. Therefore, reducing the timing capacitance value may constitute a significant optimization. The charge pump switching frequency can remain unchanged by increasing the timing resistor by the same factor.

These un-optimized standby power dissipation sources are characterized and tabulated. Reasonable optimized values for the fully discrete implementation of the Marx experimental prototype are calculated as well. The optimized standby power dissipation numbers are assumed in the conversion efficiency data provided above. The results are summarized in Table III for the Q=2 module.

TABLE III

STANDBY POWER OPTIMIZATION
RESULTS FOR Q = 2 MODULE

| Source | Un-Optimized | Optimized |
| --- | --- | --- |
| Charge Pump Zener M3 | 432 mW | 48 mW |
| Charge Pump Zener M6 | 710 mW | 72 mW |
| Charge Pump Zener M9 | 710 mW | 72 mW |
| Charge Pump Zener M10 | 502 mW | 60 mW |
| Charge Pump Timing Cap x 4 | 130 mW | 26 mW |
| HV Level Shift x 11 | 158 mW | 100 mW |
| ICM7555 x 5 | 6 mW | 6 mW |
| LM7812 | 158 mW | 100 mW |
| LM7805 | 6 mW | 6 mW |
| Total | 2.8 W | 500 mW |

The experiments demonstrate the value and approach to loss minimization for a particular MIC design. Different gate drive architectures may be employed in a practical switched-capacitor MIC integrated circuit. While the specific details of the appropriate optimizations will vary with the MIC topology, the possibilities and approach for developing a high efficiency converter are illustrated here.

Run-Time Zener Biasing Optimization

Figure 11:
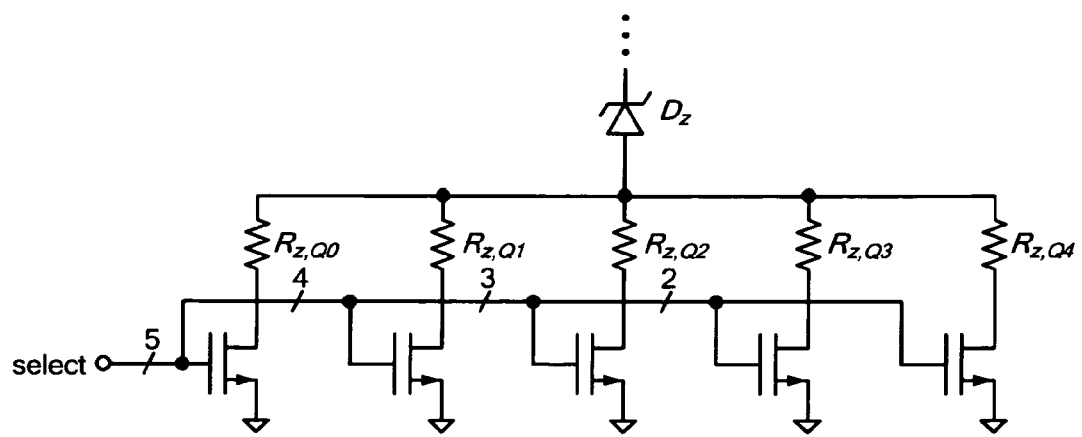
FIG. 11 is a tunable zener diode biasing circuit using ground-referenced MOSFETs.

As shown above, the optimal zener bias resistance value depends on the conversion ratio, it should be chosen at run-time to minimize standby power. One approach could be to implement a switched set of fixed resistors for each gate drive, and the converter could choose the resistor based on the conversion ratio. One such scheme could be implemented using ground-referenced MOSFETs and TTL level control signals. This is illustrated in FIG. 11.

Figure 12:
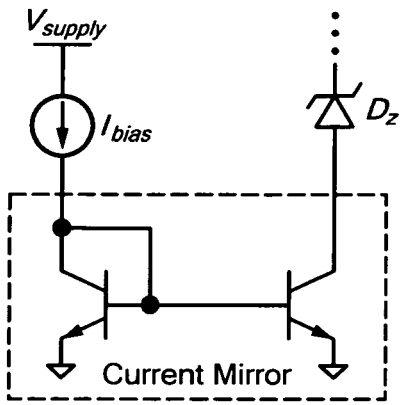
FIG. 12 is an active current source zener diode biasing circuit.

However, the optimal Zener bias resistance value also depends on the input voltage. As the input voltage increase beyond the minimum value of 24V, excessive power dissipation is introduced in the passive biasing circuit. Thus, an even more efficient solution employs active current sources to provide the zener bias current. The circuit schematic using a basic bipolar current mirror is shown in FIG. 12.

However, more advanced current mirror techniques, such as the Widlar and Wilson mirrors, can also be employed given sufficient headroom. In this case, the power dissipation in the biasing circuit is simply:

$$P_{z,i} = \langle V_{MOSFET,s,i} \rangle \cdot I_{z,i}. \tag{13}$$

For instance, to minimize the standby power dissipation, a zener diode with a low bias current of 2 mA is selected. Then, the power dissipation of M6 zener biasing would be $$P_{z,6} = 24 \cdot \frac{1+2}{2} \cdot 0.002 = 72 \text{ mW}. \tag{14}$$

Run-Time Frequency Scaling

Based on Table I, the switching frequency yielding the highest conversion efficiency is dependent of the conversion ratio. Therefore, the switching frequency should also be selected at run-time to ensure the highest overall conversion efficiency is achieved. This selection may be based on a pre-determined set of optimal switching frequencies for a specific load current.

Grid-Tie Inverter Interface

The proposed centralized inverter consists of three components illustrated in block schematics in FIG. 13. Unlike conventional string inverters and microinverters that close a single feedback loop on the current injected to the grid to control both maximum power point tracking and power delivery to the grid, the proposed architecture uses two separate controllers to achieve maximum power point tracking and energy balance.

The input current sink serves as the MPPT tracking control by demanding a current from the PV array that maximizes the product of the demanded current and the PV array voltage. Functionally, the input current sink could be implemented as a canonical cell converter such as a boost or a SEPIC converter. The input power from the PV array can then be monitored by measuring the PV array input voltage. An energy balance control loop can then be designed to use this information to control the power injected to the grid. That is, the input power can be fed forward to improve grid-tie inverter response time and controller stability.

Grid-Tie Inverter Stability

Figure 14:
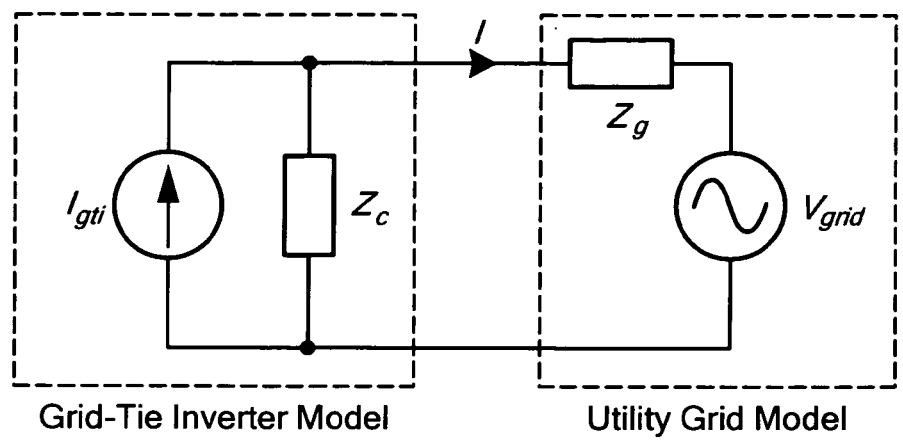
FIG. 14 is a grid-tie inverter model.

The stability of a grid-tie inverter can be derived by a small-signal equivalent circuit model shown in FIG. 14, where the grid-tie inverter is modeled as a Norton equivalent current source and the utility grid is modeled as a Therein equivalent voltage source. Using the equivalent circuit model, the output current of the inverter can be solved by superposition to be $$I(s) = \frac{I_{gti}(s) \cdot Z_c(s)}{Z_c(s) + Z_g(s)} - \frac{V_{grid}(s)}{Z_c(s) + Z_g(s)} \tag{15}$$

$$= \left(I_{gti}(s) - \frac{V_{grid}(s)}{Z_c(s)}\right) \cdot \frac{1}{1 + \frac{Z_g(s)}{Z_c(s)}}. \tag{16}$$

From the above equation, the stability criterion can be derived. Specifically, the impedance ratio Zg(s)/Ze(s) is required to satisfy the Nyquist criterion. This implies that the grid-tie inverters should be designed to have output impedance Ze(s) significantly higher than the grid impedance in order to operate with stability when connected to the grid. That is, the following condition should be satisfied.

$$\left|\frac{Z_g(s)}{Z_c(s)}\right| < 1 \tag{17}$$

Furthermore, the control strategy for the grid-tie inverter has strong effects on the inverter's output impedance. Thus, separating the controls into two separate loops simplifies the inverter output impedance derivation and provides additional insights for design. Below, a control strategy will be outlined and the output impedance will be derived.

Energy Balance Control

The power Pin flows into the grid-tie inverter via the input current sink and is delivered to the utility grid by controlling the magnitude of the output current. The energy buffer capacitor would store any energy difference between the input energy and the energy delivered to the grid.

A sampled-data approach is adopted where the input power Pin and the energy stored on the buffer capacitor e are sampled at twice the line frequency. Using the sampled data, the controller specifies the scale factor of the reference current waveform for the next cycle. Note that the reference current waveform is assumed to be a scaled version of the grid voltage for unity power factor operation. In addition, a fast inner current hysteresis loop is assumed to shape the current injected to the grid. The energy balance equation can then be written as:

$$e[n+1] = e[n] + P_{in} \cdot T - \int_{nT}^{(n+1)T} c[n] \cdot v_{grid}^2(t) dt \tag{18}$$

where e is the energy stored in the capacitor C at the n-th sampling instant, T is the sampling period of 1/(120 Hz), and Vgrid(t) is the voltage of the grid. For the following analysis, assume that the grid voltage has nominal amplitude of Vs.

Given ideal components, the grid-tie inverter can be controlled without any feedback. By selecting e=2Pin/Vsz, the integral term cancels the Pin T term exactly, so the energy stored on the buffer capacitor will be in steady-state. However, practically there are always errors in the computation of power due to losses and model deviation so the current amplitude control c will be implemented with a feedforward term plus a feedback term.

$$c[n] = c_0 + \tilde{c} \quad (19)$$

$$= \frac{2 \cdot P_{in}}{V_s^2} + k \cdot \frac{2}{V_s^2 \cdot T} \cdot \tilde{e} \quad (20)$$

Figure 15:
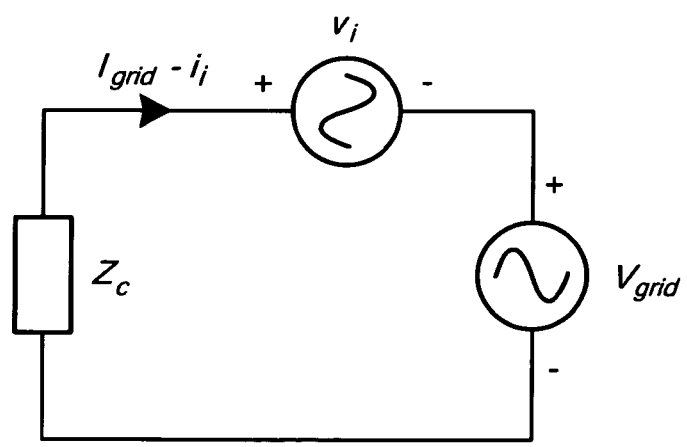
FIG. 15 is a model for calculating the output impedance of a constant power grid-tie inverter.

A model for computing the incremental output impedance is shown in FIG. 15. This analysis was first presented for the nonzero input source impedance in a unity power factor converter.

In the grid-tie inverter case, the analysis can be applied in the "reverse" direction. Let vi represent a small voltage source perturbation used to probe the output impedance of the inverter as presented to the grid. This voltage can be expressed as a perturbation to the steady-state grid voltage Vgrid(t)=Ys·cos(wot) such that $$v_{grid}(t)+v_i(t)=V_s \cdot \cos(\omega_0 t) \cdot \{1+\epsilon \cdot \cos(\omega_1 t)\} \quad (21)$$

where $\omega_0$ is the line frequency, $\omega_1 < \omega_0$ and $\epsilon \ll 1$. That is, $v_i$ corresponds to an additive perturbation in a frequency range near $\omega_0$. In order to solve for the output impedance, the corresponding perturbation in the input current needs to be solved. Assuming small enough $\epsilon$ and $\omega_1$, the integral term in (18) can first be approximated as $$c[n] \cdot \frac{TV_s^2}{2} + c[n] \cdot \epsilon \cdot TV_s^2 \cdot \cos\left(\omega_1 T \cdot \left(n + \frac{1}{2}\right)\right). \quad (22)$$

And the difference equation can then be approximated as $$e[n+1] \approx e[n] + P_{in}T - c[n] \cdot \frac{TV_s^2}{2} - c[n] \cdot \epsilon \cdot TV_s^2 \cdot \cos\left(\omega_1 T \cdot \left(n + \frac{1}{2}\right)\right). \quad (23)$$

Simplifying the expression further by cancelling the $P_{in}T$ term and the $c_0 \cdot TV_s^2/2$ term, and assuming the product of two small signal terms is negligible, the following difference equation can be written.

$$\tilde{e}[n+1] \approx \tilde{e}[n] \cdot (1-k) - c[n] \cdot \epsilon \cdot TV_s^2 \cdot \cos\left(\omega_1 T \cdot \left(n + \frac{1}{2}\right)\right) \quad (24)$$

Equivalently, the difference equation can be expressed in terms of the feedback term in the control variable using Equation (20).

$$\frac{\tilde{c}[n+1]}{2k} \approx \tilde{c}[n] \cdot \frac{1-k}{2k} - c[n] \cdot \epsilon \cdot \cos\left(\omega_1 T \cdot \left(n + \frac{1}{2}\right)\right) \quad (25)$$

Finally, the total current delivered to the grid from the converter output can be written as $$I_{grid}(t)=i_i(t)=c[n] \cdot (v_{grid}(t)+v_i(t)) \quad (26)$$

$$\approx c_0 \cdot v_{grid}(t)+\tilde{c}(t) \cdot v_{grid}(t)+c_0 \cdot v_i(t). \quad (27)$$

where $\tilde{c}(t)$ is the result of passing the discrete sequence $\tilde{c}[n]$ through a zero-order hold. The incremental current due to the voltage perturbation can then be approximated as $$i_i(t) \approx \epsilon \cdot c_0 \cdot v_{grid}(t) \cdot \cos(\omega_1 t) - \tilde{c}(t) \cdot v_{grid}(t) \quad (28)$$

$$\approx \epsilon \cdot c_0 \cdot v_{grid}(t) \cdot \cos(\omega_1 t) \cdot \{1+H(\omega_1)\} \quad (29)$$

where $H(\omega_1)$ is the response of the product of the transfer function in Equation (25) and a sampler at rate 1/T. Making the known approximations, the approximate expression for the incremental output impedance be solved in terms of Wt and re-expressed in terms of w by using substituting Wt=W−Wo.

$$Z_c(\omega) = \frac{-1}{c_0} \cdot \frac{1}{1 + \mathrm{sinc}\left(\frac{(\omega-\omega_0)T}{2}\right)\frac{-2k}{e^{j(w-w_0)T}(1-k)}} \quad (30)$$

Figure 16:
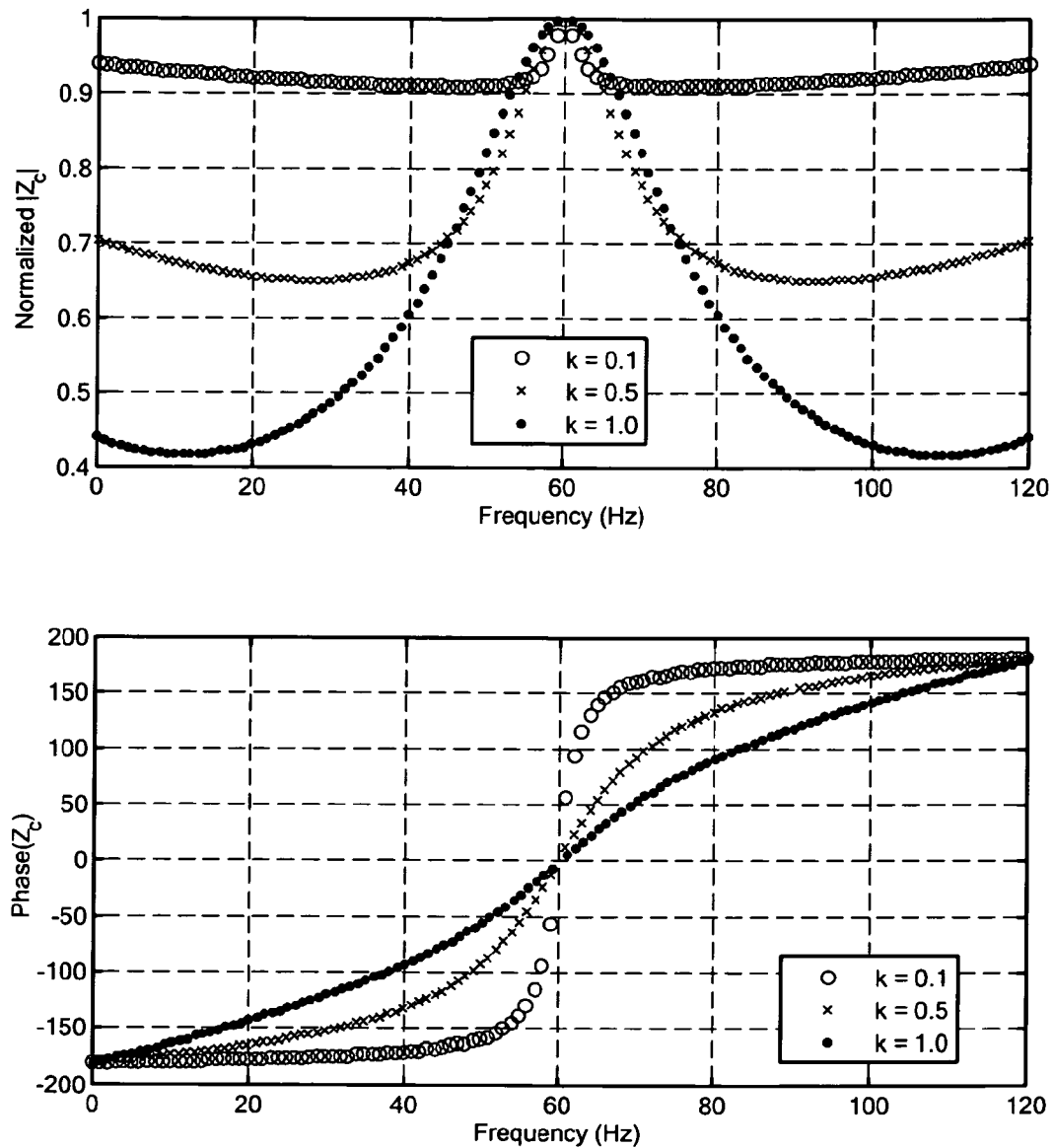
FIG. 16 is an approximate output Impedance normalized to $$\frac{1}{c0} = \frac{V_s^2}{2P_{in}}$$

FIG. 16 shows the magnitude and phase of the grid-tie inverter's incremental output impedance. Note that the expression in Equation (2) is only valid for frequencies near 60 Hz, specifically, $|\omega-\omega_0|<\pi/T$. Due to the sample and hold operations, perturbations with frequency content outside of this range will alias into this range. As shown in the figure, the incremental output impedance looks real and positive with value $V_s^2/(2P_{in})$ at 60 Hz. However, the magnitude of the incremental output impedance decreases as the perturbation frequency deviates from 60 Hz. In particular, the decrease in magnitude of the incremental output impedance is more significant for larger values of the feedback gain parameter k. Note that the phase of the incremental output impedance quickly changes 1800 as the perturbation frequency deviates from 60 Hz as well. Therefore, referring back to the stability criterion derived in Equation (17), larger feedback gain values make the grid-tie inverter more susceptible to stability problems due to decreasing impedance magnitude.

The benefit of the novel grid-tie inverter interface invention now becomes evident. By decoupling the MPPT tracking and the energy balance control loops, the system can potentially operate more stably by relying more heavily on the feedforward term than the feedback term. In addition, since the MPPT tracking is controlled by an input current sink, the change in power from the PV array can be accurately monitored by measuring the PV array voltage only. Even if the feedback loop is not fast enough to track input power transients, the feedforward path can force a resample mid-cycle (at the price of non-unity power factor for one cycle) to prevent the energy buffer capacitor voltage from running out of range. The forced resample may be triggered by passing the PV array voltage through a high-pass filter and level detectors to check for sudden large steps in input power. Note that the frequency of occurrence of such event is expected to be low.

Bus Capacitor Utilization

A DC-to-AC converter needs an energy buffer stage to store the instantaneous power difference between the input and the output ports. Such an energy buffer is typically implemented with a single large capacitor. As the system reaches periodic steady state, the instantaneous power difference manifests itself in a ripple voltage on the capacitor at twice the line frequency. The exact expression for the magnitude of the voltage ripple can be derived. Assume the grid-tie is in period steady state so that $$v_{in} \cdot i_{in} = \frac{1}{2} \cdot v_{grid} \cdot i_{grid}. \quad (31)$$

where $v_{in}$ and $i_{in}$ are DC values, and $v_{grid}$ and $i_{grid}$ are AC amplitudes. The factor of ½ arises from the RMS conversion. The instantaneous power on the buffer capacitor can be written as $$P_{cap} = P_{in} - P_{grid} \quad (32)$$

$$= P_{in} - 2 \cdot P_{in} \cdot \cos^2(\omega_0 t) \quad (33)$$

$$= -P_{in} \cdot \cos(2\omega_0 t). \quad (34)$$

If the power is integrated over the positive half capacitor ripple cycle, or a quarter of the line cycle, the peak to peak energy change in the storage capacitor can be calculated as $$\Delta E_{cap} = \int_{\substack{positive\ half \\ ripple\ cycle}} P_{in} \cdot \cos(2\omega_0 t) dt = \frac{P_{in}}{\omega_0} \quad (35)$$

Finally, the peak-to-peak energy change can be translated into peak-to-peak voltage ripple on the energy buffer capacitor.

$$\Delta E_{cap} = \frac{1}{2} \cdot C \cdot \left(V_c + \frac{1}{2}\Delta V_{r,pp}\right)^2 - \frac{1}{2} \cdot C \cdot \left(V_c - \frac{1}{2}\Delta V_{r,pp}\right)^2 \quad (36)$$

Combining (35) and (36) gives the expression for the voltage ripple on the energy buffer capacitor.

$$\Delta V_{r,pp} = \frac{P_{in}}{\omega_0 \cdot C \cdot V_c} \quad (37)$$

Equation 37 provides clear guidelines for grid-tie inverter bus capacitor sizing. For instance, given a 1 kW power system with nominal bus capacitor voltage of $V_c$=400V and maximum allowable peak-to-peak voltage ripple $\Delta V_{r,pp}$=20V, the energy buffer capacitor must be at least 332 μF.

Now consider the energy utilization of the capacitor in this case. The capacitor stores a maximum of 27.9 J but only 2.65 J is used to buffer the instantaneous power difference between the input and output ports. Thus, the energy utilization of a single bus capacitor implementation allowing 5% ripple voltage is:

$$\frac{\Delta E_{cap}}{E_{cap,max}} = 9.5\%. \quad (38)$$

The capacitor shift topologies are known to achieve higher energy utilization and lower voltage ripple. Applying such a topology to the energy buffer capacitor would lead to more effective capacitor utilization and smaller capacitor volume for the same allowable voltage ripple.

As an illustration, consider the capacitor shift topology in FIG. 17, where only one switch can re turned at any given time. For simplicity consider the base example with only $C_0$, $C_1$, $S_0$, and $S_1$ are present. Assume unit capacitance, arbitrary initial conditions and that the bus experiences discharging by a unit current source for 1 second then charging by a unit current for 1 second. Furthermore, assume that switch $S_0$, is turned on the moment discharge cycle begins.

In order to minimize the ripple seen at the top of the bus, it must be true that after $C_0$ is discharged through $S_0$ for some time, $S_0$ will turn off and $S_1$ will turn on to add the initial voltage of $C_1$ back onto the bus. Thus, the initial condition for capacitor $C_1$ must be a positive and equal to the initial voltage drop in $C_o$. After $S_1$ turns on, the bus voltage now decreases twice as fast as before.

The optimal case is when the two sub-cycles exhibit the same drop in bus voltage, i.e. $S_o$ turns off after ⅔ seconds. Thus, the optimum ripple magnitude now becomes ⅔ of that of the single bus capacitor case.

During the charge cycle, the switching sequence is the mirror sequence of the discharge cycle. That is, the capacitors will end up same charge they started with before the discharge cycle.

This method can be extended to the energy buffer bus capacitor, where the charge and discharge current waveforms are sinusoidal.

The corresponding waveforms are shown in FIG. 18. The two waveforms show the same reduction in ripple magnitude but with different timing for the switches. The switch timing can be solved by taking the inverse of the sinusoidal function at the corresponding ripple magnitudes.

The initial condition for $C_1$ only depend on the ripple size, which leads to very low voltage ratings. On the other hand, the initial condition for $C_o$ cannot be determined by using the ripple size alone. In the case of an inverter energy buffer, the initial voltage on $C_o$ instead depends upon the nominal bus voltage, which requires high voltage rating.

Consider the previous example with maximum allowable peak-to-peak voltage ripple reduced by 33%. Assume electrolytic capacitors are used and their volume scales with $$\text{Vol} \propto C \cdot V_{rating}^{1.5}. \quad (39)$$

In the conventional case, the energy buffer capacitance would need to increase by 50%, which translates 50% more volume. However, in the switched-capacitor implementation, even though the same capacitance is added, the required voltage rating is only 13.3V. Therefore, the total increase in capacitor volume from the estimate in (39) is less than 0.6%.

The theory can be generalized to any number of switches and capacitors. Using N equally sized capacitors in the switching configuration, the ripple size is reduced to $$\Delta V_{r,pp} = \frac{2}{N+1} \cdot \left(\frac{P_{in}}{\omega_0 \cdot C \cdot V_c}\right). \quad (40)$$

Furthermore, each capacitor in the array must be charged to some initial voltage before the discharging cycles begin:

$$V_{i,max} = \begin{cases} V_{bus} + \frac{1}{2} \cdot \left( \frac{P_{in}}{\omega_0 \cdot C \cdot V_c} \right), & i = 0 \\ \frac{i+1}{N+1} \cdot \frac{P_{in}}{\omega_0 \cdot C \cdot V_c}, & 1 \leq i \leq N-1 \end{cases} \quad (41)$$

In the proposed architecture, all of the values in the above three equations are readily measured. Thus, the capacitor voltages can be tightly monitored and robustly controlled. Note that evaluating $V_{i,max}$ as shown above using the maximum input power from the PV array would yield the voltage ratings for the capacitors.

To illustrate the potential application of this switched-bus-capacitor approach for a grid-tie inverter, consider the results of a basic control algorithm implemented in a SPICE simulation.

The circuit block diagram and the controller overview are shown in FIG. 19. The switched-bus-capacitor energy storage is implemented with just two capacitors for illustration purposes. The system is designed to maintain a bus voltage of 250V and deliver a maximum of 500 W to the grid. The preliminary control strategy developed here pre-computes the optimal cycle timings to switch in $C_1$ while maintaining the voltage $V_{C,1}$ within the bounds calculated from the above three equations. That is, whenever the voltage $V_{C,1}$ is about to exceed the calculated bounds, $Q_{c,o}$ is switched on so $C_o$ absorbs the rest of the charge or discharge current alone. The voltage on $C_o$ is then regulated by the energy balance control loop.

Note that in a sampled system, the worst-case behavior occurs if a large transient occurs directly after sampling has taken place. Thus, this is the case chosen for the simulation. However, by forcing the system to resample, the inverter output current settles to the final value almost immediately as shown in FIG. 20. Furthermore, the bus capacitor control is shown to keep the voltage $V_{C,1}$ within the calculated bounds in real-time.

Referring now to FIG. 21, an exemplary SC energy buffer (preferably a low-frequency SC energy buffer) is coupled between an interfacing converter (preferable a high frequency interfacing converter) and a DC/DC converter (preferably a high-frequency SC energy buffer). It should be appreciated that the DC/DC converter is optional. In this exemplary embodiment, SC energy buffer is shown to include a single so-called "backbone" bank of capacitors and a single so-called "supporting" bank of capacitors. It should however, be appreciated that one or more banks of backbone and supporting capacitors may be used. Each of the backbone and supporting banks of capacitors includes one or more capacitors. The configuration is described herein as y-z, where y is the number of capacitors in the backbone bank and z is the number of capacitors in the supporting bank.

The backbone capacitor bank contains capacitors that withstand large voltage variations during the ripple cycle, where the voltage variations are typically much greater than the prescribed peak-to-peak ripple allowance. In order to bring the bus voltage ripple within bound, the supporting capacitor bank is switched so that the voltages of the supporting capacitors are either added to or subtracted from the voltage of the backbone capacitor bank. The switching pattern is defined such that the resulting bus voltage satisfies the ripple specification. The supporting capacitors have to withstand a much smaller voltage variation during the ripple cycle. Specifically, in this two-bank energy buffer architecture, the voltage variations on the supporting capacitors are limited to one-half the specified peak-to-peak bus ripple magnitude if the supporting capacitors and backbone capacitors are equally sized.

Using this technique with a peak-to-peak ripple ratio of 10%, energy utilization can be improved to >70% with one backbone capacitor and >80% with three backbone capacitors. Moreover, this technique enables the use of capacitors with smaller capacitance and lower voltage ratings, thereby making it possible to replace limited-life electrolytic capacitors with ceramic or film capacitors. Practical uses of this technique require control schemes that can produce acceptable transient responses to time-varying power levels. Accordingly, described herein below are different control schemes and descriptions of undesirable behavior under certain operating conditions. Also, described herein is a two-step control scheme which considers tradeoffs between circuit topology and control. Also described herein are factors to consider in topology selection and switching configurations as well as control strategy requirements and tradeoffs.

Different control schemes have been proposed for the SC energy buffer shown in FIG. 21. Two approaches referred to as "Bus-Voltage Monitoring, Finite State Machine Control" and "Supporting Capacitor Monitoring, Timing Interval Control" are described below.

In the Bus-Voltage Monitoring, Finite State Machine Control scheme for the case of an SC energy buffer inside a PFC utility interface, the controller directly monitors the bus voltage and triggers finite-state-machine state transitions when the bus voltage is about to exceed pre-defined bounds. The switching pattern associated with each state is defined so that an increase in state number would boost the bus voltage up by $\Delta V_{r,pp}$ when the bus voltage dips below the lower trigger threshold, and a decrease in state number would drop the bus voltage down by $\Delta V_{r,pp}$ when the bus voltage rises above the upper trigger threshold.

Because the supporting capacitor voltages are not individually monitored, state transitions do not guarantee the desired boost or drop on the bus voltage. Also, the state machine is unaware of the power level and is not reset or "re-centered" between ripple cycles, so power transients may cause the state to saturate at either the state associated with the lowest or the highest apparent energy. During this state saturation, the SC energy buffer no longer has any available state to contain the ripple in the saturation direction. Finally, because the controller attempts to maintain the bus voltage within constant DC boundaries at all times, a transient response to a new steady-state power level can lead to extreme bus voltage transients as the controller will attempt to maintain the DC boundaries until it is driven into state saturation.

To investigate such undesirable behaviors, a SPICE simulation is performed using LTSpice from Linear Technology. An LT1249 active power factor controller is selected for the simulation because the model is readily available in the bundled component library. The simulated test bench circuit is derived from the typical application example in available datasheets (e.g. a Linear Technology, "LT1249—Power Factor Controller," Datasheet) with the output filter capacitor replaced by the 2-6 SC energy buffer described herein. In addition, the simulation model also incorporates a controller implemented with a 24-state finite state machine and an "artificial feedback voltage" as described in Minjie Chen; Afridi, K. K.; Perreault, D. J.; "Stacked switched capacitor energy buffer architecture," *Applied Power Electronics Conference and Exposition (APEC), 2012 Twenty-Seventh Annual IEEE*, vol., no., pp. 1404-1413, 5-9 Feb. 2012. The design specifications include a nominal output voltage of 320V and a 20% peak-to-peak ripple ratio.

Referring now to FIGS. 22A, 22B, simulation results are shown in the form of plots of bus voltage (FIG. 22A) and FSM state (FIG. 22B) vs. time. FIG. 22A illustrates a transient bus voltage response of a 2-6 SC energy buffer in a PFC due to a 30% load power step. As seen in FIG. 22A, the bus voltage exhibits unacceptable over- and undershoots when the state machine state saturates at states 1 and 24 in response to 30% load power level transients. It should be noted that the artificial feedback voltage does not faithfully reproduce the over- and undervoltage conditions. The extreme overshoots from the shortcomings of the controller are amplified by two additional factors. The capacitances of the capacitors in the energy buffer are greatly reduced under the assumption of proper ripple reduction. Moreover, the capacitors are linked in series, which further diminishes the effective capacitance seen on the bus.

In the Supporting Capacitor Monitoring, Timing Interval Control scheme, a similar control problem to that mentioned above (in connection with the bus-voltage monitoring, finite state machine control scheme) can be illustrated considering FIG. 21 in its inverter configuration. In this case, the individual supporting capacitor voltages are monitored while giving up the task of controlling the backbone capacitor voltage to the energy-balance controller of the inverter. The control logic pre-computes the charge and discharge intervals for each supporting capacitor relative on the phase of the ripple cycle and enables these intervals when the capacitor voltages are within their reference minima and maxima.

The reference voltages scale linearly with power level and the ripple is reduced by a fixed ratio. Therefore, the resulting bus voltage behavior is very similar to that of a single capacitor implementation—the backbone capacitor experiences the natural transient and settling behaviors from the energy-balance controller, and the supporting capacitors are used to keep the ripple voltage within the prescribed limits.

However, this controller does not necessarily make the most efficient use of the supporting capacitor bank—all capacitors in the supporting bank are used regardless of power level. As a result, the supporting capacitor voltage references must be adjusted significantly in response to power variations. Since the voltage on capacitors cannot change instantaneously, the supporting capacitors will need time to be charged or discharged to the new reference levels. This introduces a few cycles where the supporting capacitors experience large imbalance in their charge and discharge times. In the extreme case, the supporting capacitors may not be used in either the charge or the discharge cycle at all, thus exposing the bus to the full-swing ripple from the backbone capacitor with reduced capacitance during the corresponding half cycle.

A SPICE simulation is again used to demonstrate the potential problems with this control strategy. A simulated test bench circuit was implemented using a feedforward energy-balance controlled solar inverter (e.g. as described herein above) along with a 1-8 SC energy buffer. The nine supporting capacitors are monitored and managed by the controller with pre-computed switch timings discussed above, and the backbone capacitor is controlled by the feedforward energy-balance controller of the solar inverter. The design specifications include a nominal output voltage of 250V and a 10% peak-to-peak ripple at maximum power.

Referring now to FIGS. 23A, 23B, simulation results (plots of buffer voltage (FIG. 23A) and support capacitor voltages (FIG. 23B) vs. time) are shown which illustrate a transient bus voltage response of a 1-8 SC energy buffer in a solar inverter due to a 30% input power step. As shown in FIGS. 23A, 23B, the bus voltage experiences an unacceptable undershoot when the supporting capacitor voltages references are dramatically increased in response to 30% power level transients. FIG. 23B shows the nonparticipation of the supporting capacitors during their discharge half-cycles, resulting in the lack of buffering during the discharge half cycle. The energy buffer uses the unipolar switching configuration and is controlled by the supporting capacitor monitor, timing interval controller. The discharge is disabled in order to charge the supporting capacitors up to the new reference values, exposing the full-swing backbone capacitor ripple.

There are many tradeoffs and design considerations to be considered in designing an SC energy buffer. One basis for making these tradeoffs is described below. In principle, energy utilization can be increased arbitrarily at the expense of switching frequency and buffer complexity. Desirable transient performance implies control requirements that also impact SC buffer design. Such tradeoffs are discussed below in the context of two general SC buffer architectures, unipolar and bipolar switching configurations shown in FIGS. 24A, 24B.

FIG. 24A is block diagram of a 1-z architecture of an SC energy buffer implemented with ground-referenced switches only for unipolar switching configuration while FIG. 24B is a block diagram of a 1-z architecture of an SC energy buffer implemented with four additional switches (as compared with the FIG. 24A implementation), to achieve bipolar switching configuration.

A first consideration in designing the energy buffer is energy utilization when the design goal is to reduce the overall amount of physical capacitance in the system. Equation (1) summarizes the energy utilization for a non-switching, single capacitance buffer. The energy utilization equation can be generalized for the SC case shown in FIG. 21 by taking the sum of $\Delta E$, the change in energy stored, divided by the sum of $E_{max}$, the maximum energy stored, of all the capacitors in the energy buffer. This is shown in Equation (42).

$$E_{util} = \frac{\sum_{j=1}^{y} \Delta E_{backbone}(j) + \sum_{i=1}^{z} \Delta E_{support}(i)}{\sum_{j=1}^{y} E_{max,backbone}(j) + \sum_{i=1}^{z} E_{max,support}(i)} \quad (42)$$

The variables in Equation (42) depend upon not only the nominal bus voltage, the specified ripple ratio and the selected capacitor size, but also the switching configuration. Thus, the cases shown in FIG. 24A, 24B illustrate a tradeoff between topology and switching complexity versus capacitor utilization. Note that FIGS. 24A, 24B illustrate two embodiment having a single backbone capacitor, i.e., y=1 in each embodiment, although more backbone capacitors could be employed with arbitrary y.

Capacitor configurations are next described in conjunction with FIGS. 25A-25C which illustrate the energy utilization of an SC energy buffer with bipolar switching configuration versus different numbers of backbone and supporting capacitors for three different ripple ratios (10%, 5% and 2% ripple ratios).

FIG. 25A is a plot of overall energy utilization (in percent) of an SC energy buffer with bipolar switching configuration versus different numbers of backbone and supporting capacitors for a 10% peak-to-peak ripple.

FIG. 25B is a plot of overall energy utilization (in percent) of an SC energy buffer with bipolar switching configuration versus different numbers of backbone and supporting capacitors for a 5% peak-to-peak ripple.

FIG. 25C is a plot of overall energy utilization (in percent) of an SC energy buffer with bipolar switching configuration versus different numbers of backbone and supporting capacitors for a 2% peak-to-peak ripple.

At least Two conclusions can be drawn from the plots of FIGS. 25A-25C. First, for each ripple ratio and number of backbone capacitors used, there exists an optimal number of supporting capacitor which maximizes the energy utilization of the overall energy buffer. Secondly, the energy utilization can be improved with diminishing return by introducing more backbone capacitors.

In practical circuits, however, the number of backbone capacitors cannot be increased indefinitely. The switching frequency of the SC energy buffer is directly proportional to the number of capacitors in the energy buffer. In particular, the switching frequency can be approximated as $$f_{sw} \approx 2f_{grid} \cdot p \cdot y \cdot (z+1), \quad (43)$$

where p=2 for unipolar switching schemes and p=4 for bipolar switching schemes.

In view of the above, it should be clear to one of ordinary skill in the art, that increasing the number of capacitors would unavoidably increase the incurred switching loss. Also, excessive number of capacitors would cause the SC buffer switching frequency to approach that of the PFC or inverter controllers, consequently causing undesirable interactions between the two control loops.

In an attempt to ensure time-scale separation between the low-frequency energy buffer control and high-frequency PFC or inverter control, the number of capacitors should be limited. When designing a switching converter, the switching frequency is expected to be high with respect to the natural frequency of the energy storage elements. This extends to the case of a SC energy buffer. While any specific case requires a control loop and stability analysis, a similar rule-of-thumb to keeping the natural time constant in the canonical models long compared to the switching period, e.g. 10 times the switching period, is to have the SC buffer switching at below 1/10 the frequency of the interfacing switching converter. As illustrated in FIG. 21, high-frequency switching converters can be found on either side of the SC energy buffer.

For example, assuming the switching frequency of the high-frequency loop is on the order of a hundred kilohertz, average switching frequency of the energy buffer control might be constrained to be less than approximately ten kilohertz. In other words, the relationship in Equation (4) must hold.

$$p \cdot y \cdot (z+1) \le \frac{10 \text{ kHz}}{2f_{grid}} \quad (44)$$

This establishes an upper bound on the number of capacitors that can be incorporated in these SC energy buffers.

Referring again to FIGS. 25A-25C, the unfeasible combinations of capacitor configurations are greyed out. As shown, the achievable improvement in energy utilization is limited, albeit still significant, as this becomes a constrained optimization problem. For peak-to-peak ripple ratios of 2%, 5%, and 10%, the optimal achievable energy utilizations are realized with only one or two backbone capacitors.

In a SC energy buffer, the bus voltage is no longer an accurate measure of the energy stored in the energy buffer. Therefore, when integrating with conventional power-factor correction controllers or energy-balance inverter controllers, the bus voltage cannot be directly used as the feedback voltage. Some embodiments, for example, use an artificial feedback voltage to ensure compatibility with existing hardware. However, such an artificial feedback voltage is not guaranteed to be sinusoidal and may not reliably detect under- and over-voltage conditions as shown previously.

By implementing the backbone capacitor bank with only one capacitor, a voltage feedback signal is available at the single backbone capacitor for interfacing with conventional power-factor correction controllers or energy-balance inverter controllers. Because there is a single path in the backbone capacitor bank through which the energy buffering current must flow, the single backbone capacitor voltage can be treated as an AC-scaled version of the single electrolytic capacitor voltage in traditional energy buffers.

Energy utilization is still high with a single backbone capacitor. Specifically, in the case of 10% peak-to-peak ripple ratio, using a single backbone capacitor reduces the achievable energy utilization from 77.9% to 71.2%, still a sizable improvement from 18.1%. In the cases of 5% and 2% peak-to-peak ripple ratios, the optimal energy utilizations remain unchanged. Also, this simplification enables the exclusive use of ground-referenced switches in unipolar switching configurations.

Switching Topology Tradeoffs are next described. In view of the above, the 1-z architecture shown in FIGS. 24A, 24B is considered with N=z+1 defined as the total number of capacitors in the SC energy buffer. The backbone capacitor is denoted as $C_0$, and the supporting capacitors are denoted as $C_1$ through $C_{N-1}$. Two types of switching configurations can be explored: unipolar and bipolar.

In unipolar switching, supporting capacitor voltages are added to the backbone capacitor voltage when it is too low, but are never subtracted. With equally sized capacitors, the resulting peak-to-peak bus voltage ripple with respect to the total number of capacitors is $$\Delta V_{r,pp,unipolar} = \frac{2}{N+1} \cdot \left( \frac{P}{\omega_0 \cdot C \cdot V_C} \right), \quad (45)$$

in which:
P is the power level,
$\omega_0$ is the angular frequency of the grid,
C is the capacitance of all capacitors in the SC energy buffer; and
$V_C$ is the nominal voltage of the grid.

If the backbone capacitor voltage is regulated by energy balance control, i.e., to achieve constant mean squared voltage, using the unipolar switching configuration will result in a variable mean bus voltage. Specifically, the mean bus voltage will increase with increasing power level, but will always be above the regulated mean voltage of the backbone capacitor. For this reason, the unipolar switching configuration is unsuitable for PFC applications with constant output voltage requirements. However, it is compatible with solar inverters where the bus voltage must remain sufficiently high in order to maintain control of the grid. In addition, because the mean bus voltage is positively correlated to the power level, it ensures fast response time in hysteresis current controlled inverters when the output current amplitude is increased. Finally, the one-sided switching configuration also has the added benefit of being able to utilize ground-referenced switches only. By rearranging the supporting capacitor bank and the backbone capacitor as shown in FIG. 24A, the unipolar SC energy buffer avoids high-side gate drives.

In the bipolar switching configuration, four additional switches are added in order to invert the polarity of the supporting capacitor voltages during parts of the ripple cycle. This enables ripple reduction with a constant mean bus voltage. Supporting capacitor voltages are added to the backbone capacitor voltage when it is too low and are subtracted from the backbone capacitor voltage when it is too high. As such, the bipolar switching configuration is compatible with power-factor correction applications without an additional dc-dc converter at the output. Moreover, the bipolar switching configuration uses the supporting capacitors more efficiently; it achieves a peak-to-peak voltage ripple of $$\Delta V_{r,pp,bipolar} = \frac{1}{N} \cdot \left( \frac{P}{\omega_0 \cdot C \cdot V_C} \right), \quad (46)$$

approximately twice as effective, in terms of ripple reduction capability versus number of capacitor added, as the unipolar switching configuration. The ripple advantage requires four extra switches and high-side gate drives, which contribute to additional switching losses.

The steady-state maximum supporting capacitor voltages under maximum power rating for both switching configurations are outlined here to supplement energy utilization calculations and to facilitate capacitor selections.

$$V_{max,unipolar}(i) = \frac{i+1}{N+1} \cdot \frac{P_{max}}{\omega_0 \cdot C \cdot V_C} \quad (47)$$

$$V_{max,bipolar}(i) = \frac{i+1}{2N} \cdot \frac{P_{max}}{\omega_0 \cdot C \cdot V_C} \quad (48)$$

for i={1, 2, ..., N−1}. For the backbone capacitor, the maximum capacitor voltage is the same for both switching configurations and can be calculated as $$V_{max}(0) = V_C + \frac{1}{2} \cdot \frac{P_{max}}{\omega_0 \cdot C \cdot V_C}. \quad (49)$$

Below, control strategies (including a two-step control strategy) for both unipolar and bipolar switching configurations are presented.

A controller capable of handling power level transients must not prescribe strict DC voltage boundaries constraints on the bus voltage. Instead it should allow the DC level of the bus voltage to undergo natural settling while maintaining the AC ripple magnitude within specification around the DC level. This enables the controller to evenly distribute the charge buffering to the supporting capacitors instead of leaving the terminal-state capacitors to absorb an unusual large amount of leftover charges. Also, the controller must effectively reset its state from ripple cycle to ripple cycle in order to guarantee the availability of reserve buffering states in the event of power transients. Finally, the controller must intelligently manage the supporting capacitors so they can remain effective in reducing the ripple magnitude at all time. This translates to maintaining the reference voltage levels of the supporting capacitors relatively constant regardless of power level.

These requirements can be satisfied by adopting a two-step control strategy: capacitor participation optimization and switch timing determination. The controller first determines the optimal number of capacitors to use in buffering the bus voltage, and then compute the switch timings for the allocated supporting capacitors to maximally reduce the bus voltage ripple. In a 1-z SC energy buffer configuration, the single backbone capacitor voltage is used as the feedback node to either a PFC or an inverter controller. Thus, the SC energy buffer controller discussed here passes the regulation of the backbone capacitor voltage to an external interfacing controller.

Two design examples are described to better illustrate the operation and the effectiveness of the proposed control strategy. The specification for the illustrative design examples is a 500 W inverter with a 250V nominal bus voltage and a 10% peak-to-peak ripple ratio. For maximum energy utilization, a 1-8 SC configuration is chosen for the unipolar switching scheme. For the bipolar switching scheme, a 1-4 SC configuration is chosen for comparable switching complexity and ripple reduction power.

In order to improve, or ideally optimize, supporting capacitor participation, the controller samples the current power level and calculates a number of capacitors required to keep the voltage ripple within the specification. Preferably, the controller samples the current power level and calculates the minimum number of capacitors required to keep the voltage ripple within the specification. The sampling frequency is twice the line frequency for the unipolar switching configuration and four times the line frequency for the bipolar switching configuration.

Referring now to FIGS. 26A, 26B, sampling points with respect to the ripple cycle are illustrated. FIG. 26A is a plot of sampling points and control variables, $v_c(1)$ and $v_d(i)$, in relation to the ripple cycle and the control ramps for a unipolar switching configuration and FIG. 26B is a plot of sampling points and control variables, $v_c(i)$ and $v_d(i)$, in relation to the ripple cycle and the control ramps for a bipolar switching configuration.

Note that the minimum required number should have a lower bound at 1 because the backbone capacitor is always used, and can be derived by inverting the ripple magnitude Equations (45) and (46) for the two different switching topologies. Equation (50) shows the solution for the unipolar switching configuration and Equation (51) shows the solution for the bipolar switching configuration. Note that P[n] is the sampled power level during the current ripple cycle.

$$N_{unipolar}[n] = \max\left( \text{ceil}\left( \frac{2P[n]}{\omega_0 \cdot C \cdot V_C \cdot \Delta V_{r,pp}} - 1 \right), 1 \right) \quad (50)$$

$$N_{bipolar}[n] = \max\left( \text{ceil}\left( \frac{P[n]}{\omega_0 \cdot C \cdot V_C \cdot \Delta V_{r,pp}} \right), 1 \right) \quad (51)$$

One goal of this technique is to have a sufficient number of capacitors in reserve, ready to kick in during a sudden power level increase. By only using the minimum required number of capacitors, the controller ensures that there is a sufficient number of capacitors in reserve, ready to kick in during a sudden power level increase. In addition, relatively constant energy storage in the supporting capacitors is maintained over a wide range of power levels. Consequently, the system is able to respond to large power transients by adjusting the number of capacitors used, rather than drastically changing the energy stored on all the supporting capacitors.

Referring now to FIGS. 27A, 27B, these figures illustrate the supporting capacitor voltages (FIG. 27B) and the expected ripple size (FIG. 27A) across all possible power levels in a 1-8 unipolar SC energy buffer design such as that described herein above. The number of switching events is reduced as the power level decreases, which improves the overall system efficiency.

Given the number of capacitors to use, the controller proceeds to compute the switch timings for the capacitors based upon a current (or substantially current) power level. That is, the charge and discharge cycle durations are adjusted for each supporting capacitor based upon the current sample of its voltage and its respective reference values.

Since the charging and discharging of the capacitors by the double-line frequency energy flow are inherently nonlinear with respect to time, a nonlinear element may be inserted into the control loop to enable the use of simple linear function in the rest of the controller. In general, such a nonlinear element takes form of a control ramp upon which the switching event is triggered. For the unipolar switching configuration, the control ramp is a double-line frequency sine wave phase-locked to the grid. In addition, the unipolar control ramp is assumed to be normalized with unit peak-to-peak amplitude and ramps from 0V to 1V.

For a bipolar switching configuration, the ripple cycle can be further broken up into two sub-cycles. There is the additive sub-cycle where the supporting capacitor voltages are added to the bus voltage, and the subtractive sub-cycle where the supporting capacitor voltages are subtracted from the bus voltage. Thus, the same cycle duration computation needs to be performed twice as often as in the unipolar case. The control ramp function for the bipolar switching configuration then must be periodic at four times the line frequency. Specifically, the bipolar control ramp is a rectified and inverted version of the unipolar control ramp and ramps from 0V to 0.5V. The two control ramp signals in relation to their respective control voltages and sampling points are shown in FIG. 26.

Because the control ramps are assumed to be normalized, the control equations will also be defined in a power-independent fashion. All sampled values are normalized to the full-swing ripple magnitude on the backbone capacitor. The normalizing function is defined as $$\bar{v}[n] = \frac{v[n]}{P[n]/(\omega_0 \cdot C \cdot V_C)}, \tag{52}$$

In which v[n] is the sampled supporting capacitor voltage.

Based on the normalized sampled supporting capacitor voltages, the allowable discharge and charge durations for each capacitor are calculated from (53) and (54), $$disch(i) = \max\left(\min\left(\bar{v}_i[n] - \frac{i}{D_x[n]}, \frac{1}{D_x[n]}\right), \frac{k}{D_x[n]}\right) \tag{53}$$

$$charg(i) = \max\left(\min\left(-\bar{v}_i[n] + \frac{i+2}{D_x[n]}, \frac{1}{D_x[n]}\right), \frac{k}{D_x[n]}\right) \tag{54}$$

where i={1, 2, ..., N−1} denotes the supporting capacitor index, $1/D_x[n]$ is the normalized step in voltage between the supporting capacitors, and k∈[0, 1) determines the minimum duration. The variable x in $D_x[n]$ denotes the switching configuration. The discrete step size definitions differ in the two switching configurations and are shown in (55) and (56).

$$\frac{1}{D_{unipolar}[n]} = \frac{1}{N_{unipolar}[n]+1} \tag{55}$$

$$\frac{1}{D_{bipolar}[n]} = \frac{1}{2N_{bipolar}[n]} \tag{56}$$

The minimum duration defined by k determines the tradeoff between transient ripple size and settling time. If k is very close to zero, the controller may allow the capacitor voltages to reach their new reference values quicker by imposing a large imbalance between their charge and discharge cycles. However, larger imbalances between the charge and discharge cycles increase exposure of the bus voltage to the ripples of the backbone capacitor, resulting in larger transient ripple. If k is very close to one, the controller will maintain ripple buffer throughout more of the ripple cycle. But the limited imbalance between the charge and discharge cycles results in longer settling times. Note that by managing the capacitor participation based on power level, the reference voltages for the supporting capacitors are kept fairly constant. Therefore, k can be set very close to one for adequate buffering without the risk of unreasonably long settling times.

Having computed the allowable charge and discharge durations for each supporting capacitor, the actual control voltages can be calculated by a cumulative sum. More specifically, the individual charge and discharge control trigger levels are $$v_d(i) = \sum_{m=i}^{N_x[n]-1} disch(m) \tag{57}$$

$$v_c(i) = \sum_{m=i}^{N_x[n]-1} charg(m) \tag{58}$$

When $N_x[n]-1<i$, the $i^{th}$ control voltage is set to zero, which means that supporting capacitor i is not being used in the current ripple cycle. Furthermore, higher-indexed switches have precedence over lower-indexed switches. That is, if $v_c(1), v_c(2), \ldots, v_c(M) > v_{mmp}$, switches 1, 2, ..., M−1 are all disabled, and only switch M is turned on. One exemplary embodiment of a two-step controller is shown in FIG. 28.

Referring now to FIG. 28 a two-level SC energy buffer controller is shown, where $v_0$ denotes the backbone capacitor voltage, $v_i[n]$ for i={1, 2, ..., N−1} and $v_c$ denotes the sampled supporting capacitor voltage, and $v_d$ corresponds to the charge and discharge control signals respectively. The controller includes a capacitor participation optimizer couple to a switch timing determination system. A signal P corresponding to a sampled power level during the current ripple cycle is provided to an input of the capacitor participation optimizer and also to an input of the switch timing determination system. Capacitor participation optimizer processes the signal fed thereto and provides a processed signal N to switch timing determination system.

Switch timing determination system also receives signal P as well as sampled supporting capacitor voltages, $v_i[n]$ for i={1, 2, ..., N−1}.

Switch timing determination system includes an optional norm function processor which normalizes the supporting capacitor voltages provided thereto prior to the signals being coupled to charge and discharge processors which provide signals to respective ones of summing circuits which output charge $v_c$, and discharge signals $v_d$, respectively, to a charge/discharge-signal processor here illustrated as a state machine and in particular, illustrated as a finite state machine (FSM). It should, of course, be appreciated that charge/discharge-signal processor may be implemented as another types of processor depending upon the requirements of the particular application.

Charge/discharge-signal processor has a control ramp system coupled. Control ramp receives a backbone capacitor voltage signal $v_0$ and provides a rampel control signal to the charge/discharge-signal processor (e.g. an FSM). In response to the signals provided thereto ($v_c$, $v_d$ and ramp control signal) the charge/discharge-signal processor provides output signals $S_0$-$S_{N-1}$, $S_{add}$ and $S_{sub}$.

As described above, the control ramps are assumed to be perfectly sinusoidal, or rectified sinusoidal, with zero phase error. Practical circuits, however, have imperfections (e.g. distortion and phase error). Practical phase-locked loops, for example, may not guarantee zero steady-state phase error. If a phase error persists between the control ramp and the actual ripple cycle, systematic errors would be introduced to the steady-state voltages of all supporting capacitors, which would result in an increased overall bus voltage ripple. Additionally, the grid voltage may not be perfectly sinusoidal and the ripple voltage may exhibit distortions. Distortion from the assumed sinusoidal profile would introduce unsystematic imbalances in the charge and discharge of the supporting capacitors, which again causes the overall bus voltage ripple to increase.

Therefore, the generated phase-locked signal cannot always be used. Instead, the control ramps can be derived from the backbone capacitor voltage. By passing the AC component of the backbone capacitor voltage through a clamped capacitor circuit, a unipolar control ramp signal from 0V to the peak-to-peak ripple magnitude can be extracted. Similarly, the bipolar control ramp can be created by inverse rectifying the AC component of the backbone capacitor voltage, then processing the resulting signal with a clamped capacitor circuit. This yields a bipolar ramp signal from 0V to the peak ripple amplitude. Alternatively, both control ramp signals can be produced digitally after sampling the backbone capacitor voltage.

Generating the ramp functions directly from the backbone capacitor voltage guarantees zero distortion and phase error between the control signals and the actual ripple cycle. Furthermore, normalization of the sampled signals may not be required because the normalization factor is the inverse of the peak-to-peak ripple amplitude on the backbone capacitor. In practice, implementing control logic with the large voltages may not be feasible. Therefore, resistive dividers can be employed as long as the divider ratio is consistent between the control ramp generation and the supporting capacitor sampling.

It should be noted that it is not necessary to have a pre-charge circuit when using the control strategy described in the previous sections. By adjusting the switch timings, the controller automatically introduces imbalances between the allowable charge and discharge durations of the supporting capacitors so the capacitor voltages reach their reference.

This is a tradeoff. The pre-charge circuit can facilitate the process of charging the supporting capacitors to their reference levels at startup, which allows the system to reach steady-state operation faster. Secondly, the pre-charge circuit can assist in maintaining the charges on unused capacitors. The proposed controller only controls charge and discharge duration on the active supporting capacitors in the ripple cycle; it has no control over the nonparticipating capacitors in reserve. Thus, having a pr-charge circuit adds an extra layer of security to ensure that the capacitors in reserve remain ready in the event of a power level increase. Finally, by using a pre-charge circuit to set up all the capacitors to known states initially, the SC energy buffer can in principle be operated without a requirement to monitor the voltage on every supporting capacitor in the buffer.

Aside from the overvoltage protection circuitry commonly found in PFC and inverter controllers, the SC energy buffer controller can incorporate an additional layer of protection to guard against large transients between sampling periods. Switching duration computations are performed at the beginning of each sampling period. If the transient between sampling periods is large enough, the computed and ideal switch timings may differ significantly, resulting in over- or under-buffering conditions.

"Over-buffering" occurs when the actual ripple magnitude is significantly smaller than the expectation of the controller. When such an event occurs, the boost and drop in the bus voltage from switching the supporting capacitors will be greater than what is actually needed. Similarly, "under-buffering" occurs when the actual ripple magnitude is significantly larger than the expectation of the controller. Consequently, the boost and drop in the bus voltage from switching the supporting capacitors will be smaller than the required values. Both over- and under-buffering conditions result in larger than expected ripple.

Such undesirable conditions can be avoided by introducing feedforward compensation, i.e., a forced resampling triggered on over- and undervoltage thresholds. Once the bus voltage exceeds the defined thresholds, the controller resamples the current power level and the supporting capacitor voltages to recompute the number of active capacitors required and recalculate the switch timings. In over-buffering conditions, the recomputed number of active capacitors would be decreased, whereas in under-buffering conditions, the recomputed number of active capacitors would be increased.

The unipolar 1-8 SC energy buffer and the bipolar 1-4 SC energy buffer design examples have been successfully implemented and simulated in SPICE with a 500 W inverter. The system is implemented with control ramps generated from the backbone capacitor voltage to avoid distortion and phase errors. In addition, the minimum duration constant k is set to 0.9 and a pre-charge circuit is configured to manage the voltages of supporting capacitors in reserve. The steady-state bus voltage ripple and the backbone capacitor feedback voltage are shown in FIGS. 29A-29D. The simulated result matches the analytical solution quite well. The external inverter control manages the backbone voltage and holds it to 250V. The peak-to-peak ripple is set to 10% by inverting Equations (45) and (46) and solving for the required capacitance.

FIGS. 29A, 29B are plots of voltage (V) vs. time (seconds) which illustrate steady-state bus voltage waveforms of a 1-9 SC energy buffer with unipolar switching experiencing increasing power level and (b) 1-4 bipolar SC energy buffer with bipolar switching experiencing decreasing power level. In FIGS. 29A, 29B, the power level increases from 96 W to 480 W with +48 W step size every 50 ms where $v_0$ denotes the backbone capacitor voltage, and $v_i$ for i={1, 2, . . . , N−1} denotes the supporting capacitor voltage.

FIGS. 29C, 29D are plots of voltage (V) vs. time (seconds) which illustrate steady-state bus voltage waveforms of a 1-9 SC energy buffer with unipolar switching experiencing increasing power level and 1-4 bipolar SC energy buffer with bipolar switching experiencing decreasing power level where the power level decreases from 480 W to 96 W with a −96 W step size every 50 ms and where $v_0$ denotes the backbone capacitor voltage, and $v_i$ for i={1, 2, ..., N−1} denotes the supporting capacitor voltage.

The bus voltage in the unipolar switching energy buffer exhibits a power-dependent mean as discussed above, and remains well above the grid voltage to retain control. As the power level increases, more supporting capacitors become involved in ripple buffering, as demonstrated by the capacitor activities in the subplot of FIGS. 29A-29B. Conversely, the bus voltage in the bipolar switching energy buffer has a constant mean over the all power levels as shown in FIGS. 29C-29D. With decreasing power level, the supporting capacitors sequentially become inactive, leaving only the backbone capacitor to buffer the small power ripple.

In a sampled system, the worst-case behavior occurs if a large transient occurs immediately after sampling has taken place. Thus, this is the case chosen for the transient response characterization. Positive and negative 30% steps in input power level are introduced to the inverter with the bipolar 1-4 SC energy buffer.

FIGS. 30A, 30B are plots of voltage (V) vs. time (seconds) which illustrate transient bus voltage response of a bipolar 1-4 SC energy buffer in a solar inverter due to 30% input power step where the power steps from 480 W to 336 W at 50 ms and back to 480 W at 100 ms. and where the second supporting capacitor voltage deviates from its reference value shortly after 100 ms, but the two-step controller brings it back to its reference level in less than two ripple cycles. As can be seen in FIGS. 30A, 30B the positive step in power causes an under-buffering condition until the bus voltage crosses the upper threshold. It should be noted that the over and under-voltage thresholds are defined to be 1.5 times the ripple specification, i.e. 15% peak-to-peak from 250V, and shown in FIG. 30 as dotted lines. At this point, the controller immediately resamples and recomputes the switch timings to pull the bus voltage back within bounds. Even though the transient may cause some supporting capacitor voltages, $v_2$ in this particular example, to deviate from their reference values, the two-step controller is able to bring the system back to steady-state in just a few cycles, without any unacceptably large transient ripple.

Switched-capacitor energy buffers have been shown to achieve much better energy utilization than their single electrolytic counterparts. However, overshooting and the possibility of losing control to the grid are major concerns. The proposed control strategy can potentially minimize the possibility of such undesirable behaviors by maintaining an appropriate number of supporting capacitors in reserve to guard against sudden transients in power level.

Two SC energy buffers—1-8 with unipolar switching and 1-4 with bipolar switching—have been examined in a 500 W inverter. The simulated models show excellent agreement with the calculated results. Furthermore, the system is able to maintain a minimum bus voltage of 250V and limit the peak-to-peak ripple to 10% under steady-state operation. It is also shown that the new control strategy can successfully maintain the ripple specification under significant power level transients.

FIG. 31 shows an example embodiment of the stacked switched capacitor energy buffer: the 2-6 bipolar SSC energy buffer. This topology has two backbone capacitors, C11 and C12; six supporting capacitors, C21, C22, C23, C24, C25, and C26; and twelve switches, S11, S12, S21, S22, S23, S24, S25, S26, Sh1, Sh2, Sh3, and Sh4. This circuit can keep the bus voltage ripple within 10% of nominal value when designed and operated in the manner described below.

The eight capacitors are chosen to have identical capacitance, but different voltage ratings. The two backbone capacitors, C11 and C12, have voltage rating of 1.6Vnom, where Vnom is the nominal value of the bus voltage (Vbus). The voltage rating of the six supporting capacitors is as follows: 0.6Vnom for C21, 0.5Vnom for C22, 0.4Vnom for C23, 0.3Vnom for C24, 0.2Vnom for C25 and 0.1Vnom for C26. A precharge circuit (not shown in FIG. 31, but discussed below) ensures that the following initial voltages are placed on the eight capacitors: 0.4Vnom on C11, 0.4Vnom on C12, 0.5Vnom on C21, 0.4Vnom on C22, 0.3Vnom on C23, 0.2Vnom on C24, 0.1Vnom on C25, and 0V on C26.

Referring now to FIG. 31, one particular example of an n-m bipolar stacked switched capacitor energy buffer circuit is shown in FIG. 31 where n=2 and m=6 also called a 2-6 bipolar stacked switched capacitor energy buffer circuit.

The exemplary circuit includes a first block of parallel coupled switches and capacitors S11, C11, S12, C12 and a second block of parallel coupled switches and capacitors S21, C21, S22, C22, S23, C23, S24, C24, S25, C25, S26, C26. The first and second blocks are coupled in series across a bus voltage $V_{bus}$. Switches Sh1, Sh2, Sh3, Sh4 are disposed in the second block to provide selected signal paths between the first and second blocks.

As noted above, the capacitors are preferably of a type that can be efficiently charged and discharged over a wide voltage range (e.g., film capacitors). The switches are disposed to selectively couple the capacitors to enable dynamic reconfiguration of both the interconnection among the capacitors and their connection to a buffer port. The switches are cooperatively operated as a switching network such that the voltage seen at the buffer port varies only over a small range as the capacitors charge and discharge over a wide range to buffer energy.

By appropriately modifying switch states of the SSC energy buffer circuit, the SSC energy buffer circuit absorbs and delivers energy over a wide individual voltage range, while maintaining a narrow-range voltage at the input port. This enables maximal utilization of the energy storage capability.

A bipolar stacked switched capacitor energy buffer circuit can be controlled as follows. Rather than charging the n capacitors only in series with the m capacitors, a state can be introduced by turning $S_{h3}$ and $S_{h4}$ (or $S_{h1}$ and $S_{h2}$) on at the same time in which the n capacitor is charged directly. An example of the modified control is shown in FIG. 32 for the circuit 300 (the 2-4 bipolar SSC energy buffer circuit) of FIG. 31. The modified control is described herein in the section entitled: "Enhanced Bipolar Stacked Switched Capacitor Energy Buffer". With this modified control, and assuming that all m and n capacitors have the same capacitance, the expression for energy buffering ratio, $\gamma_b$ becomes:

$$\gamma_b = \frac{n}{n}$$

FIG. 32 shows the switch states, the capacitor voltages and the resulting bus voltage for the 2-6 bipolar SSC energy buffer over a complete charge and discharge cycle. When the energy buffer starts charging up from its minimum state of charge, Sh1, Sh4, S21 and S11 are turned on with all the other switches turned off. In this state, C11 and C21 are connected in series and charged until the bus voltage rises from 0.9Vnom to 1.1Vnom. At this instant the voltage of C21 (V21) reaches 0.6Vnom and the voltage of C11 (V11) reaches 0.5Vnom. Then S21 is turned off and S22 is turned on; and the bus voltage drops back down to 0.9Vnom. Then as the charging continues, the voltage of C22 rises to 0.5Vnom and the voltage of C11 reaches 0.6Vnom and the bus voltage again reaches 1.1Vnom. Next S22 is turned off, S23 is turned on and C23 is charged.

This process is repeated until C26 is charged. At this stage all the supporting capacitors are at their maximum voltage; the voltage of the backbone capacitors is: Vnom on C11 and 0.4Vnom on C12; and the bus voltage is 1.1Vnom. Next Sh1 and Sh4 are turned off, and Sh3 and Sh2 are turned on. This connects C26, and the other supporting capacitors, in reverse orientation with C11 and the bus voltage again drops to 0.9Vnom. Now C11 can continue to charge up through the now reverse-connected supporting capacitors through a process similar to the one described above, except that the supporting capacitors are discharged in reverse order, i.e., first through C26, then through C25, and so on until finally through C21. At this stage C11 is fully charged to 1.6Vnom and charging of C12 must begin. For this the h-bridge switches are again toggled (i.e., Sh3 and Sh2 are turned off; and Sh1 and Sh4 are turned on), S11 is turned off and S12 is turned on. The charging process for C12 is identical to the charging process for C11, as shown in FIG. 32. During the discharge period, the capacitors C11 and C12 are discharged one at a time through a process that is the reverse of the charging process. Hence, the voltage waveforms during the discharge period are a mirror of those in the charging period. Throughout the charging and discharging period of this energy buffer, the bus voltage stays within the range 0.9Vnom-1.1Vnom. Hence, the 2-6 bipolar SSC energy buffer operating in this manner has a bus voltage ripple ratio (Rv) of 10%. Furthermore, it has an energy buffering ratio ($\Gamma_b$) of 79.6%.

n-m Bipolar SSC Energy Buffer

The capacitors that buffer most of the energy in the circuit of FIG. 31 are the backbone capacitors C11 and C12. Therefore, by adding additional backbone capacitors in parallel with C11 and C12 the energy buffer could potentially achieve better buffering performance. The number of supporting capacitors can also be changed. To evaluate the impact of the number of backbone and supporting capacitors on the performance of the energy buffer, the topology of FIG. 31 is extended by incorporating n backbone capacitors and m supporting capacitors, as shown in FIG. 37. The energy buffering ratio for this n-m bipolar SSC energy buffer (with n backbone capacitors of equal value C1 and m supportive capacitors of equal value C2) is given by:

$$\Gamma_b = nC1(1+2mR_v(C2/(C1+C2)))^2 - (1-2mR_v(C2/(C1+C2)))^2 / \quad \text{Equation (59)}$$

Referring to FIG. 37, as noted above, an n-m bipolar SSC energy buffer circuit can be realized by adding more capacitors to the first and second of circuitry, 502, 504 shown in FIG. 37 circuit 500. Note that the capacitor that does the energy buffering in the circuit 500 is the capacitor $C_{11}$ in the second set of circuitry 504. Therefore, by replacing C11 alone with a plurality of "legs" in parallel, each "leg" comprising the series connection of a capacitor and switch, better buffering performance can be achieved.

The circuit 500' includes a first set of circuitry 502' and a second set of circuitry 504'. The first set of circuitry 502' includes capacitors $C_{21}, C_{22}, \ldots, C_{2m}$ (referred herein as m capacitors) and switches $S_{21}, S_{22}, \ldots, S_{2m}$ in series with a respective one capacitor, and the "legs" formed by each switch-capacitor pair in parallel. The first set of circuitry 502' also includes switches $S_{h1}, S_{h2}, S_{h3}, S_{h4}$ (e.g., an H-bridge). The second set of circuitry 504 includes capacitors $C_{11}$, $C_{12}, \ldots, C_{1n}$ (referred herein as n capacitors) and switches $S_{11}, S_{12}, \ldots, S_{1n}$ in series with a respective one capacitor, and the "legs" formed by each switch-capacitor pair in parallel.

The m capacitors in the first set of circuitry 502 in this case have to switch at a higher switching frequency. The energy buffering ratio for this n-m bipolar SSC energy buffer (with n capacitors of equal value $C_1$ and m capacitors with equal value $C_2$) is given by:

$$\gamma_b = \frac{nC_1}{nC_1}$$

FIG. 38 shows the variation in energy buffering ratio, $\Gamma_b$, (with C1 equal to C2) as a function of the number of backbone capacitors n and the number of supporting capacitors m for three different values of voltage ripple ratio Rv. These plots indicate that there is an optimal number of supporting capacitors that should be used for a given number of backbone capacitors in order to maximize the energy buffering ratio. Note that this optimal number of supporting capacitors depends on the value of allowed voltage ripple ratio.

These plots can be used to select the optimal number of backbone and supporting capacitors to maximize the energy buffering ratio for a given bus voltage ripple ratio. If a larger voltage ripple ratio is allowed, a high energy buffering ratio can be achieved with fewer backbone and supporting capacitors. For a fixed number of backbone capacitors, a lower voltage ripple ratio requires a larger number of supporting capacitors if maximum energy buffering is to be achieved.

However, increasing the number of supporting capacitors also increases the complexity of the circuit and the switching frequency of the switches associated with the supporting capacitors (S21-S2m). For an Rv of 10% with 2 backbone capacitors, the optimal number of supporting capacitors is 33 (see FIG. 34A); hence the choice of the 2-6 bipolar SSC energy buffer to meet a 10% voltage ripple requirement. Note that for an Rv of 10%, with 8 backbone and 8 supporting capacitors, an energy buffering ratio of 91.6% can be achieved. Hence, the SSE energy buffer achieves performance similar to the 8-6-5-4-3 parallel-series switched capacitor circuit of with only 16 capacitors and 20 switches instead of 120 capacitors and 41 switches.

To validate the proposed concept an exemplary 2-6 bipolar SSC energy buffer, similar to the one described herein and shown in FIG. 31 was designed and built. The exemplary circuit is designed as the energy buffer for a power factor correction (PFC) front-end of a two-stage single-phase ac to dc power converter as shown in FIG. 35A, 35B. The SSC energy buffer replaces the electrolytic capacitor normally connected at the output of the PFC. To simplify the implementation, a load resistor is used in place of the second-stage dc-dc converter. The SSC energy buffer is designed to meet a 10% bus voltage ripple ratio requirement on a 320 V dc bus with a maximum load of 135 W, as listed in Table I.

TABLE I

Design specifications for the exemplary 2-6 bipolar SSC energy buffer.

| Design Specification | Value |
|---|---|
| Maximum load power (Pload(max)) | 135 W |
| Bus voltage (Vbus) | 320 V |
| Voltage ripple ratio (Rv) | 10% |

The PFC used for this exemplary circuit is a 400 W evaluation board from STMicroelectronics that uses their transition-mode PFC controller (L6562A). This controller operates the boost PFC at the boundary between continuous and discontinuous conduction mode by adjusting the switching frequency. The evaluation board has a 330 μF electrolytic capacitor at the output of the PFC, and according to the PFC datasheet can maintain a voltage ripple ratio of 2.5%, while supplying a 400 W load at a bus voltage of 400 V. It has been experimentally verified that a 40 μF electrolytic capacitor is sufficient to support 135 W of output power with 10% voltage ripple ratio. The total volume of the 40 μF, 450 V electrolytic capacitor used for this verification is approximately 9 cm³. The energy buffer that replaces this electrolytic capacitor consists of three functional blocks: the energy buffer power circuit, the precharge circuit and the control unit, as shown in FIGS. 35A, 35B. In addition, the energy buffer needs to provide a feedback signal to the PFC for its proper operation. The design of each of these four elements is discussed below.

Energy Buffer Power Circuit

As shown in FIG. 34B, to achieve a voltage ripple ratio of 10% with a two-backbone-capacitor (n=2) bipolar SSC energy buffer, the optimal number of supporting capacitors is six, (i.e., m=6). Hence in the exemplary circuit, the electrolytic capacitor is replaced by a 2-6 bipolar SSC energy buffer. To meet the 10% voltage ripple requirement at the 320 V bus voltage and the 135 W output power level, the eight capacitors of the SSC energy buffer have to be 2.2 micro-Farads each. The required voltage rating of these film capacitors is different and ranges from 32 V to 512 V. However, for simplicity and to provide adequate safety margin, 700 V film capacitors are used as the two backbone capacitors and 250 V capacitors are used as the six supporting capacitors. All the switches are implemented using silicon power MOSFETs.

Switches S11 S12, S21, S22, S23, S24, S25 and S26 are implemented with reverse voltage blocking capability.

Precharge Circuit

An important part of the SSC energy buffer is the precharge circuit. When the system starts, the precharge circuit draws power from the PFC to charge the individual capacitors of the energy buffer to the desired initial voltage levels. The precharge circuit designed here uses a linear regulator operated as a current source as shown in FIG. 36. The linear regulator used is Supertex's LR8 with a maximum output current of 20 mA. The linear regulator can be disconnected from the energy buffer power circuit by two isolating switches Sp1 and Sp2. The precharge circuit is controlled by an ATMEL ATmega2560 microcontroller.

The flow chart of the precharge control is shown in FIG. 37. A scaled down version of the voltage across each capacitor is compared with a specified reference provided by the microcontroller through a digital to analog converter (DAC). The results of the comparison are fed back to the microcontroller to trigger an interrupt. During precharge, the microcontroller turns the switches on or off appropriately to connect the current source to the capacitor that needs to be charged. The states (on or off) of the switches for charging a particular capacitor during the precharge period are shown in Table II.

TABLE II

State of the switches during precharge of each of the eight capacitors of the 2-6 bipolar SSC energy buffer. Blank cell indicates the switch is off.

|  | $C_{11}$ | $C_{12}$ | $C_{21}$ | $C_{22}$ | $C_{23}$ | $C_{24}$ | $C_{25}$ | $C_{26}$ |
|---|---|---|---|---|---|---|---|---|
| $S_{11}$ | on | | | | | | | |
| $S_{12}$ | | on | | | | | | |
| $S_{21}$ | | | on | | | | | |
| $S_{22}$ | | | | on | | | | |
| $S_{23}$ | | | | | On | | | |

TABLE II-continued

State of the switches during precharge of each of the eight capacitors of the 2-6 bipolar SSC energy buffer. Blank cell indicates the switch is off.

|  | $C_{11}$ | $C_{12}$ | $C_{21}$ | $C_{22}$ | $C_{23}$ | $C_{24}$ | $C_{25}$ | $C_{26}$ |
|---|---|---|---|---|---|---|---|---|
| $S_{24}$ | | | | | | on | | |
| $S_{25}$ | | | | | | | on | |
| $S_{26}$ | | | | | | | | on |
| $S_{h1}$ | | | | | | | | |
| $S_{h2}$ | on | on | | | | | | |
| $S_{h3}$ | | | | | | | | |
| $S_{h4}$ | | | on | on | On | on | on | on |
| $S_{p1}$ | on | on | on | on | On | on | on | on |
| $S_{p2}$ | on | on | on | on | On | on | on | on |
| $S_s$ | | | on | on | On | on | on | on |

First Sp1, Sp2, S21, Sh4 and Ss are turned on, and all the other switches are turned off to charge C21. The microcontroller senses the voltage of C21 (through the voltage divider formed by R21 and R22) and compares it with the specified precharge voltage (0.5Vnom=160 V). Once the voltage of C21 reaches 160V, S21 is turned off and S22 is turned on to charge C22 to its specified precharge level. Similarly, C23, C24, C25 and C26 are charged one at a time to their designed initial level. Once C26 is charged, S26, Sh4 and Ss are turned off, and Sh2 and S11 are turned on to charge C11. Now the microcontroller senses the voltage of C11 (through the voltage divider formed by R11 and R12) and compares it with the specified precharge voltage (0.4Vnom=128 V). Once the voltage of C11 is larger than 128 V, S11 is turned off and S12 is turned on to charge C12. Once all the capacitors are precharged, the precharge circuit is disconnected from the SSC energy buffer by switches Sp1 and Sp2, and the energy buffer enters normal operation.

Control

The normal operation of the energy buffer is also controlled by a state machine implemented in the ATMEL ATmega2560 microcontroller. The state machine controls the state (on or off) of the twelve switches in the SSC energy buffer power circuit. The state machine has a total of 24 states, with each state corresponding to a unique and valid combination of the states of the twelve switches, as shown in Table III.

| States | $S_{21}$ | $S_{22}$ | $S_{23}$ | $S_{24}$ | $S_{25}$ | $S_{26}$ | $S_{11}$ | $S_{12}$ | $S_{h1}$ | $S_{h2}$ | $S_{h3}$ | $S_{h4}$ |
|---|---|---|---|---|---|---|---|---|---|---|---|---|
| 1 | on | | | | | | On | | on | | on | |
| 2 | | on | | | | | On | | on | | on | |
| 3 | | | on | | | | On | | on | | on | |
| 4 | | | | on | | | On | | on | | on | |
| 5 | | | | | on | | On | | on | | on | |
| 6 | | | | | | on | On | | on | | on | |
| 7 | | | | | | on | On | | | on | | on |
| 8 | | | | | on | | On | | | on | | on |
| 9 | | | | on | | | On | | | on | | on |
| 10 | | | on | | | | On | | | on | | on |
| 11 | | on | | | | | On | | | on | | on |
| 12 | on | | | | | | On | | | on | | on |
| 13 | on | | | | | | | on | on | | on | |
| 14 | | on | | | | | | on | on | | on | |
| 15 | | | on | | | | | on | on | | on | |
| 16 | | | | on | | | | on | on | | on | |
| 17 | | | | | on | | | on | on | | on | |
| 18 | | | | | | on | | on | on | | on | |
| 19 | | | | | | on | | on | | on | | on |
| 20 | | | | | on | | | on | | on | | on |
| 21 | | | | on | | | | on | | on | | on |
| 22 | | | on | | | | | on | | on | | on |
| 23 | | on | | | | | | on | | on | | on |
| 24 | on | | | | | | | on | | on | | on |

The flow chart of the normal operation mode control logic of the energy buffer is shown in FIG. 37. In this flow chart, s denotes the current state of the state machine. The energy buffer starts normal operation in state 1 (i.e., s=1), which corresponds to minimum energy stored in the buffer, and starts to charge up. Once the bus voltage reaches the maximum allowed voltage, 1.1Vnom (352 V), the UP interrupt is triggered and the state is incremented by one (i.e., s=s+1). The microcontroller turns the appropriate power switches on or off to match the configuration for the new state. This drops the bus voltage back to 0.9Vnom (288 V), and the charging of the energy buffer continues until it again reaches the upper voltage limit. This process is repeated as long as the energy buffer is being charged and it has not reached state 24. Once the energy buffer has reached state 24, the state machine stays in state 24 even if it receives additional cUP interrupts. This helps protect the energy buffer to a certain extent in case load power exceeds its design specifications. During this overload condition the energy buffer looks like a 1.1 _F capacitor to the external system. The energy buffer will return to normal operation once the load power returns to the design range.

During discharge of the energy buffer, the DOWN interrupt is triggered when the bus voltage reaches the minimum allowed voltage, 0.9Vnom (288 V). This decrements the state by one (i.e., s=s−1). The microcontroller turns the appropriate power switches on and off to match the configuration for the new state and the bus voltage increases to 1.1Vnom (352 V). This process is repeated each time the bus voltage reaches the lower voltage limit until it has reached state 1. As in the case of charging, to protect the energy buffer, the state machine stays in state 1 even if it receives additional DOWN interrupts. Hence during normal operation at maximum power, the state machine will iterate through states 1 through 24 in a sequential manner, first going from 1 to 24 as it charges, and then returning from 24 to 1 as it discharges, and this process is repeated as long as the energy buffer is in normal operation.

Artificial Voltage Feedback

In a conventional system with an energy buffering electrolytic capacitor at the output of the PFC, the PFC uses the bus voltage (i.e., the voltage across the buffering capacitor) to control its output current. The bus voltage is scaled down by a resistive divider and fed back to the PFC control chip.

Since the bus voltage is a good measure of the energy stored in the capacitor, this feedback mechanism ensures that the average output power from the PFC matches the power drawn by the do load and the system stays stable. However, when the electrolytic capacitor is replaced with the SSC energy buffer, the bus voltage is no longer a true representation of the energy stored in the energy buffer. Hence, an artificial signal must be generated (and fed back to the PFC control chip) that represents the energy stored in the energy buffer and mimics the bus voltage of the electrolytic capacitor. In the exemplary circuit this function is performed by a second ATMEL ATmega2560 microcontroller.

In the precharge mode, the SSC energy buffer behaves simply like two capacitors connected in series. Hence, during this period, the bus voltage reflects the energy stored inside the two capacitors and so the voltage that needs to be fed back is simply a scaled version of the bus voltage.

Once the energy buffer enters normal operating mode, its stored energy increases monotonically as it goes from state 1 to state 24 and then decreases monotonically as it returns to state 1. The energy that gets stored in the energy buffer as it goes from state 1 to state 24 is given by:

$$\Delta E(t) = \sum_{i=1}^{N} \frac{1}{2}(Ci(Vi(t)^2 - V_{i0}^2))$$ Equation (60)

Where:
N is the total number of capacitors in the energy buffer (eight in the 2-6 bipolar SSC case);
Ci is the capacitance of capacitor i;
Vi(t) is the voltage of capacitor i at time t; and
$V_{i0}$ is the initial voltage of capacitor i after it is precharged.

In the exemplary circuit all eight capacitors have the same capacitance Cb (equal to 2.2 _F). The effective energy in the energy buffer as a function of time is given by:

$$Eb(eq)(t) = \frac{1}{2} C_{eq} V_{min}^2 + \Delta E(t)$$ Equation (61)

where Ceq is an equivalent capacitance for this energy buffer valid while it is operating in normal operating mode, and is given by:

$$C_{eq} = \frac{2 \int_{t_1}^{t_2} p(t) dt}{V_{t_2}^2 - V_{t_1}^2}$$ Equation (62)

It should be noted that Eb(eq) as given by Equation 61 is not the actual energy in the energy buffer but rather the apparent energy.

Here p(t) is the power flowing into the energy buffer, and Vt1 and Vt2 are the voltages at beginning (time t1) and the end (time t2) of the charging period, respectively. For the exemplary system, Ceq is equal to 26.4_F. Hence, the voltage that needs to be fed back in normal operating mode is given by:

$$V_{fb}(t) = \sqrt{\frac{C_{eq} V_{min}^2 + 2\Delta E(t)}{C_{eq}}}$$ Equation (63)

This feedback signal reflects the apparent energy stored in the energy buffer. While the expression given by Eq. 8 for the normal operating mode feedback signal can be implemented, it is simpler to implement an approximation to this expression which works just as well within the resolution of an 8-bit digital to analog converter (DAC). The approximate feedback signal is derived assuming that the feedback voltage signal is linear between two switching instances and the current flowing into or out of the energy buffer is constant (i.e., current has a square profile).

This approximate feedback voltage is given by:

$$V_{fb(approx)}(t) = V_{min} + (V_{max} - V_{min})(i/24) + (V_{bus}(t) - V_{min})(C_b/2C_{eq})$$ Equation (64)

It should be noted that the switched-capacitor energy buffer concepts, systems, circuits and techniques described herein enable the use of smaller capacitors with lower voltage ratings in place of a single large capacitor with high voltage rating. Thus, it is possible to construct an inverter potentially free of electrolytic capacitors in order to enable long-life operation. In addition, the concepts, systems, circuits and techniques described herein improve capacitor energy utilization in inverters significantly. It also offers great opportunities in reducing bus voltage ripple sizes while introducing negligible increase in energy storage volume.

Described herein are a variety of novel approaches to the distribution of energy conversion and control throughout a solar array. The architecture choices presented here affect the power electronics implemented at the module. These choices afford new opportunities for the control and processing of energy that may enhance system and grid-interaction stability. They also offer the possibility of removing certain types of components from troublesome areas of the system, e.g., magnetics behind panels and electrolytic capacitors in the inverter. Described herein is a "system" view of a solar array, and a description of potential optimizations that maximize energy extraction to the grid with the improved stability while potentially minimizing expense and maximizing field life.

Switched-capacitor DC-DC converters have been shown to be beneficial at all levels of solar energy extraction. Notably, utilizing these converters at the cell level may lead to reduction in production cost or different opportunities for the manufacturer of solar panels. Common centroid layout can potentially keep MPPT converters away from extreme conversion ratios where their conversion efficiencies may degrade.

As generation on the utility grid becomes increasingly distributed due to the influx of renewable energy sources, the uncertainty of local grid impedance will increase. Thus, stability of the electrical power network is becoming a growing concern. The proposed architecture can potentially minimize the possibility of unstable interactions with the grid by exploiting the utility of feedforward information from the PV array current sink. The technologies in this architecture could be applied in other areas as well, including power-factor correcting converters.

Having described preferred embodiments of the concepts, systems, circuits and techniques described herein, it will now become apparent to those of ordinary skill in the art that other embodiments incorporating these concepts may be used. For example, it should now be appreciated that one can apply the topologies described herein to rectifier systems (e.g. for grid-connected power supplies) as well and for bidirectional power flow converter systems. Accordingly, it is submitted that that the concepts, systems, circuits and techniques described herein, should not be limited to the described embodiments but rather should be limited only by the spirit and scope of the appended claims.

The invention claimed is:

1. A solar panel comprising:
    a plurality of sub-module strings each comprising:
        a plurality of series connected solar cells wherein the plurality of solar cells in each sub-module string are disposed such that the solar cells are coupled in a common centroid layout which substantially reduces the amount of mismatch caused by an imbalance in solar irradiance between the sub-module strings;
        a switched-capacitor DC-DC converter deployed with the solar cell circuits during or after manufacturing and wherein said switched-capacitor DC-DC converter is provided having a plurality of conversion levels and wherein the switched-capacitor DC-DC converter is provided having a conversion level selected such that a current provided by the solar cell is close to the maximum power current of the solar cell; and
        a switched-capacitor DC-DC converter deployed with the plurality of solar cell circuits and wherein said switched-capacitor DC-DC converter is provided having a plurality of conversion levels and wherein the switched-capacitor DC-DC converter is provided having a conversion level selected such that a current provided by the plurality of solar cell circuits is close to the maximum power current of the plurality of solar cell circuits;
    wherein each of the plurality of solar cell circuits are coupled to provide the plurality of solar sub-module strings.

2. The solar panel of claim 1 wherein the solar cells are disposed in a common centroid layout such that the power generated by each of the sub-module strings remains substantially symmetric and balanced in response to a plurality of different full and partial shading patterns.

3. The solar panel of claim 1 further comprising a printed circuit board (PCB) having a common centroid routing pattern and wherein the solar cells are coupled to the PCB.

4. The solar panel in claim 1 wherein the DC-DC converter converters used with the sub-module strings are partially or fully integrated with the solar panel using integrated circuit manufacturing process.

5. The DC-DC converter in claim 4 wherein integrated portions of the said DC-DC converter can be manufactured on the same substrate material as the solar panel.

6. The solar panel in claim 1 wherein the common centroid routing pattern is etched onto the solar panel substrate material and wherein the solar cells are coupled to the bulk substrate.

7. The solar panel in claim 1 wherein the common centroid routing pattern is etched onto the solar panel substrate material and wherein the solar cells are coupled to the bulk substrate and wherein the DC-DC converters used with the sub-module strings are partially or fully integrated with the solar panel using integrated manufacturing process and wherein the integrated portions of the DC-DC converter can be manufactured on the solar panel substrate.

8. A solar panel comprising a plurality of sub-module strings each of the sub-module strings comprising a plurality of series connected solar cells wherein the plurality of solar cells in each sub-module string are disposed such that the solar cells are coupled in a common centroid layout which substantially reduces the amount of mismatch caused by an imbalance in solar irradiance between the sub-module strings.

9. The solar panel of claim 8 wherein the solar cells are disposed in a common centroid layout such that the power generated by each of the sub-module strings remains substantially symmetric and balanced in response to a plurality of different full and partial shading patterns.

10. The solar panel of claim 8 further comprising a printed circuit board (PCB) having a common centroid routing pattern and wherein the solar cells are coupled to the PCB.

* * * * *